US009124508B2

(12) United States Patent
Nakadai et al.

(10) Patent No.: US 9,124,508 B2
(45) Date of Patent: Sep. 1, 2015

(54) COMMUNICATION CONTROL DEVICE COMMUNICATION CONTROL SYSTEM, COMMUNICATION CONTROL METHOD AND PROGRAM

(75) Inventors: Shinji Nakadai, Tokyo (JP); Masato Asahara, Tokyo (JP)

(73) Assignee: NEC Corporation, Tokyo (JP)

( * ) Notice: Subject to any disclaimer, the term of this patent is extended or adjusted under 35 U.S.C. 154(b) by 88 days.

(21) Appl. No.: 14/122,157

(22) PCT Filed: May 18, 2012

(86) PCT No.: PCT/JP2012/063400
§ 371 (c)(1),
(2), (4) Date: Nov. 25, 2013

(87) PCT Pub. No.: WO2012/161289
PCT Pub. Date: Nov. 29, 2012

(65) Prior Publication Data
US 2014/0133312 A1 May 15, 2014

(30) Foreign Application Priority Data
May 23, 2011 (JP) ................................ 2011-114644

(51) Int. Cl.
*H04L 12/16* (2006.01)
*H04L 12/721* (2013.01)
(Continued)

(52) U.S. Cl.
CPC ............ *H04L 45/124* (2013.01); *G06F 9/5083* (2013.01); *H04L 45/12* (2013.01); *H04L 47/12* (2013.01); *H04L 45/123* (2013.01)

(58) Field of Classification Search
None
See application file for complete search history.

(56) References Cited

U.S. PATENT DOCUMENTS 7,650,331 B1   1/2010   Dean et al.
7,930,339 B2 *  4/2011   Tobita et al. ................. 709/202
(Continued)

FOREIGN PATENT DOCUMENTS

JP   03-085663    4/1991
JP   2000-121502  4/2000
(Continued)

OTHER PUBLICATIONS

International SearchReport of PCT/JP2012/063400 mailed Aug. 28, 2012 (4 pages).
(Continued)

*Primary Examiner* — Kouroush Mohebbi
(74) *Attorney, Agent, or Firm* — Wilmer Cutler Pickering Hale and Dorr LLP

(57) ABSTRACT

To reduce a communication load among data storage devices and data processing devices, a communication device comprises node information storage means for storing identifiers of data devices and processing devices and communication costs, and search processing means for receiving a message, which includes a transfer route of message and a total cost, which is a communication cost of transfer route, and detecting and outputting a closed path, from transfer route, having a negative total cost, or transmitting to the registered data device a message including a new total cost calculated by subtracting a communication cost corresponding to data device concerned from total cost and a new transfer route made by adding communication device to transfer route, and transmitting to the registered processing device a message including a new total cost calculated by adding a communication cost corresponding to processing device concerned to total cost, and new transfer route.

32 Claims, 75 Drawing Sheets

(51) Int. Cl.
*H04L 12/801* (2013.01)
*G06F 9/50* (2006.01)

(56) References Cited

U.S. PATENT DOCUMENTS

2004/0186832 A1* 9/2004 Jardin ............................. 707/3
2007/0064612 A1* 3/2007 Armanino et al. ............ 370/238

FOREIGN PATENT DOCUMENTS

| JP | 2003-058520 | 2/2003 |
| JP | 2006-261949 | 9/2006 |
| JP | 2009-298235 | 12/2009 |
| JP | 2010-097489 | 4/2010 |

OTHER PUBLICATIONS

Peter Pietzuch, Jonathan Ledlie, Jeffrey Shneidman, Mema Roussopoulos, Matt Welsh, and Margo Seletzer, "Network-Aware Operator Placement for Stream-Processing Systems," Proceedings of the $22^{nd}$ International Conference on Data Engineering (ICDE'06), Atlanta, GA, Apr. 2006 (12 pages).

Shinji Nakadai, "Optimum Deployment of parallel skeleton processing by using minimum cost flow algorism," collection of papers of the second forum about data engineering and information management—DEIM 2010, May 25, 2010, F5-5 (8 pages).

\* cited by examiner

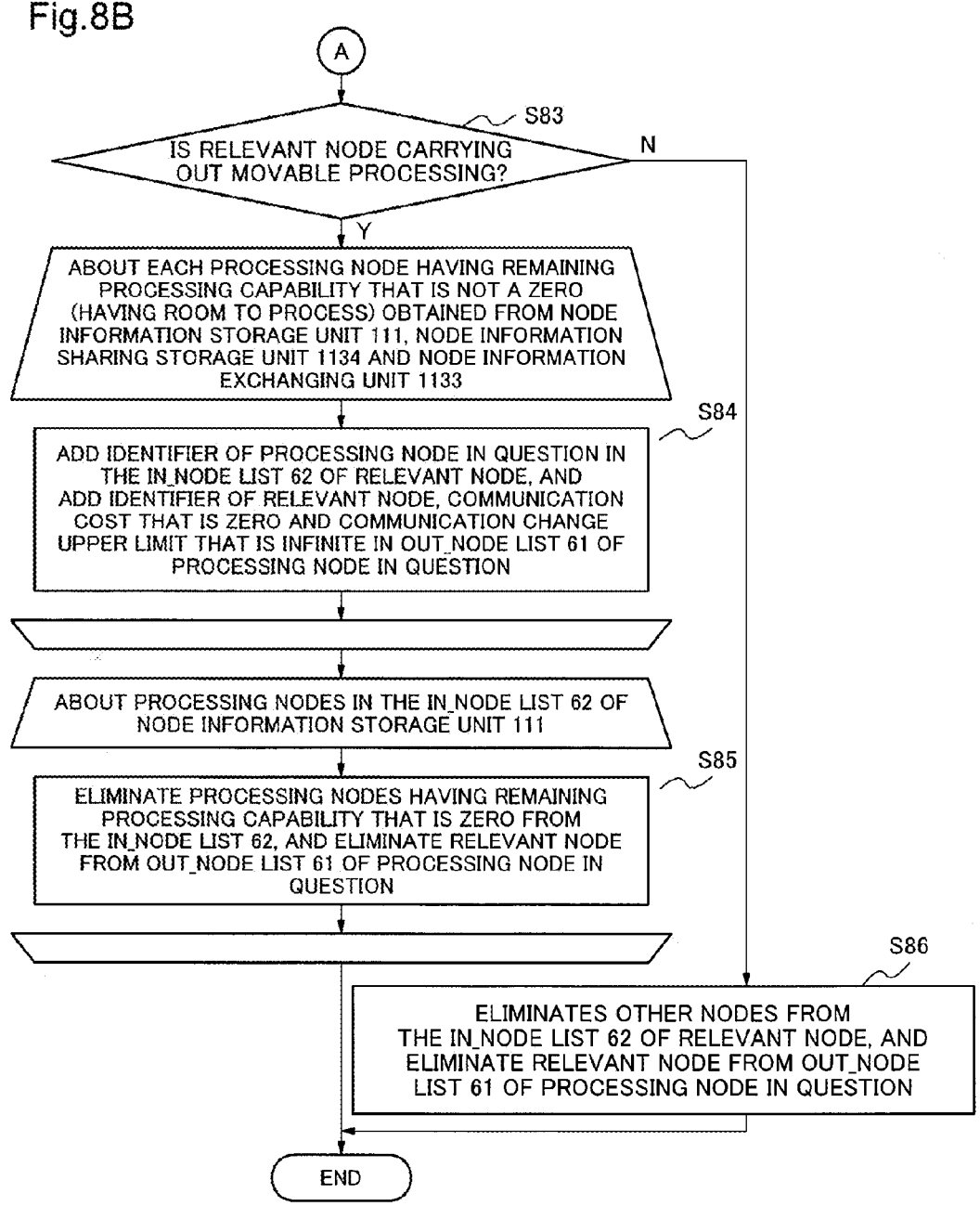

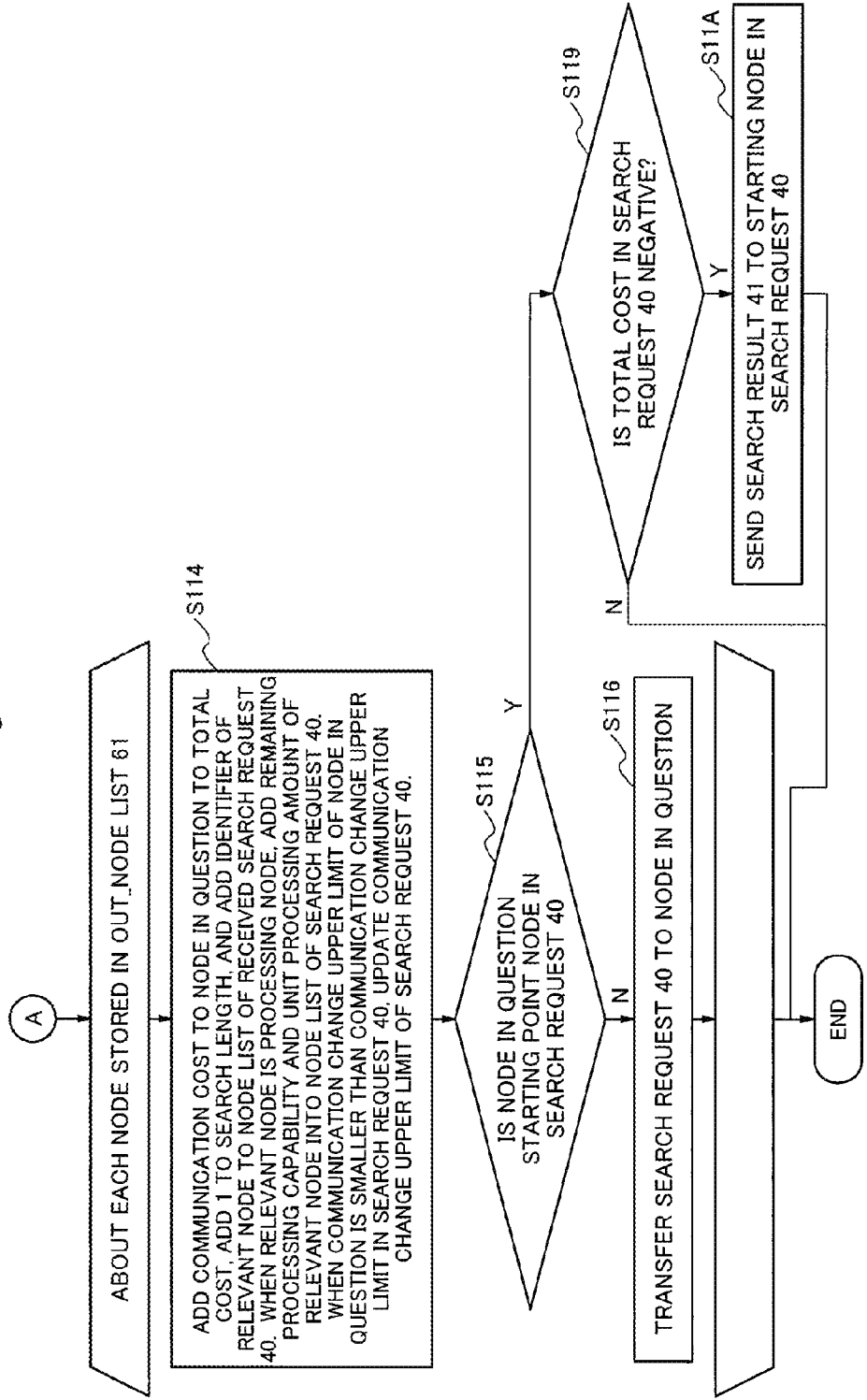

Fig.13

| ITEM | CONTENTS | SEARCH REQUEST 40 | SEARCH RESULT 41 |
|---|---|---|---|
| STARTING POINT NODE | IDENTIFIER OF NODE CREATING SEARCH REQUEST 40 | ○ | |
| NODE LIST | LIST OF NODES (IDENTIFIER, REMAINING PROCESSING CAPABILITY AND UNIT PROCESSING AMOUNT) ON A SEARCH ROUTE | ○ | ○ |
| SEARCH LENGTH | LENGTH OF SEARCH ROUTE | ○ | ○ |
| TOTAL COST | TOTAL OF COSTS OF SEARCH ROUTE | ○ | ○ |
| COMMUNICATION CHANGE UPPER LIMIT | MINIMUM VALUE OF COMMUNICATION CHANGE UPPER LIMITS OF NODES ON SEARCH ROUTE | ○ | |

Fig.18

| ITEM | CONTENTS | | | | | | SEARCH REQUEST (40) | | | SEARCH RESULT (41) |
|---|---|---|---|---|---|---|---|---|---|---|
| | | | | | | | NOTIFICATION | REQUEST | REPLY | |
| STARTING POINT NODE | | | | | | | O | O | | |
| NODE COUNT | | | | | | | O | O | | |
| SEARCH LENGTH | | | | | | | O | O | O | O |
| TOTAL COST | | | | | | | O | | O | |
| ROUT_NODE | NODE IDENTIFIER | TYPE | COMMUNICATION CHANGE UPPER LIMIT | UNIT PROCESSING LOAD | REMAINING PROCESSING CAPABILITY | | O | | O | |
| MAXIMUM VALUE OF AVERAGE COSTS | | | | | | | | | | O |
| ROUTE NODE LIST | LIST OF ROUTE NODES FOR ALL SEARCH LENGTHS | | | | | | | | | O |

Fig.19

| ITEM | CONTENTS | | |
|---|---|---|---|
| OUT_NODE LIST (61) | LIST OF SETS OF FOLLOWING THREE ITEMS | | |
| | NODE IDENTIFIER | COMMUNICATION COST | COMMUNICATION CHANGE UPPER LIMIT |
| IN_NODE LIST (62) | LIST OF NODE IDENTIFIERS | | |
| PROCESSING NODE CANDIDATE LIST (63) | CANDIDATES FOR PROCESSING NODE TO BE LISTED IN OUT_NODE LIST OR IN_NODE LIST | | |
| NODE COUNT (64) | NUMERICAL VALUE REGARDED AS TOTAL OF THE NUMBER OF NODES | | |

Fig.20

(ROUTE STORAGE UNIT)

| ABOUT SEARCH LENGTH k (FROM 1 TO THE NUMBER OF NODES N), ROUTE INFORMATION INCLUDING THE FOLLOWING ITEMS IS STORED | | | | | | | |
|---|---|---|---|---|---|---|---|
| SEARCH LENGTH | TOTAL COST | FIXEDNESS STATE | ROUTE NODE | IN_NODE STATE: ABOUT EACH IN_NODE, THE FOLLOWINGS ARE STORED | | OUT_NODE STATE: ABOUT EACH OUT_NODE, THE FOLLOWINGS ARE STORED | |
| | | | | NODE IDENTIFIER | STATE | NODE IDENTIFIER | STATE |

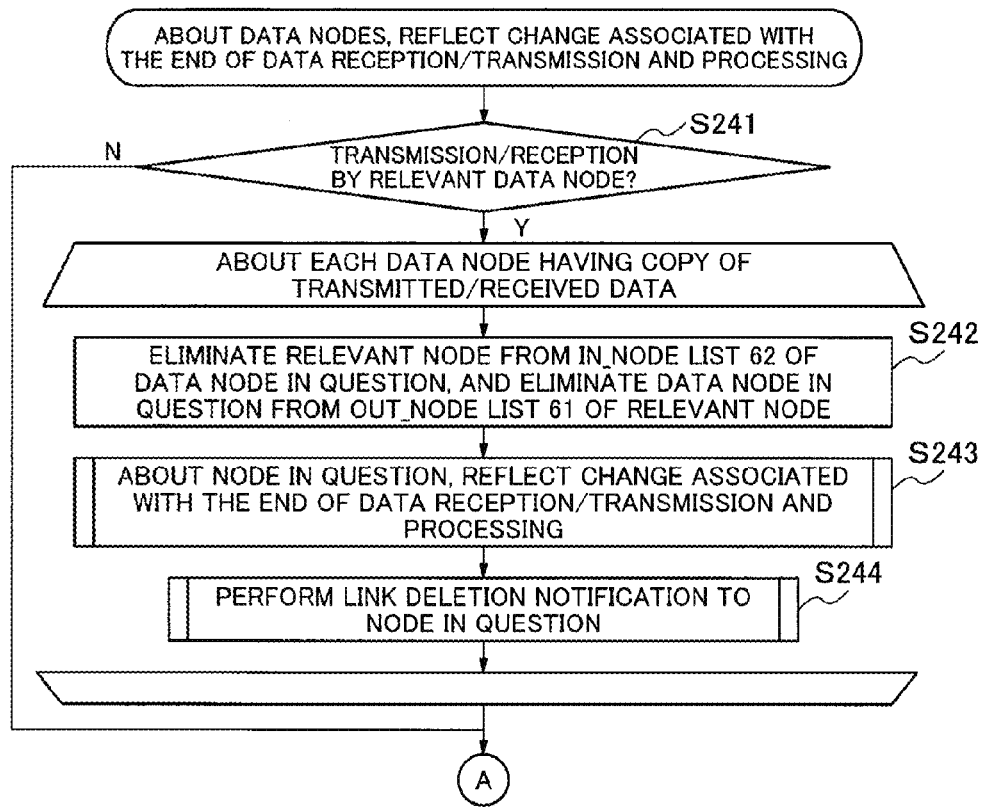

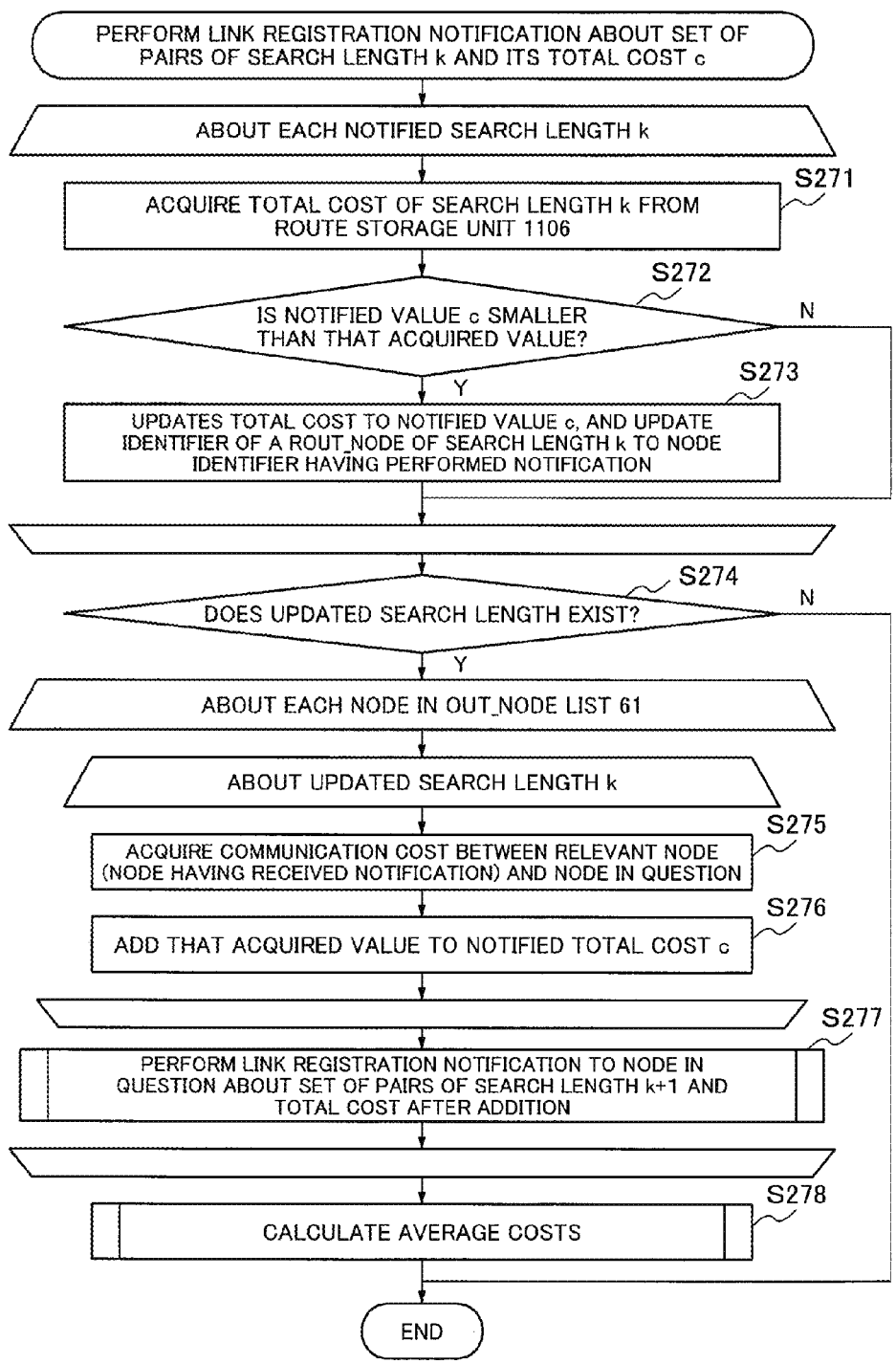

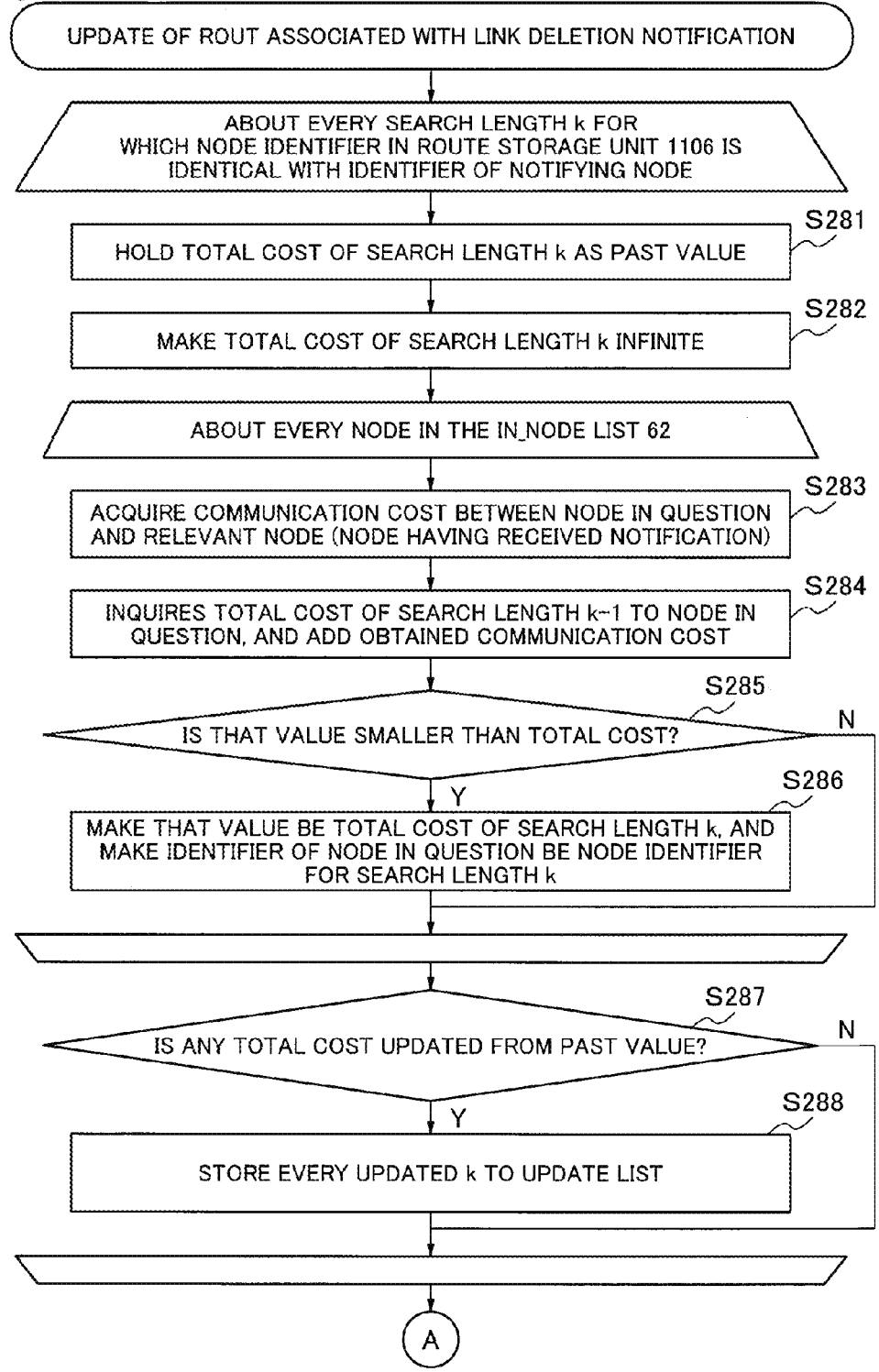

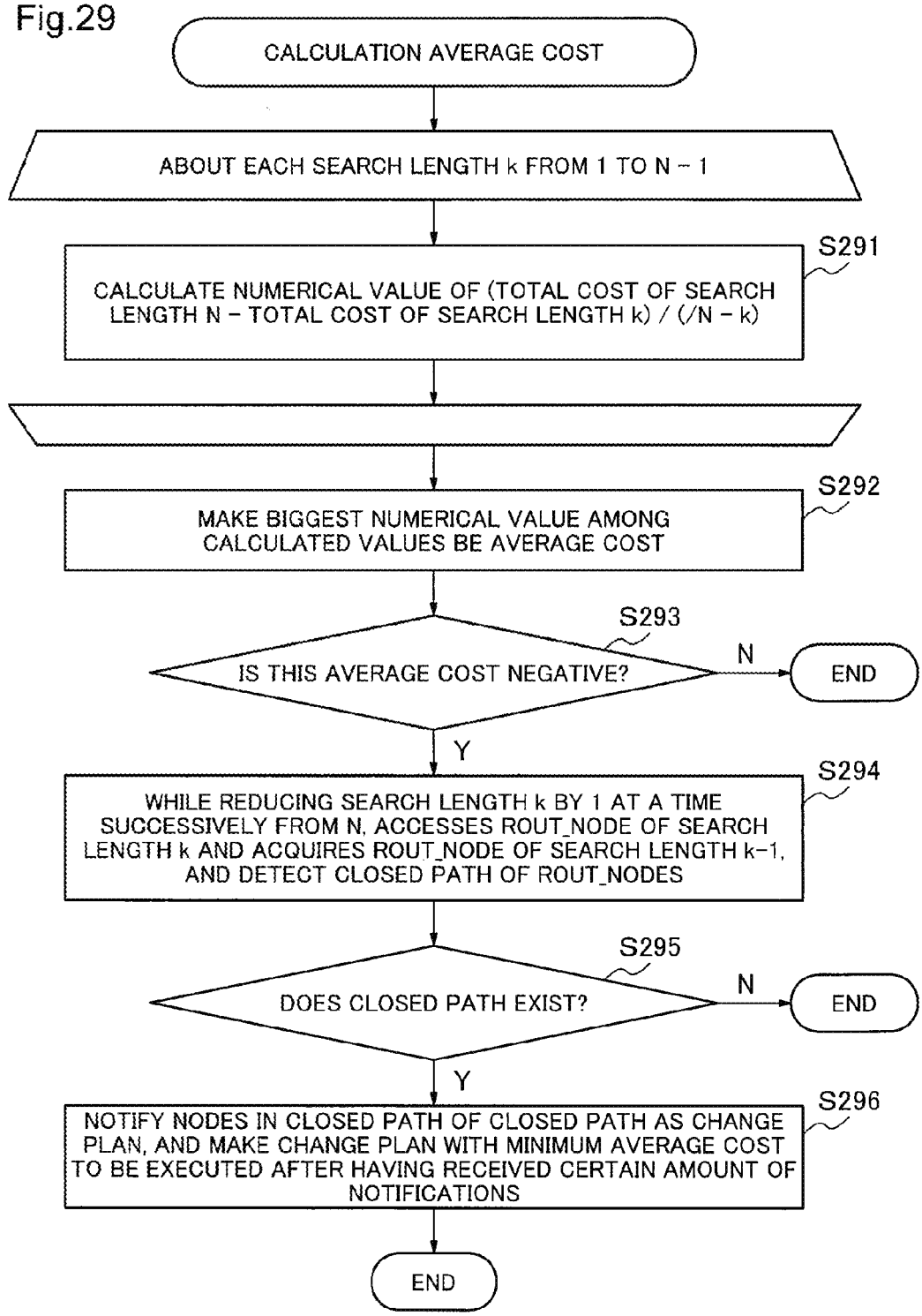

Fig.37

| TOTAL COST | COMMUNICATION CHANGE UPPER LIMIT (a) | ADDABLE QUANTITY OF PROCESSING (b) | NODE LIST | | | | | | | | Min(a,b) × TOTAL COST |
|---|---|---|---|---|---|---|---|---|---|---|---|
| -5 | 50 | 20 | 1bP | 1hP | 1bD | 1bP | | | | | -100 |
| -3 | 30 | 10 | 1bP | 1eP | 1gD | 1bP | | | | | -30 |
| -3 | 20 | Inf. | 1bP | 1dD | 1eP | 1gD | 1bP | | | | -60 |
| -8 | 20 | 20 | 1bP | 1dD | 1fP | 1hP | 1bD | | | | -160 |
| -3 | 20 | 30 | 1bP | 1dD | 1eP | 1gD | 1bP | | | | -60 |
| -3 | 20 | 30 | 1bP | 1dD | 1fP | 1eP | 1bP | | | | -60 |
| -8 | 20 | 20 | 1bP | 1dD | 1eP | 1gD | 1hP | 1bD | | | -160 |
| -5 | 30 | 30 | 1bP | 1dD | 1eP | 1gD | 1eP | 1gD | 1bP | | -150 |

SEARCH RESULT

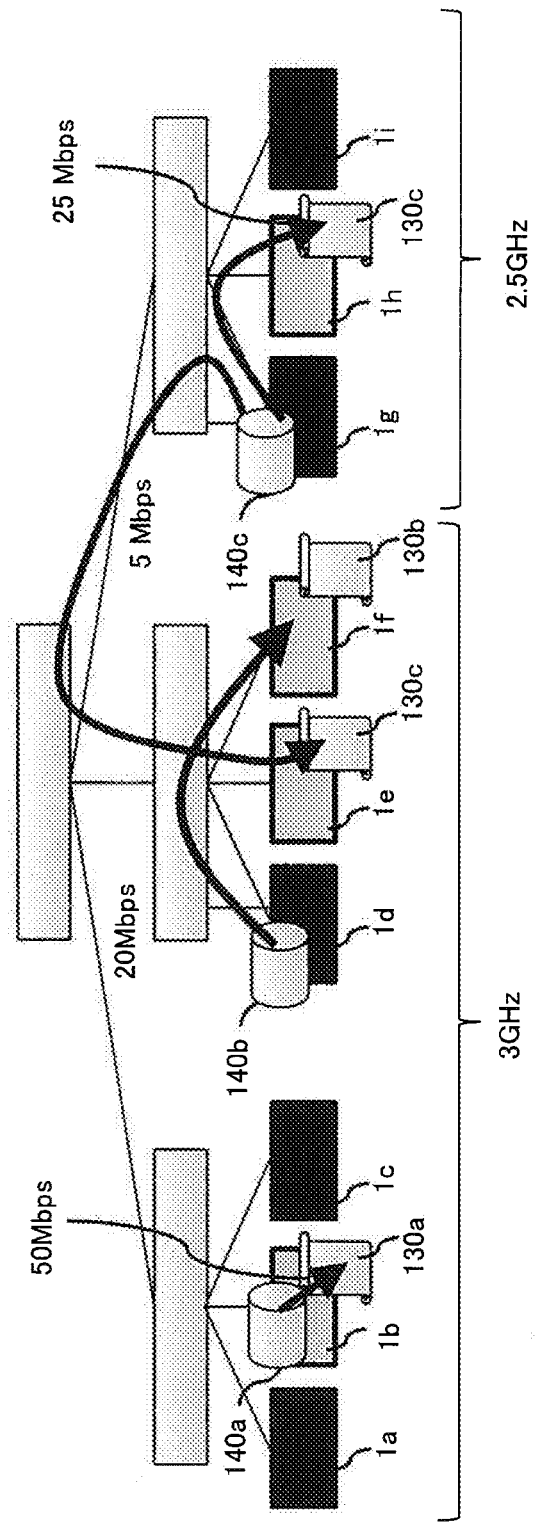

Fig.44D
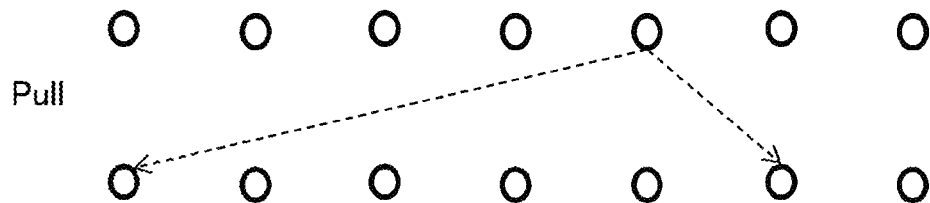
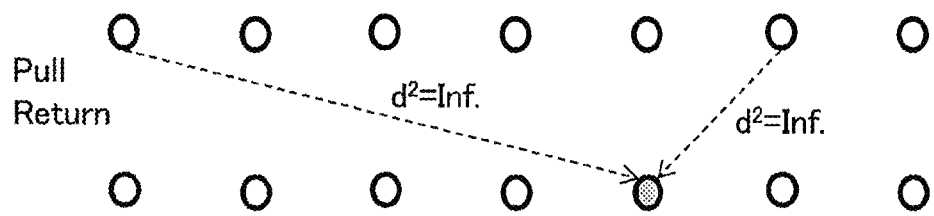
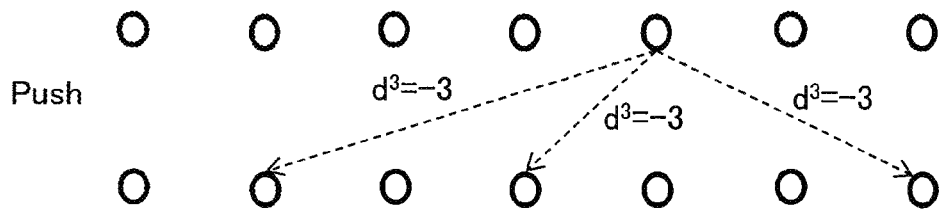
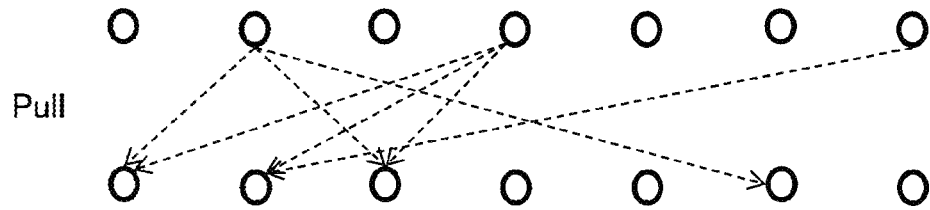

Fig.45

| NODE | | $d^1$ | $d^2$ | $d^3$ | $d^4$ | $d^5$ | $d^6$ | $d^7$ | | M |
|---|---|---|---|---|---|---|---|---|---|---|
| | 1bD | Inf. | -5 | Inf. | -8 | -10 | -8 | -13 | | -1.5 |
| | 1bP | Inf. | 0 | -5 | -3 | -8 | -10 | -8 | | 2 |
| | 1dD | -5 | Inf. | -5 | -10 | -8 | -13 | -15 | | -1.7 |
| | 1eP | 0 | -3 | -3 | -5 | -8 | -8 | -11 | | -1.5 |
| | 1fP | Inf. | -3 | 0 | -3 | -8 | -6 | -11 | | -1.5 |
| | 1gD | Inf. | -5 | -8 | -8 | -10 | -13 | -13 | | 0 |
| | 1hP | 0 | Inf. | -3 | -5 | -3 | -8 | -10 | | -1.7 |

SEARCH LENGTH

Fig.46

| NODE | | | | | | | |
|---|---|---|---|---|---|---|---|
| 1hP | 1bP | – | 1fP | 1bP | 1bP | 1bP | 1bP |
| 1gD | – | 1eP | 1eP | 1eP | 1eP | 1eP | |
| 1fP | – | 1dD | 1bD | 1dD | 1dD | 1dD | |
| 1eP | 1bP | 1dD | 1fP | 1bP | 1dD | 1bP | 1dD |
| 1dD | 1bP | – | 1bP | 1bP | 1bP | 1bP | |
| 1bP | – | 1dD | 1bD | 1gD | 1bD | 1bD | 1bD |
| 1bD | – | 1hP | – | 1hP | 1hP | 1hP | 1hP |
| | $v^1$ | $v^2$ | $v^3$ | $v^4$ | $v^5$ | $v^6$ | $v^7$ |

SEARCH LENGTH

Fig.47

| NODE | | | | | | | |
|---|---|---|---|---|---|---|---|
| | 1bD | 1bP | 1dD | 1eP | 1fP | 1gD | 1hP |
| $v^1$ | – | – | 20 | – | – | – | – |
| $v^2$ | 50 | Inf. | Inf. | Inf. | Inf. | 30 | Inf. |
| $v^3$ | Inf. | Inf. | 20 | Inf. | Inf. | 30 | Inf. |
| $v^4$ | 50 | Inf. | 20 | Inf. | Inf. | 30 | Inf. |
| $v^5$ | 50 | Inf. | 20 | Inf. | Inf. | 30 | Inf. |
| $v^6$ | 50 | Inf. | 20 | Inf. | Inf. | 30 | Inf. |
| $v^7$ | 50 | Inf. | 20 | Inf. | Inf. | 30 | Inf. |

SEARCH LENGTH

COMMUNICATION CONTROL DEVICE COMMUNICATION CONTROL SYSTEM, COMMUNICATION CONTROL METHOD AND PROGRAM

CROSS-REFERENCE TO RELATED APPLICATIONS

This application is a national stage application of International Application No. PCT/JP2012/063400 entitled "Communication Control Device Communication Control System, Communication Control Method and Program," filed on May 18, 2012, which claims the benefit of the priority of Japanese patent application No. 2011-114644, filed on May 23, 2011, the disclosures of each of which are hereby incorporated by reference in their entirety.

TECHNICAL FIELD

The present invention relates to a communication control device, a communication control system, a communication control method and a program. More particularly, the present invention relates to a communication control device, a communication control method and a program which enable reduction of a communication load between devices.

BACKGROUND ART

In patent literature 1, there is described an example of a batch processing type distributed system having a reduction mechanism of a communication load. This batch processing type distributed system includes a data storage device which stores processing object data, a data processor (worker device) which acquires data from the data storage device and processes it, and a master device which determines which data a worker device should process according to a request from the worker device. In this system, the master device decides in a manner that a worker device which has issued a processing assignment request is made to carry out processing of data of a data storage device which is arranged closest to the worker device. By doing so, the master device tries to suppress a communication load between a worker device and a data storage device low.

A distributed data processing system capable of preventing increase of a network load and of suppressing occurrence of congestion is disclosed in patent literature 2. By using a communication delay between a data processor (worker device) and a server which stores data, this distributed data processing system determines which worker device is made to carry out each piece of processing included in a request from a client. For example, this distributed data processing system finds a communication delay from the coordinates of a worker device and a server, calculates a network load when executing processing in the worker device from the communication delay and a data amount, and makes a worker device of a less network load carry out the processing.

In patent literature 3, there is disclosed a communication device which can carry out processing of other communication processing devices as a substitute, and reduce a communication load due to sending and receiving data. A distributed processing system which changes a processing execution node dynamically is disclosed in patent literature 4. There is disclosed a job system that assigns a computer to each one of a series of sequenced jobs, respectively, and makes it carry out a job concerned in patent literature 5. In patent literature 6, there is disclosed a computer network system which enables exchange of execution of a job between distributed computer systems in consideration of a load status of sites.

An example of a stream processing type distributed system having a reduction mechanism of a communication load is disclosed in non-patent literature 1. In this stream processing type distributed system, each node makes processing of a data stream be moved in an autonomous and distributed manner based on a relaxation model of a spring. By this movement of processing, the system realizes distributed stream processing with a communication load lower than a communication load before the movement.

CITATION LIST

Patent Literature

[Patent Literature 1] Dean Jeffrey and Ghemawat Sanjay, "System and method for efficient large-scale data processing", U.S. Pat. No. 7,650,331
[Patent Literature 2] Japanese Patent Application Laid-Open No. 2010-97489
[Patent Literature 3] Japanese Patent Application Laid-Open No. 2009-298235
[Patent Literature 4] Japanese Patent Application Laid-Open No. 2006-261949
[Patent Literature 5] Japanese Patent Application Laid-Open No. 2000-121502
[Patent Literature 6] Japanese Patent Application Laid-Open No. 1991-85663

Non-Patent Literature

[Non-patent Literature 1] Peter Pietzuch, Jonathan Ledlie, Jeffrey Shneidman, Mema Roussopoulos, Matt Welsh, and Margo Seltzer, "Network-Aware Operator Placement for Stream-Processing Systems", Proceedings of the 22nd International Conference on Data Engineering (ICDE'06), Atlanta, Ga., April 2006.

SUMMARY OF INVENTION

Technical Problem

A master device in patent literature 1 makes, for each worker device, a decision to perform partial optimization that is closed within the worker device concerned. This decision may not necessarily be the most suitable processing assignment for the whole distributed system. That is, there is a case where assignment in which the quantity of data passing through a communication network is smaller than that of assignment determined by this method is possible. In addition, there are problems that a bottleneck is caused in a large scale system due to concentration of information collection processing and decision processing on a specific computer that is a master device, and influence on an entire system at the time when a failure occurs in this computer is large.

A distributed data processing system of patent document 2 is a system which performs partial optimization by worker device units, and does not perform optimization extending over a plurality of worker devices. A stream processing type distributed system of non-patent literature 1 is a system which performs partial optimization by stream units, and does not perform optimization extending over a plurality of streams.

None of the technologies of patent literature 3 to 6 reduce a communication load between a storage device of data and a processor which sends and receives the data.

The object of the present invention is to provide a technology for settling the above-mentioned problems.

Solution to Problem

One exemplary embodiment of this invention is a communication device connected with other communication devices via a communication path, including:

a node information storage means for storing out_node information which includes, when the communication device is a processing device to carry out processing assigned thereto, a set of an identifier of a data device associated with data of the processing and a communication cost for the data, and, when the communication device is a data device, a set of an identifier of a processing device to input and output data associated with the communication device and a communication cost between the processing device concerned and the data concerned;

a search processing means for receiving a message, which is originated from a sender, which is the communication device or another communication device, and includes a transfer route of the message and a total cost, which is a communication cost of the transfer route, and detecting and outputting a closed path, from the transfer route, having a negative total cost, or transmitting to a data device registered in the out_node information a message including a new total cost calculated by subtracting a communication cost corresponding to the data device concerned from the total cost and a new transfer route made by adding the communication device to the transfer route, and transmitting to a processing device registered in the out_node information a message including a new total cost calculated by adding a communication cost corresponding to the processing device concerned to the total cost and the new transfer route.

One exemplary embodiment of this invention is a communication system including a plurality of communication devices connected by a communication path, wherein the communication device stores in a node information storage means out_node information which includes, when a worker device corresponding to the communication device is a processing device to carry out processing assigned thereto, a set of an identifier of a data device associated with data of the processing and a communication cost between the processing device and the data, and, when a worker device corresponding to the communication device is a data device, a set of an identifier of a processing device to input and output data associated with the data device and a communication cost between the processing device concerned and the data concerned; and comprises a search processing means for receiving a message, which is originated from a sender, which is the communication device or another communication device, and includes a transfer route of the message and a total cost, which is a communication cost of the transfer route, and detects and outputs a closed path, from the transfer route, having a negative total cost, or transmitting to a communication device corresponding to a data device registered in the out_node information a message including a new total cost made by subtracting a communication cost corresponding to the data device concerned from the total cost and a new transfer route made by adding the worker device corresponding to the communication device to the transfer route, and transmitting to a communication device corresponding to a processing device registered in the out_node information a message including a new total cost made by adding a communication cost corresponding to the processing device concerned to the total cost and the new transfer route.

One exemplary embodiment of this invention is a program for making a computer connected with other computers, which execute the program, by a communication path execute storage processing for storing in a node information storage means out_node information which includes, when the computer is a processing device to carry out processing assigned thereto, a set of an identifier of a data device associated with data of the processing and a communication cost for the data; and when the computer is a data device, a set of an identifier of a processing device to input and output data associated with the computer and a communication cost between the processing device concerned and the data concerned;

search processing for. receiving a message, which is originated from a sender, which is the computer or another computer, and includes a transfer route of the message and a total cost, which is a communication cost of the transfer route, and detecting and outputting a closed path, from the transfer route, having a negative total cost, or transmitting to a data device registered in the out_node information a message including a new total cost calculated by subtracting a communication cost corresponding to the data device concerned from the total cost and a new transfer route made by adding the computer to the transfer route, and transmitting to a processing device registered in the out_node information a message including a new total cost calculated by adding a communication cost corresponding to the processing device concerned to the total cost and the new transfer rout.

One exemplary embodiment of the invention is a communication method in a communication device connected with other communication devices by a communication path, including:

storing in a node information storage means out_node information which includes, when the communication device is a processing device to carry out processing assigned thereto, a set of an identifier of a data device associated with data of the processing and a communication cost for the data;

when the communication device is a data device, a set of an identifier of a processing device to input and output data associated with the communication device and a communication cost between the processing device concerned and the data concerned;

receiving a message, which is originated from a sender, which is the communication device or another communication device, and includes a transfer route of the message and a total cost, which is a communication cost of the transfer route, and detecting and outputting a closed path, from the transfer route, having a negative total cost, or transmitting to a data device registered in the out_node information a message including a new total cost calculated by subtracting a communication cost corresponding to the data device concerned from the total cost and a new transfer route made by adding the communication device to the transfer route, and transmitting to a processing device registered in the out_node information a message including a new total cost calculated by adding a communication cost corresponding to the processing device concerned to the total cost and the new transfer rout.

Advantageous Effect of Invention

The present invention enables to, in a distributed processing system being carrying out a plurality of pieces of data processing which a plurality of computers pursue while communicating data, reduce a communication load of the plurality of pieces of data processing as a whole.

Also, the present invention makes it easy to prevent a specific computer and a device from becoming a bottleneck in terms of rapidity and reliability of processing at the time of execution of load reduction.

BRIEF DESCRIPTION OF DRAWINGS

FIG. 8B is an operation flowchart (2) of the node creating unit 1132 in the node information generating unit 113.

FIG. 11B is an operation flowchart (2) of the transfer unit 1103.

FIG. 13 is a diagram showing the contents of a message exchanged in the reception unit 1102 and the like.

FIG. 18 indicates the contents of a message to be exchanged.

FIG. 19 is a diagram showing a data configuration of a node information storage unit 111.

FIG. 20 is a diagram showing route information to be stored in a route storage unit 1106.

FIG. 24A is a flow chart (1) of processing in which the update unit 1113 reflects a processing end in a data node.

FIG. 27 is a flow chart of link registration processing of the update unit 1113.

FIG. 28A is a flow chart (1) of link deletion notification processing of the update unit 1113.

FIG. 29 is a flow chart of average cost calculation processing.

FIG. 37 is a diagram showing an example of a search result 14 of an operation example in the first exemplary embodiment.

FIG. 43 is an explanatory drawing (9) of an operation example in the first exemplary embodiment.

FIG. 44D is an explanatory drawing (4) of a message flow of an operation example in the second exemplary embodiment.

FIG. 45 is an explanatory drawing (1) of route information of an operation example in the second exemplary embodiment.

FIG. 46 is an explanatory drawing (2) of route information of an operation example in the second exemplary embodiment.

FIG. 47 is an explanatory drawing (3) of route information of an operation example in the second exemplary embodiment.

DESCRIPTION OF EMBODIMENTS

The First Exemplary Embodiment

Figure 1:
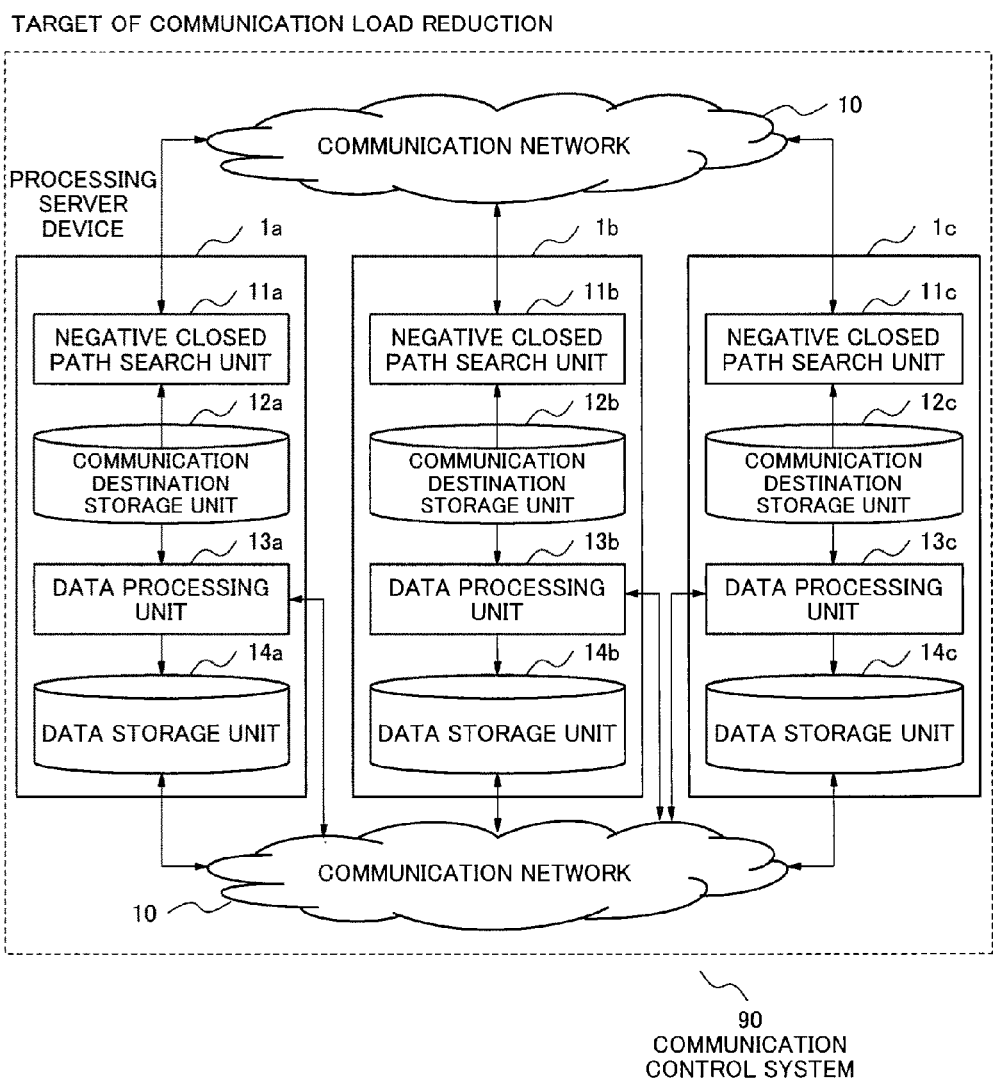
FIG. 1 is a diagram showing a first exemplary configuration of a communication control system 90.

FIG. 1 indicates a first exemplary configuration of a communication control system 90 according to this exemplary embodiment. The communication control system 90 includes processing server device 1 which are a plurality of computers and the like connected to a communication network 10. Meanwhile, when each device is distinguished, each device is referred to by a symbol such as 1a, 1b and 1c. The same applies to the components in the devices.

Each processing server device 1 includes a data storage unit 14, a data processing unit 13, a communication destination storage unit 12 and a negative closed path search unit 11. The data storage unit 14 is storing data to be input for data processing by a program or the like, or stores data outputted from data processing.

The data processing unit 13 is a logical device which processes designated data, and, for example, it is a processor which executes a designated program. The data processing unit 13 acquires and processes data stored in a designated data storage unit 14, and outputs the data to a designated data storage unit 14.

A data storage unit 14 in which data acquired or outputted by the data processing unit 13 is stored may be one belonging to the same processing server device 1 or one belonging to a different processing server device 1. For example, a data processing unit 13a may acquire and process data stored in a data storage unit 14b, and store output data in a data storage unit 14c. The communication control system 90 of this exemplary embodiment reduces a communication load that occurs to the communication network 10 among the data processing units 13 and the data storage units 14.

The communication destination storage unit 12 stores the identifier of a processing server device 1 to be a partner of communicating input/output data of processing.

The negative closed path search unit 11 performs a message exchange with the negative closed path search unit 11 of other processing server devices 1, and detects combinations of a processing server devices 1 that stores data and a processing server devices 1 that processes the data, the combination being a combination making a communication load among processing server devices 1 (strictly, among data processing units 13 and data storage units 14) reduced.

In this exemplary configuration, the negative closed path search unit 11 performs processing about the data processing unit 13 and the data storage unit 14 included in a same processing server device 1.

Meanwhile, the data processing unit 13 may perform only one of input of data from the data storage unit 14 and output of data to the data storage unit 14. The processing server device 1 may be equipped with only any one of the data processing unit 13 and the data storage unit 14. That is, the processing server device 1 may be a processing server specialized in data processing, a data server or, a file server specialized in data storage.

Figure 2:
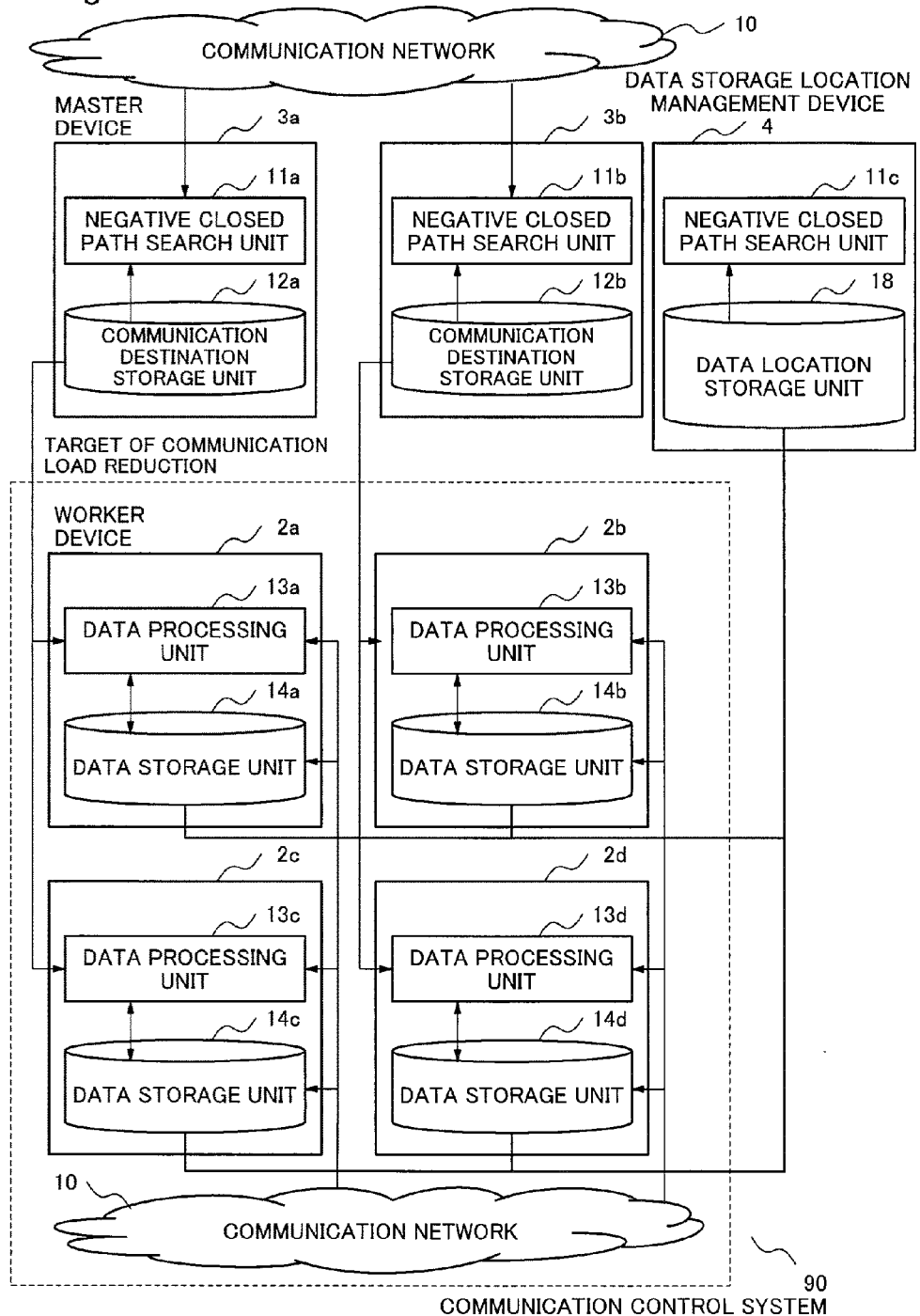
FIG. 2 is a diagram showing a second exemplary configuration of the communication control system 90.

FIG. 2 indicates a second exemplary configuration of the communication control system 90 according to this exemplary embodiment. This communication control system 90 includes a data storage location management device 4, a worker device 2 which is a computer or the like connected to the communication network 10 and a master device 3. Each master device 3 is associated with no smaller than 1, usually a plurality of worker devices 2. The master device 3 and the worker device 2 should simply be associated by system definition information, for example, and do not need to be arranged closely with each other in a view point of such as a network topology and a communication cost.

The worker device 2 includes the data processing unit 13 and the data storage unit 14 mentioned above and sending/receiving data is carried out between the data processing unit 13 of a certain worker device 2 and a data storage unit 14 of the identical or another worker device 2. The worker device 2 may be equipped with only either of the data processing unit 13 or the data storage unit 14, and may be a processing server specialized in processing of data, or a data server, a file server or a storage device specialized in storage of data.

This communication control system 90 makes a communication load that occurs to the communication network 10 among the data processing units 13 and the data storage units 14 (in other words, among worker devices 2) reduced.

The master device 3 includes the negative closed path search unit 11 and the communication destination storage unit 12.

The communication destination storage unit 12 stores, for each worker device 2 associated with the master device 3 including the communication destination storage unit 12 concerned, the identifiers of other worker devices 2 which the worker device 2 concerned should acquire data from or should output data to.

Meanwhile, the negative closed path search unit 11, the communication destination storage unit 12, the data processing unit 13 and the data storage unit 14 of the processing server device 1, the worker device 2 and the master device 3 are formed by a hardware device such as a logic circuit and a storage device. A part or all of each unit may be realized by software carried out by a processor of each device.

The negative closed path search unit 11 performs a message exchange with the negative closed path search unit 11 of the other master devices 3, and detects combinations of worker devices 2 for storing data and worker devices 2 for processing the data, the combination being a combination making a communication load among worker devices 2 (strictly, among a data processing units 13 and a data storage units 14) reduced.

In this exemplary configuration, the negative closed path search unit 11 performs processing about the data processing unit 13 and the data storage unit 14 which are included in one of or a plurality of worker devices 2 having been associated with the master device 3 including the negative closed path search unit 11 concerned.

The data storage location management device 4 includes: a negative closed path search unit 11; and a Data location storage unit 18 storing the identifiers of worker devices 2 that store data corresponding the identifiers and the attributes of the data. In the communication control system 90, the data storage location management device 4 identifies, from the identifier and the attribute of data, worker devices 2 that store the data. The data storage location management device 4 may be a device such as a single computer or the like, or may be a system or the like formed by a plurality of devices.

Figure 5:
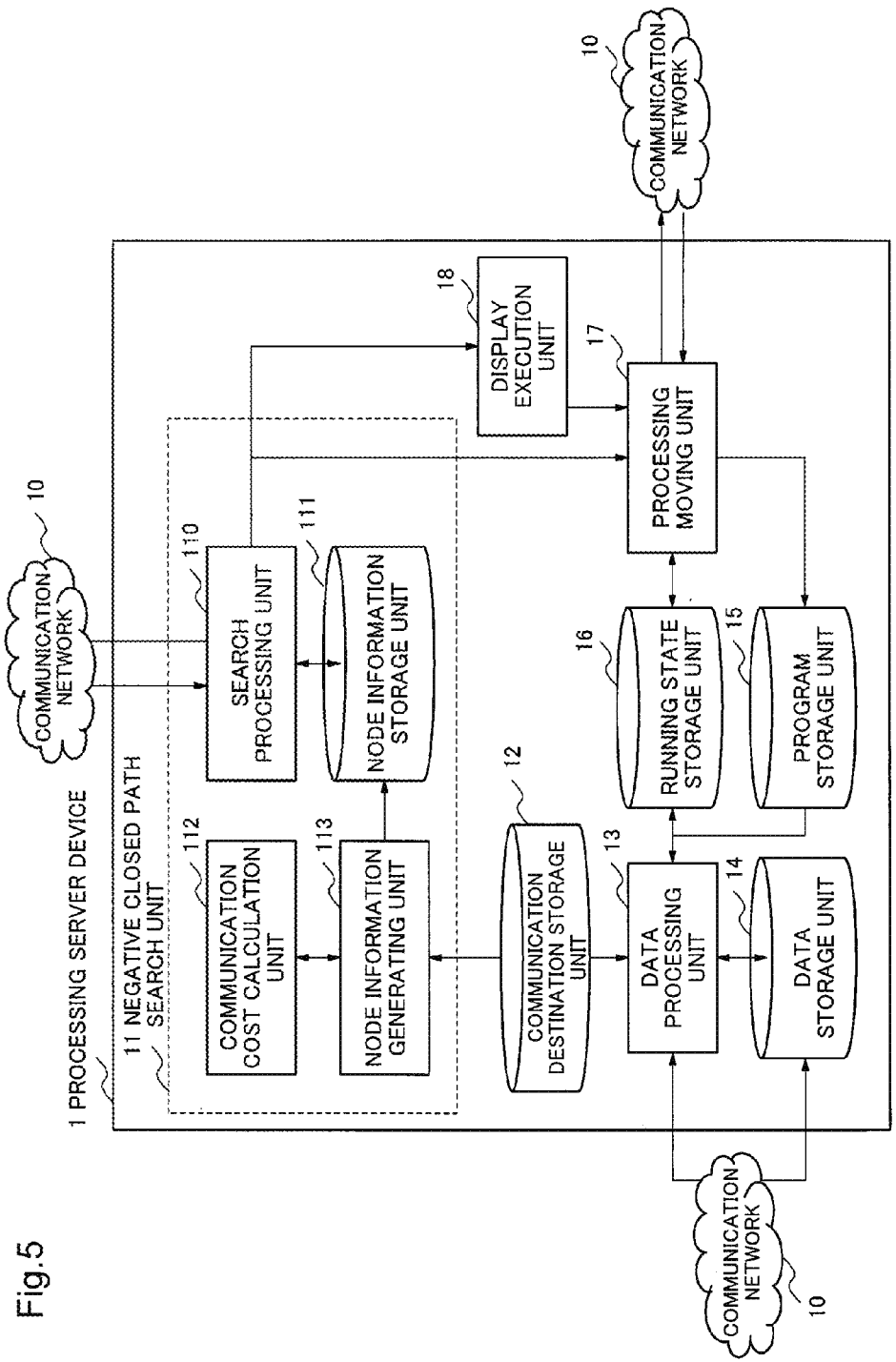
FIG. 5 is a diagram showing a configuration of a negative closed path search unit 11.

FIG. 5 indicates a configuration of the negative closed path search unit 11. The negative closed path search unit 11 includes a node information storage unit 111, a communication cost calculation unit 112, a node information generating unit 113 and a search processing unit 110.

The negative closed path search unit 11 models the communication control system 90 as a communication network which takes the processing server device 1 or the worker device 2 as a node, and performs generation of related information, and so on. When the processing server device 1 or the worker device 2 has the data processing unit 13 and functions as a processing server or the like, the negative closed path search unit 11 models this as a processing node, and when having the data storage unit 14 and functioning as a file server or the like, models this as a data node.

Meanwhile, the negative closed path search unit 11 models the processing server device 1 or the worker device 2 which includes the data processing unit 13 and the data storage unit 14 and functions as a processing server and the like and a data server and the like as two nodes of a data node and a processing node. Accordingly, the negative closed path search unit 11 may handle one processing server device 1 or worker device 2 as one node, or as two nodes.

In the description hereinafter, a message exchange is performed between nodes. When one processing server device 1 or worker device 2 is modeled as more than one node, a message exchange between the nodes is carried out in one processing server device 1 or worker device 2 in a pseudo manner, for example.

Meanwhile, in description of operations of a negative closed path search unit 11 and the like, an expression "relevant node" indicates, in the communication control system 90 shown in FIG. 1, a node made by modeling the processing server device 1 including the negative closed path search unit 11 concerned and the like. In the communication control system 90 shown in FIG. 2, the expression "relevant node" indicates a node made by modeling any one of worker devices 2 corresponding to the master device 3 including the negative closed path search unit 11 concerned and the like.

In the following description, an expression "node in question" indicates a node to be processed in the n-th repetition (n is a number between 1 to the maximum number of repetition) when processing is carried out repeatedly taking in turn each of a plurality of nodes as a processing object.

The node information storage unit 111 stores communication costs between nodes and information on nodes which perform a message exchange.

The communication cost calculation unit 112 calculates a communication cost between two nodes. Meanwhile, when one processing server device 1 or worker device 2 is modeled as two nodes, the communication cost calculation unit 112 may output a communication cost between the two nodes as zero.

The node information generating unit 113 generates information on nodes which perform a message exchange. The search processing unit 110 refers to the information stored in the node information storage unit 111, and performs a message exchange with other nodes.

Meanwhile, although FIG. 5 indicates a configuration in the processing server device 1, the configuration of the negative closed path search unit 11 of the master device 3 is the same. The processing server device 1 or the master device 3 may include a program storage unit 15, a running state storage unit 16, a processing moving unit 17 or a display execution unit 18 that are mentioned later. The program storage unit 15, the running state storage unit 16, the processing moving unit 17 and the display execution unit 18 are formed by a hardware device such as a logic circuit and a storage device. The part or all of the respective units may be realized by software carried out by a processor of each device.

Figure 6:
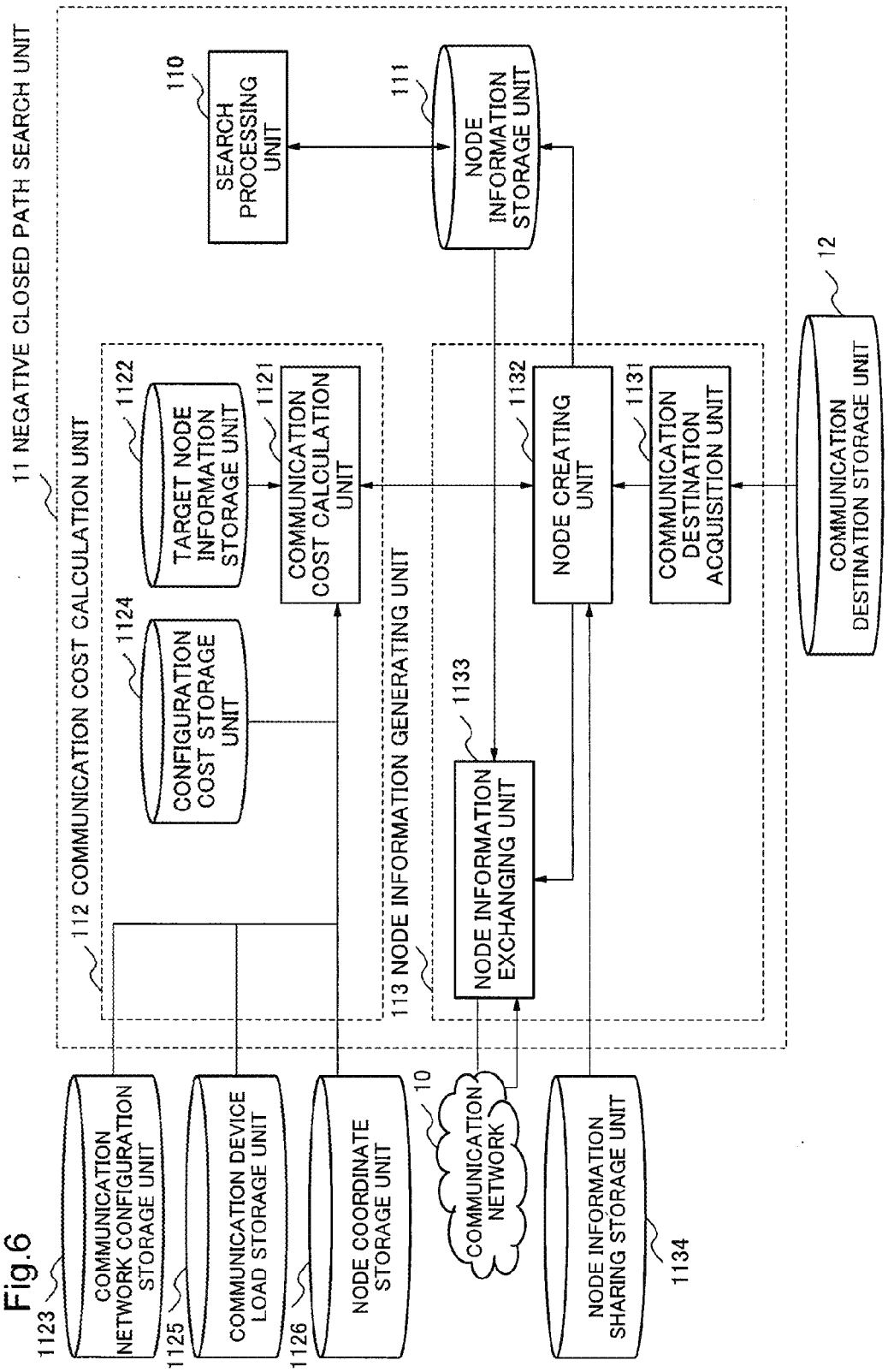
FIG. 6 is a diagram showing a configuration of a communication cost calculation unit 112 and a node information generating unit 113 in the negative closed path search unit 11.

FIG. 6 indicates configurations of the communication cost calculation unit 112 and the node information generating unit 113 in the negative closed path search unit 11.

The node information generating unit 113 includes a communication destination acquisition unit 1131, a node creating unit 1132 and a node information exchanging unit 1133. The communication destination acquisition unit 1131 acquires the identifiers of other nodes which are carrying out or are scheduled to carry out data communication with a relevant node as well as information about a communication usage situation such as its communication capacity (bps) or the total data amount (Bytes).

The node creating unit 1132 acquires information on other nodes related to a relevant node from the communication destination acquisition unit 1131, a node information sharing storage unit 1134 mentioned later and the node information storage unit 111 of the other nodes, and stores in the node information storage unit 111. The node creating unit 1132 further acquires communication costs between nodes from a communication cost calculation unit 1121, and stores in the node information storage unit 111.

Meanwhile, the communication control system 90 may be equipped with the node information sharing storage unit 1134 for sharing node information between a plurality of different nodes. The node information sharing storage unit 1134 is accessible from the node information generating unit 113 and the like.

Referring to FIG. 6, the communication cost calculation unit 112 includes a target node information storage unit 1122, a configuration cost storage unit 1124 and a communication cost calculation unit 1121. The target node information storage unit 1122 stores information about other nodes which are targets of communication load reduction by the negative closed path search unit 11. The communication cost calculation unit 1121 calculates a communication cost between a relevant node and another node.

A communication cost between nodes is a numerical value which indicates a degree that an administrator or the like of the communication control system 90 wants to avoid communication between the nodes. A communication cost generally is, but not limited to, a small communication capacity, a large transmission delay, bad communication quality and high communication expenses and the like. A calculation method of those is not also limited in particular.

One method uses connection information between a node and a switch in the communication network 10. The communication cost calculation unit 1121 refers to a communication network configuration storage unit 1123 and a configuration cost storage unit 1124 to calculate a communication cost. Here, the communication network configuration storage unit 1123 stores connection information between a node and a switch, and the configuration cost storage unit 1124 stores a static cost according to a connection relationship, example of which including a case where a cost between nodes is determined as 2 when the nodes are connected to an identical switch.

On the other hand, in order to cope with a communication load that changes dynamically, the communication cost calculation unit 1121 may use a method to calculate a communication cost from the usage band and the buffer length of communication being carried out. In this case, the communication cost calculation unit 1121 refers to communication load information between nodes in the communication network 10 and a communication device load storage unit 1125 which stores connection information about a switch that is engaged in a connection, for example.

The communication cost calculation unit 1121 may calculate a communication cost according to a method using a node coordinate described in non-patent literature 1, which is a method that does not use connection information between nodes. This method expresses each node in a virtual Euclidean space of the communication network 10 in order to estimate a communication delay between two nodes by Euclidean distance. The communication cost calculation unit 1121 may refer to a node coordinate storage unit 1126 which stores node coordinates.

Figure 7:
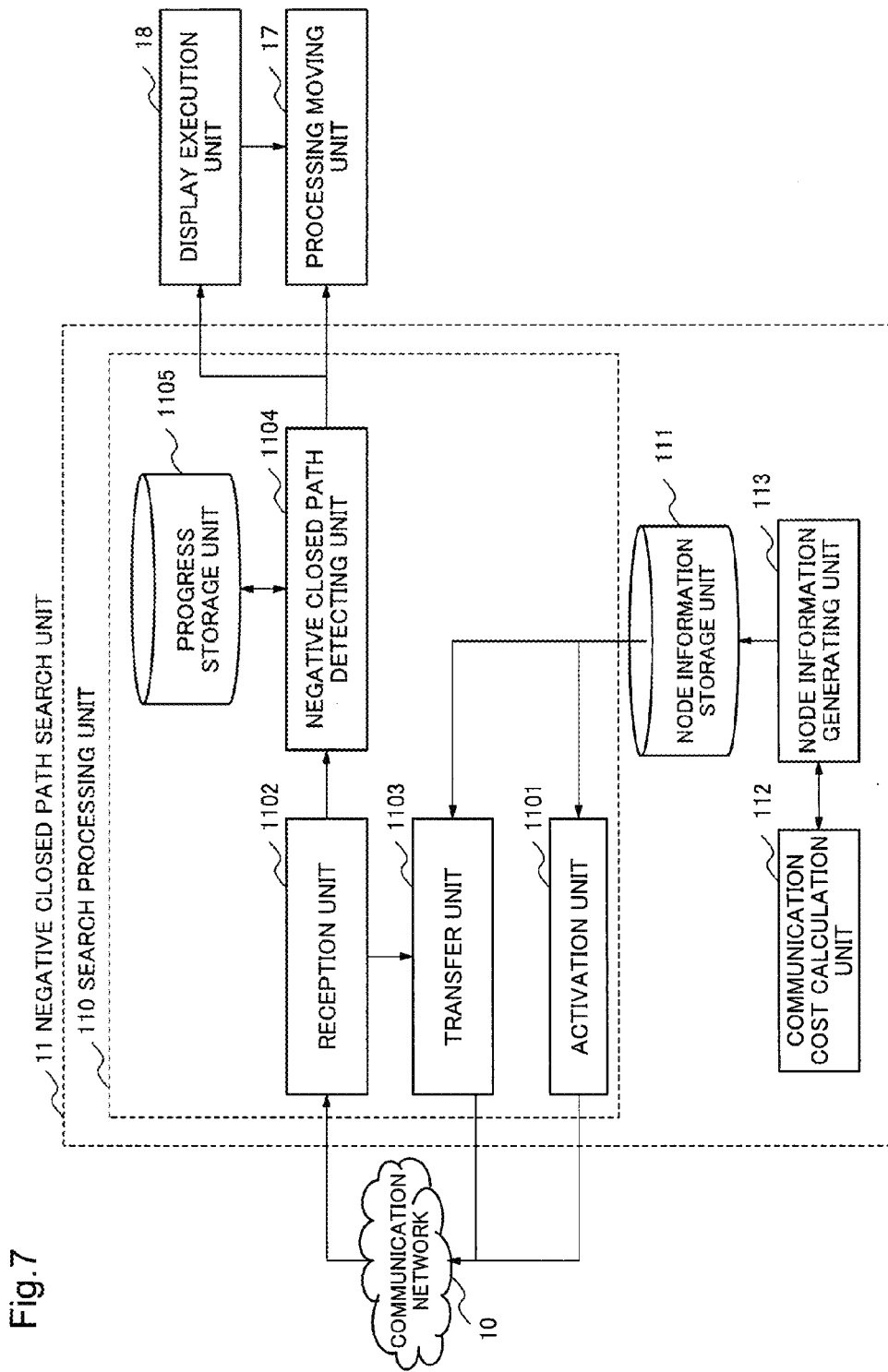
FIG. 7 is a diagram showing a configuration of a search processing unit 110.

FIG. 7 indicates a configuration of the search processing unit 110. The search processing unit 110 searches in a graph of nodes for a closed path for which the total of communication costs attached to edges is negative. The graph is scattered over a plurality of node information storage units 111 of processing server devices 1 or master devices 3. The search processing unit 110 performs a message exchange among a plurality of processing server devices 1 or master devices 3, and searches for a negative closed path.

Referring to FIG. 7, the search processing unit 110 includes an activation unit 1101, a reception unit 1102, a transfer unit 1103, a progress storage unit 1105 and a negative closed path detecting unit 1104.

The activation unit 1101 determines whether a local communication load of a relevant node exceeds a fixed threshold value which has been given in advance and so on. The transfer unit 1103 updates the cost that has been recorded on a message to be exchanged between nodes, and performs determination of to which of other nodes the message is transmitted. The progress storage unit 1105 stores search result received from other nodes.

The reception unit 1102 accepts search information from other nodes and outputs the search information to the transfer unit 1103 or the negative closed path detecting unit 1104 according to its type.

The negative closed path detecting unit 1104 tallies search results, detects a closed path where the total of its costs is negative in the graph among the nodes made by modeling a communication usage situation and availability of processing server devices 1 or worker devices 2, calculates its total cost and its possible communication change amount, and outputs these to the processing moving unit 17 and the display execution unit 18 and the like.

Here, the processing moving unit 17 and the display execution unit 18 are included in the processing server device 1 or the master device 3 in a manner being located outside the negative closed path search unit 11, for example (refer to FIG. 5).

The processing moving unit 17 identifies processing server devices 1 or worker devices 2 that perform a start or a move of processing based on closed path (such as a sequence of the identifiers of nodes) information which the negative closed path detecting unit 1104 outputs, and directs a start, a change or the like of data processing to the processing server devices 1 or the worker devices 2. The processing moving unit 17 may transmit processing programs to processing server devices 1 or worker devices 2 which begin new processing, and direct it to perform installation, dynamic loading and deployment of the programs.

Transmission of programs is needed when programs executed by the data processing unit 13 in order to process data are programs given by a user, not programs deployed to all processing server devices 1 or worker devices 2 in advance. The program storage unit 15 may store received programs temporarily.

Directions to be issued to processing server devices 1 or worker devices 2 to start and change data processing, and deployment of programs to processing server devices 1 or worker devices 2 may be carried out by an operator or the like of the communication control system 90 to each processing server device 1 or worker device 2. In this case, the display execution unit 18 and the like shows closed path information having been outputted by the negative closed path detecting unit 1104 to outside.

The running state storage unit 16 is needed when processing execution of the data processing unit 13 is being performed with states. On the occasion of moving processing to another data processor 1 or worker device 2, the data processing unit 13 or the processing moving unit 17 uses the running state storage unit 16 as a temporary storage of the states. Meanwhile, in the communication control system 90 of FIG. 2, the program storage unit 15 and the running state storage unit 16 may be included in either the master device 3 or the worker device 2.

Figure 21:
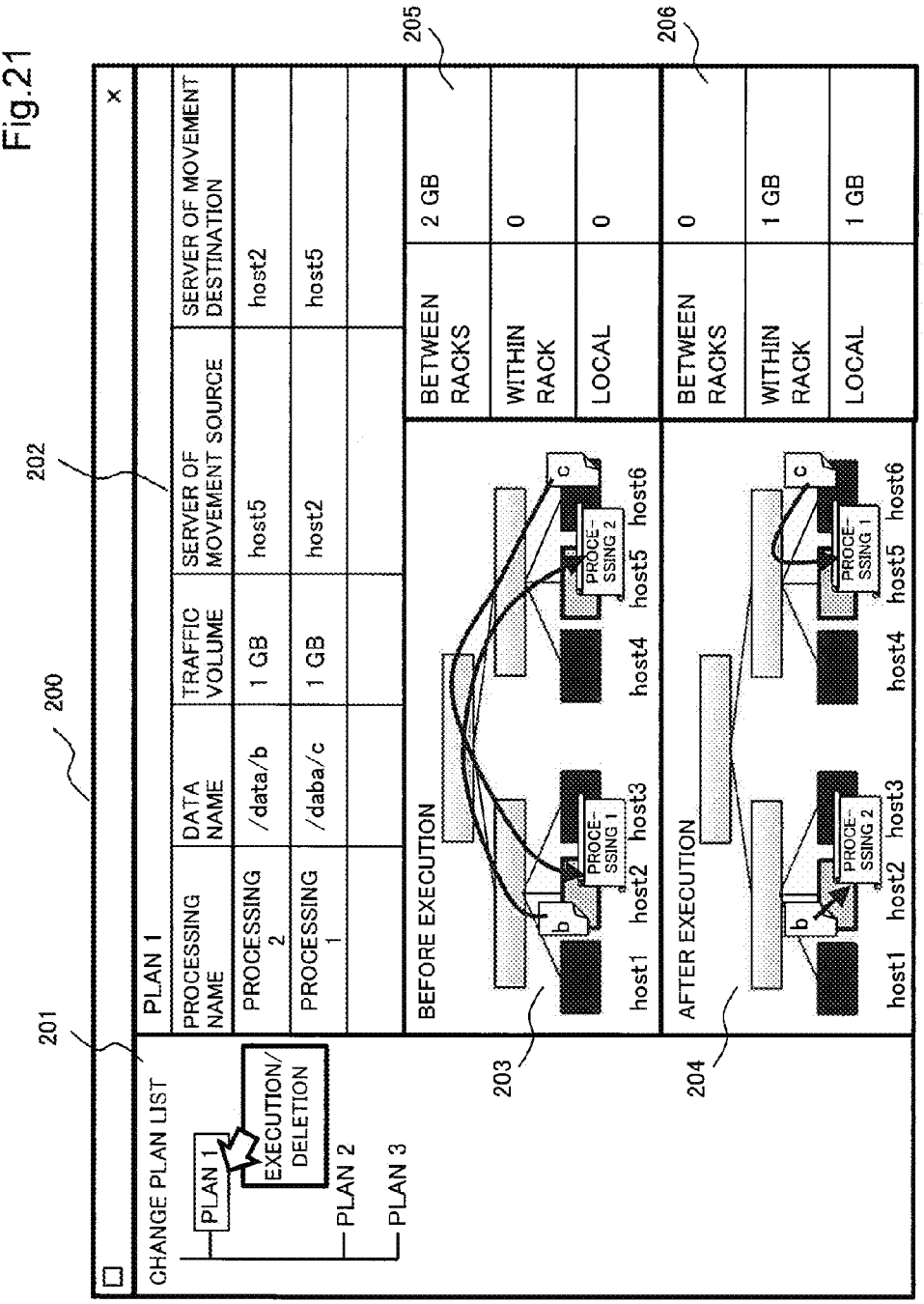
FIG. 21 is a diagram showing an example of a display screen 200 outputted by a display execution unit 18.

FIG. 21 indicates an example of a display screen 200 which the display execution unit 18 outputs. In this example, the display execution unit 18 shows an allocation plan of processing which reduces the total communication cost to a system administrator or the like based on output information of the negative closed path detecting unit 1104.

For example, this display screen 200 includes a change plan list 201, a detailed display screen 202 and a visualization screen. The change plan list 201 indicates a list of detected allocation change plans of processing. About a specific plan, the detailed display screen 202 indicates a processing name, a data name and a traffic volume of the change plan as well as a server device of the movement source and a server device of the movement destination. A visualization screen indicates a system configuration and a traffic volume before and after carrying out a change about the specific plan.

When a change plan shown is judged to be proper, a system administrator or the like inputs a change acknowledgement instruction about that to the processing server device 1 or the like. The display execution unit 18 accepts the instruction, and issues a change implementation instruction to the processing moving unit 17.

The display screen 200 may include a display of a negative closed path (FIG. 38, for example) which the negative closed path detecting unit 1104 has detected. In this case, a system administrator or the like looks at the display screen 200, and inputs a directive command of such as start of data processing and installation of programs to each processing server device 1, the master device 3 or the worker device 2.

Figure 3:
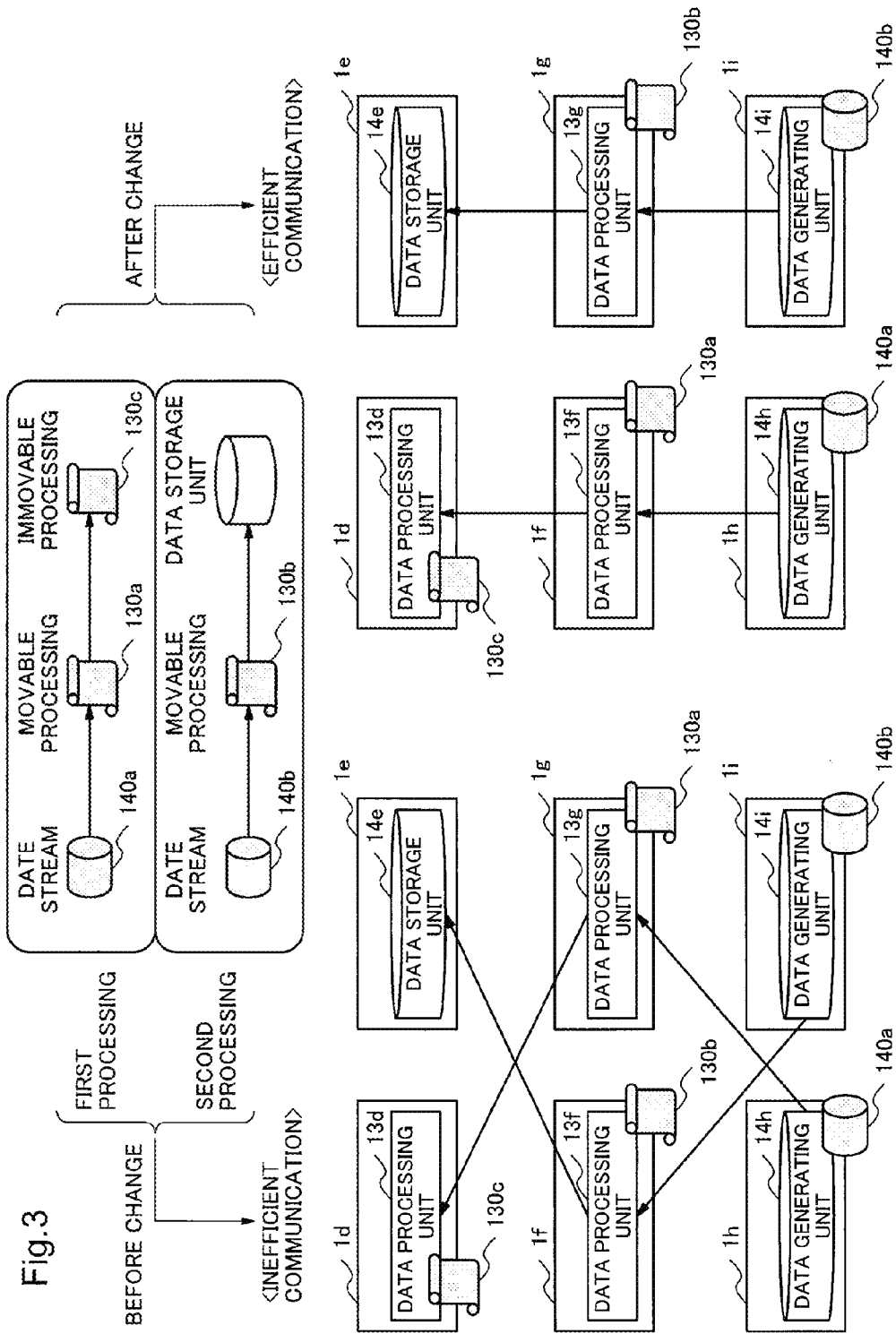
FIG. 3 is a diagram showing a first example of a communication change and an allocation change of processing carried out in the communication control system 90.
Figure 4:
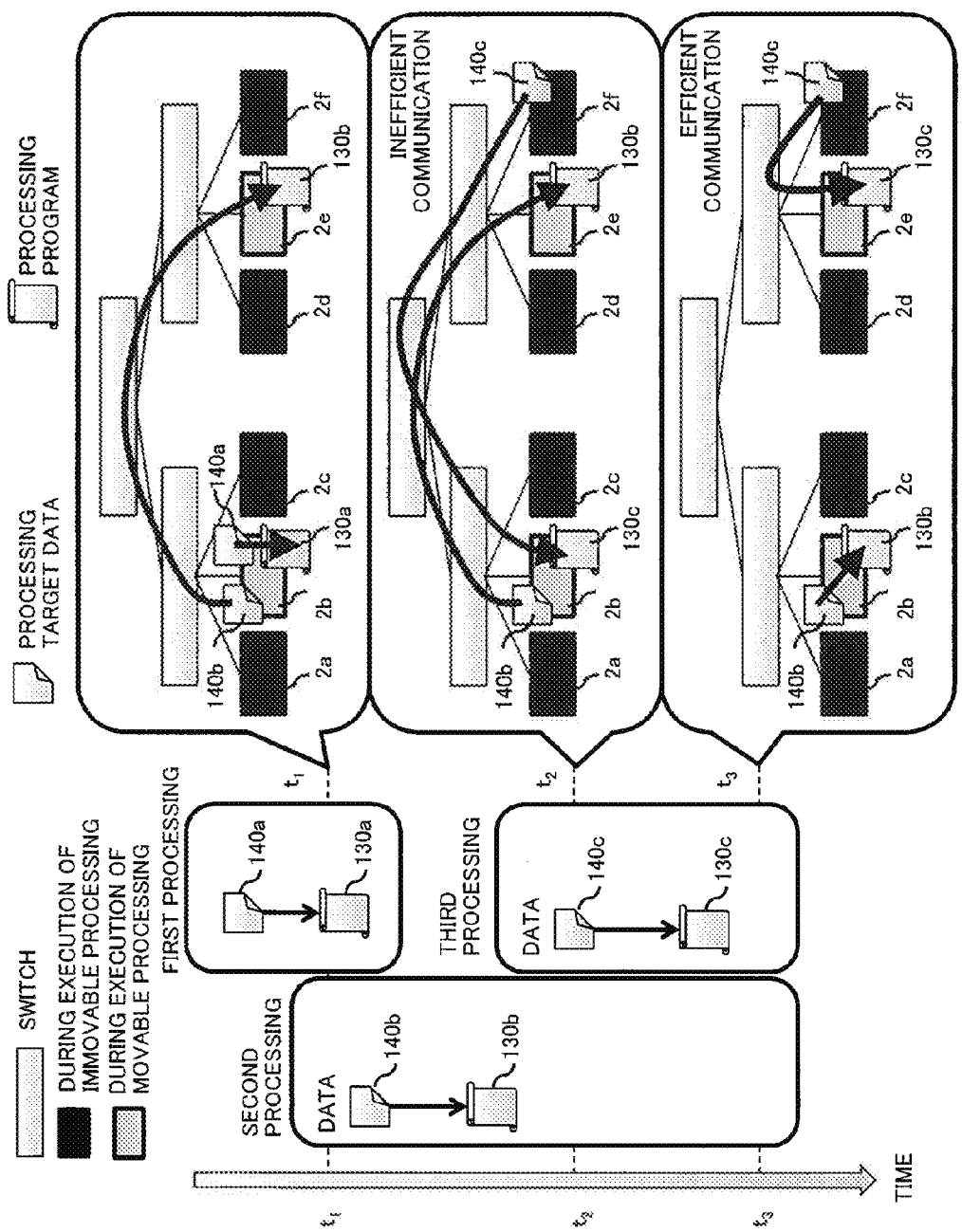
FIG. 4 is a diagram showing a second example of a communication change and an allocation change of processing carried out in the communication control system 90.

FIG. 3 and FIG. 4 indicate an example of a communication change and allocation change of processing carried out by the communication control system 90 according to the present invention. This change reduces a communication cost among processing server devices 1 or worker devices 2 in the communication control system 90. FIG. 3 is a diagram about stream processing by the processing server devices 1, and FIG. 4 batch processing by the worker devices 2.

A stream processing is processing in which data of a certain amount per unit time is put in to a computer or the like operating by a program, and the processing is carried out on a steady basis. A batch processing is processing in which data with a specific data amount is assigned to a computer or the like, and it ends when processing of that volume has been executed.

FIG. 3 indicates a situation that detailed connection relationships among processing server devices 1 are not clear. However, communication delay indicated by the length of an arrow of FIG. 3 occurs to this communication control system 90.

The communication control system 90 of FIG. 3 is carrying out first processing and second processing. In the first processing, a data stream 140*a* occurs in a processing server device 1*h*, and movable processing 130*a* processes this, and hands the result to a processing server device 1*d* that is carrying out processing 130*c*. The processing 130*c* cannot be carried out by another processing server device 1.

Second processing is processing in which a data stream 140*b* occurs in a processing server device 1*i*, and movable processing 130*b* processes this, and stores the result in a data storage unit 14*e* in a processing server device 1*e*.

In FIG. 3, the utilizing state in which the data processing 130*b* exists in a processing server device 1*f*, and the data processing 130*a* exists in a processing server device 1*g* is not an efficient communication state. After this, the communication control system 90 carries out an allocation change of processing so that the data processing 130*b* may be carried out in the processing server device 1*g*, and the data processing 130*a* may be carried out in the processing server device 1*f*. Therefore, the communication control system 90 can use communication efficiently.

The communication control system 90 of FIG. 4 is carrying out only the first processing first. In the first processing, processing 130*a* is carried out to data 140*a* stored in a worker device 2*b*. This processing 130*a* is being carried out in the worker device 2*b* closest to the worker device 2*b*.

Next, the communication control system 90 begins the second processing as of t1. In the second processing, processing 130*b* is carried out for different data 140*b* stored in the worker device 2*b*. This processing 130*b* is carried out in different worker device 2*e*, for example.

After the first processing has ended, the third processing in which processing 130*c* processes data 140*c* stored in a worker device 2*f* is begun as of t2. The processing 130*c* is assigned to the worker device 2*b* which was used by the first processing, for example. At that time, the communication control system 90 performs two flows of communication via the switch of the upper row, and thus it is not an efficient communication state.

After this, as of t3, the communication control system 90 carries out an allocation change of processing, and carries out the processing 130*b* in the worker device 2*b*. As a result, the processing 130*b* will be in the state that data on the same worker device 2*b* is processed. Also, the communication control system 90 changes so that the processing 130*c* may be carried out in the worker device 2*e*, and data 140*c* on the worker device 2*f* which is connected with the identical switch may be processed.

Next, referring to flow charts of FIGS. 8A to 12 and tables of FIG. 13 and FIG. 19, operations of the communication control system 90 of this exemplary embodiment are described. In this exemplary embodiment, the search processing unit 110 searches for a closed path where a total cost is negative by flooding.

In this exemplary embodiment, devices which carry out a procedure shown by the flowcharts are processing server devices 1*a*-1*c* and the like in the configuration of FIG. 1, and master devices 3*a*-3*b* and the like in the configuration of FIG. 2. Target nodes which are processed by a procedure described here is the processing server devices 1 in the configuration of FIG. 1, and worker devices 2*a*-2*d* and the like managed by the master devices 3 in the configuration of FIG. 2.

Each processing server device 1 and worker device 2 will be a processing target as processing nodes 1aP-1cP and the like made by modeling the data processing units 13*a*-13*c* and the like and data nodes 1aD-1cD and the like made by modeling the data storage units 14*a*-14*c* and the like.

Figure 8A:
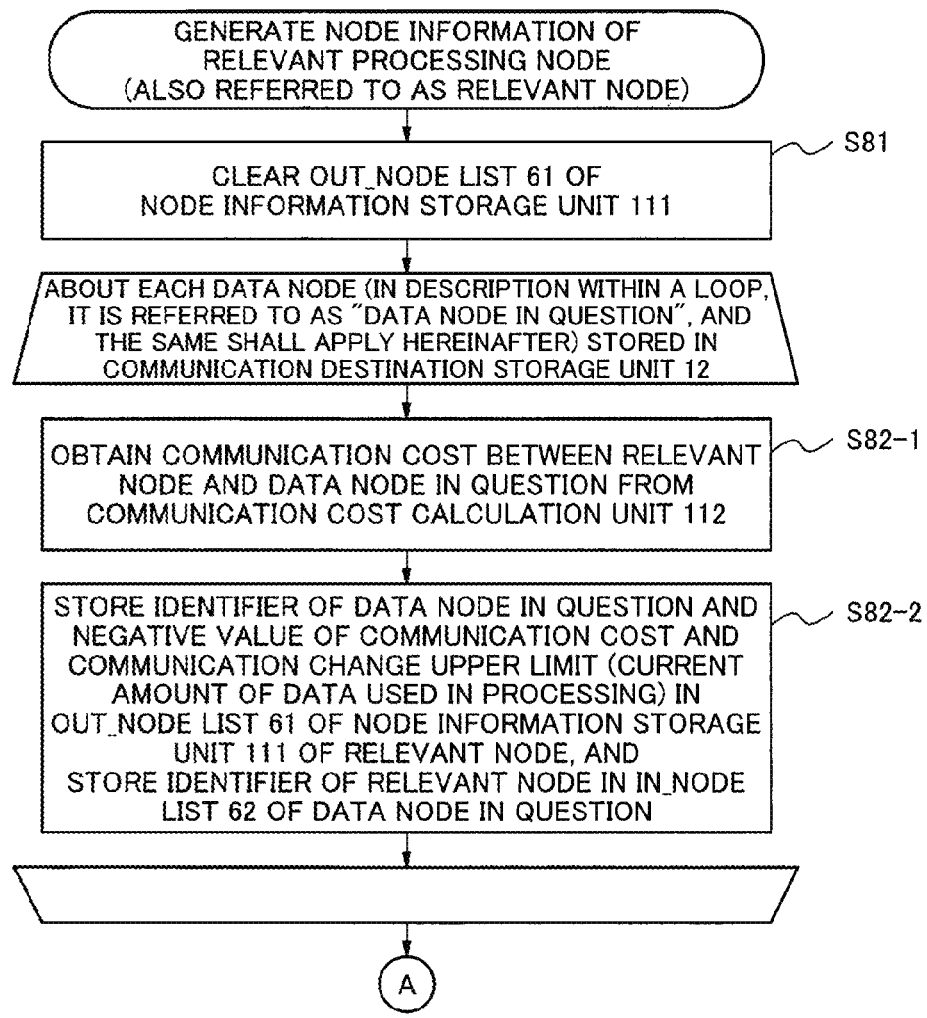
FIG. 8A is an operation flowchart (1) of a node creating unit 1132 in the node information generating unit 113.
Figure 8C:
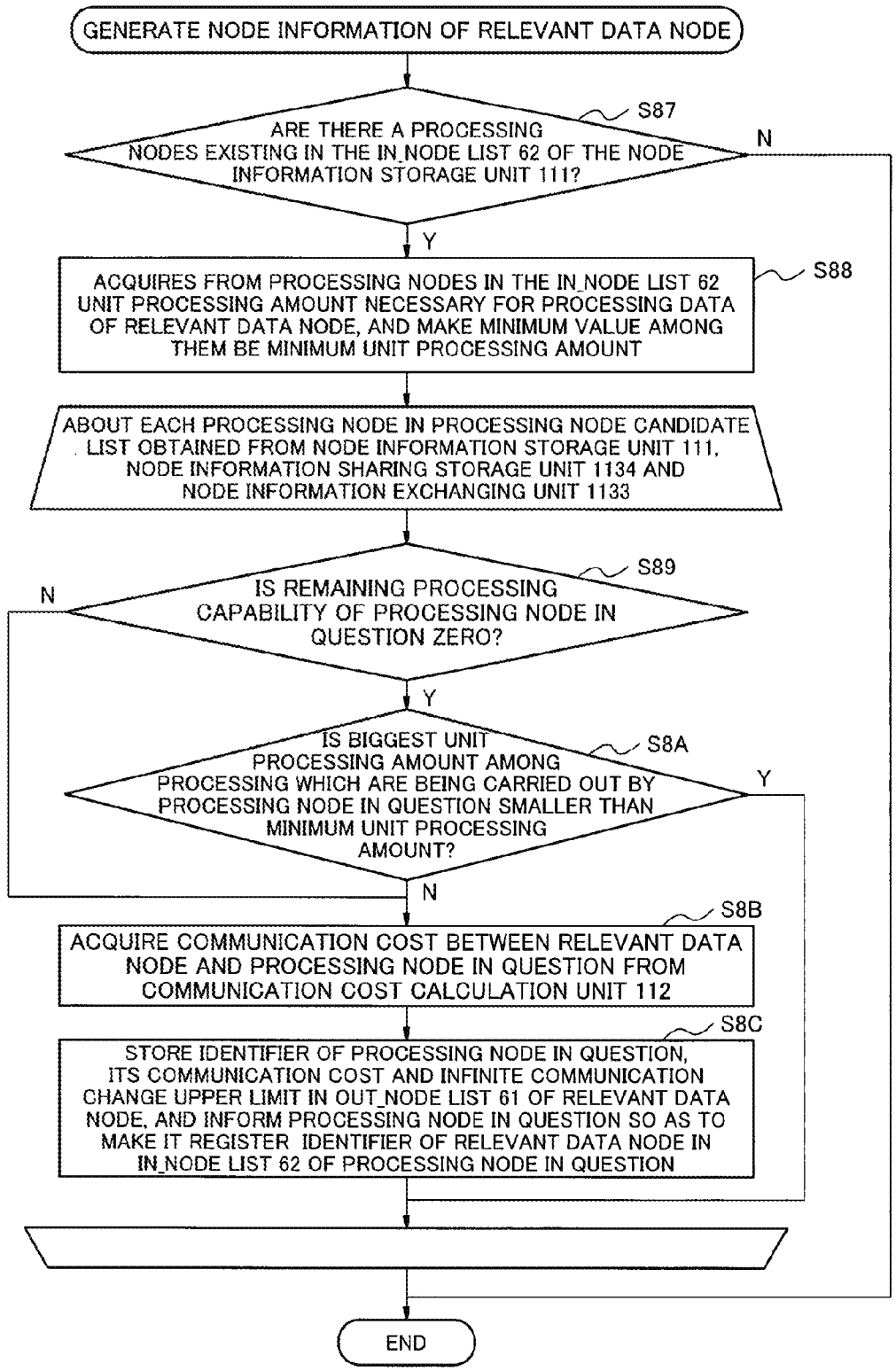
FIG. 8C is an operation flowchart (3) of the node creating unit 1132 in the node information generating unit 113.

FIGS. 8A to 8C are operation flowcharts of the node creating unit 1132 in the node information generating unit 113. The node creating unit 1132 generates a directed link between nodes. Specifically, the node creating unit 1132 creates an out_node list 61 into the node information storage unit 111 of a certain node, and creates an in_node list 62 in the node information storage unit 111 of a node linked to the relevant node.

The node information storage unit 111 exists for each node. Accordingly, when the processing server device 1 or the worker device 2 functions as a processing node as well as a data node, the processing server device 1 or the master device 3 has two node information storage units 111 for the processing node and for the data node. The same applies to the progress storage unit 1105 and a route storage unit 1106.

FIG. 19 indicates a data configuration of the node information storage unit 111. A node information storage unit 111 includes an out_node list 61, an in_node list 62, a processing node candidate list 63 and a node count 64.

The out_node list 61 is a list of endpoint node (out_node) information on a link (outgoing line) having the relevant node as a starting point. The out_node list 61 includes three pieces of data for each out_node: the identifier of the node; a communication cost to the node; and a communication change upper limit.

The in_node list 62 is a set of starting point node (in_node) information on a link (incoming line) which takes the relevant node as the end point. The in_node list 62 includes the identifier of a node for each in_node.

The processing node candidate list 63 is an identifier list of candidates for processing nodes to be listed in the out_node list 61 and the in_node list 62. The processing node candidate list 63 may be a list of all processing nodes capable of communication, which are included in the communication control system 90. The node count 64 includes a numerical value which is regarded as the total number of nodes belonging to the communication control system 90.

The processing node candidate list 63 and the node count 64 may be given in advance. Or, the node creating unit 1132 or the like may generate those from information in the node information sharing storage unit 1134, information in the node information storage unit 111 of other nodes or information which the search processing unit 110 has acquired by a message exchange with other nodes. In this case, the node creating unit 1132 or the like takes the number of identifiers of all acquired nodes as the node count 64, and registers nodes that are processing nodes among all the acquired nodes in the processing node candidate list 63, for example.

FIG. 8A and FIG. 8B indicate a procedure which generates for a processing node, links between the relevant processing node and other processing nodes or data nodes. FIG. 8C indicates a procedure which generates for a data node, links between the relevant data node and processing nodes. The procedures of the node creating unit 1132 shown in FIGS. 8A to 8C are examples, and, within one procedure, another procedure may be carried out.

The procedures shown in FIGS. 8A to 8C include a procedure which creates links from a processing node to data nodes and a procedure which creates links from a processing node to processing nodes.

Meanwhile, the node creating unit 1132 or the like initializes the node information storage unit 111 corresponding to the relevant node appropriately before execution of the procedures shown in FIG. 8A and FIG. 8C.

In the procedure of FIG. 8A, the node creating unit 1132 or the like clears the out_node list 61 first (S81).

In the procedure to create links from a processing node to data nodes (S82), the node creating unit 1132 carries out the followings. First, the node creating unit 1132 acquires, from the communication destination storage unit 12, a situation that the relevant processing node (henceforth, referred to as the relevant node) is acquiring data from other nodes and an acquisition plan therefrom. Next, about each data node (in description about processing in this loop, it is called "the data node in question", and the same will be represented hereinafter), the node creating unit 1132 stores the node identifier and the negative value of the communication cost between the data node in question and the relevant node obtained from the communication cost calculation unit 112 into the out_node list 61 of the node information storage unit 111 of the relevant node. Further, the node creating unit 1132 stores the current amount of data used in processing or a planned amount of data to be used in processing, as a communication change upper limit.

Here, a negative value of a communication cost is a numerical value having an absolute value equals to the communication cost and a reversed plus/minus sign. A reason that the node creating unit 1132 stores the negative value of the communication cost in the out_node list 61 is to standardize total cost calculation of a closed path performed by the transfer unit 1103 and the like to addition processing. The node creating unit 1132 may store a communication cost itself in the out_node list 61, and the transfer unit 1103 or the like may calculate a total cost in a closed path by classifying a case in which subtraction should be made and a case in which addition should be performed.

Further, the node creating unit 1132 informs the data node in question so as to make it store the identifier of the relevant node in the in_node list 62 of the node information storage unit 111 of the data node in question. However, in the case of the communication control system 90 shown in FIG. 2, it does not informs each node, but informs a master device 3 associated with each node (henceforth, this notation will be omitted).

Here, "current amount of data used" means that, in stream processing or the like, this processing node is reading data at a certain band (Mbps) from a data node or it is writing data in a data node. Also, "planned amount of data to be used" means that, in batch processing or the like, this processing node has a plan to read a certain data amount (GByte) from a data node after that or it has a plan to write a certain data amount in a data node after that.

Next, when the relevant processing node is carrying out movable processing (in S83, Y), the node creating unit 1132 generates links from the processing node to other processing nodes (S84).

Here, the node creating unit 1132 selects nodes having a remaining processing capability that is not a zero among the processing nodes registered in the processing node candidate list 63 of the node information storage unit 111, and, for each selected processing node, stores the identifier of the processing node in question in the in_node list 62 of the relevant node. The node creating unit 1132 informs the node in question so as to make it store the identifier of the relevant node, a communication cost that is zero and a communication change upper limit that is infinite in the out_node list 61 of the node in question. Here, "infinite" means a numerical value larger than a numerical value possible as a communication change upper limit (traffic volume) of the communication control system 90: a maximum value of an integer which a node can take, for example. It is also similar about other variables.

The node creating unit 1132 may acquire processing nodes from the node information sharing storage unit 1134 or the like, not from the processing node candidate list 63.

Meanwhile, the effect of establishing a link from a processing node to another processing node on such conditions will be described here. In a situation without such links, even if the search processing unit 110 detects a closed route including a route which starts from a certain data node and reaches a different data node via a processing node, and performs change of communication along the route, the traffic volume that the processing node on this route sends and receives will not be changed. Therefore, even if the processing moving unit 17 or the like makes a plurality of changes which reduce a communication cost from the initial state, a communication cost can be minimized only up to a numerical value dependent on the initial state.

Accordingly, the communication control system 90 of this exemplary embodiment has links between processing nodes and detects a negative closed path including routes starting from a data node and reaching a different data node via a processing node and then via a different processing node. By detecting such a negative closed path, the communication control system 90 makes communication between the former data node and the former processing node increase, and communication between the latter processing node and the latter data node decrease, and reduces a communication cost without depending on the initial state.

In order to establish links between processing nodes from such purpose, the node creating unit 1132 generates only links from processing nodes which can still carry out some processing (its remaining processing capability is not zero) to processing nodes being carrying out some processing.

Meanwhile, here, in stead of generating links about pairs of processing nodes which satisfy the above-mentioned requirements, the node creating unit 1132 may set up a virtual node, have links from these virtual nodes to processing nodes having remaining processing capability of non-zero, and have links from these virtual nodes to processing nodes that are carrying out some processing.

Before the end of this processing, the node creating unit 1132 eliminates nodes from the in_node list 62 or the like by reflecting a change of such as communication state after the last time execution (S85 and S86).

The node creating unit 1132 carries out the procedure of FIG. 8C following the processing of FIG. 8A and FIG. 8B, for example.

When there are processing nodes existing in the in_node list 62 of the node information storage unit 111 (in S87, Y), the node creating unit 1132 acquires from the processing nodes in the in_node list 62 a unit processing amount necessary when the processing node in question processes data of the relevant data node, and makes the minimum value among them a minimum unit processing amount (S88).

Further, the node creating unit 1132 performs the following processing about each processing node in the processing node candidate list 63. First, when remaining processing capability of the processing node in question is not zero (in S89, N), or when it is zero and, when the biggest unit processing amount among processing which are being carried out by the processing node in question is not smaller than the minimum unit processing amount (in S8A, N), the node creating unit 1132 acquires a communication cost between the relevant data node and the processing node in question from the communication cost calculation unit 112 (S8B). The node creating unit 1132 stores the identifier of the processing node in question, the communication cost and an infinite communication change upper limit in the out_node list 61 of the node information storage unit 111 of the relevant data node, and informs the processing node in question so as to make it register the identifier of the relevant data node in the in_node list 62 of the processing node in question (S8C).

Meanwhile, the node creating unit 1132 may make a communication change upper limit to be registered here the minimum bandwidth of the communication path between the relevant data node and the processing node in question. In the case of a stream processing, by doing thus, the communication control system 90 can evade plans to perform communication larger than the band of communication paths.

A reason to perform such link generation according to unit processing amount in this procedure will be described. When a remaining processing capability is non-zero, a change plan to perform addition so that the processing node in question may process data of this data node is proper. Also, even in a case where a remaining processing capability is zero, if the load of processing of data from a data node which becomes a candidate of addition is smaller than the load per traffic volume that the processing node in question is currently processing, the addition plan is proper. Accordingly, the node creating unit 1132 generates links so that a change plan can be generated in such case.

Figure 9:
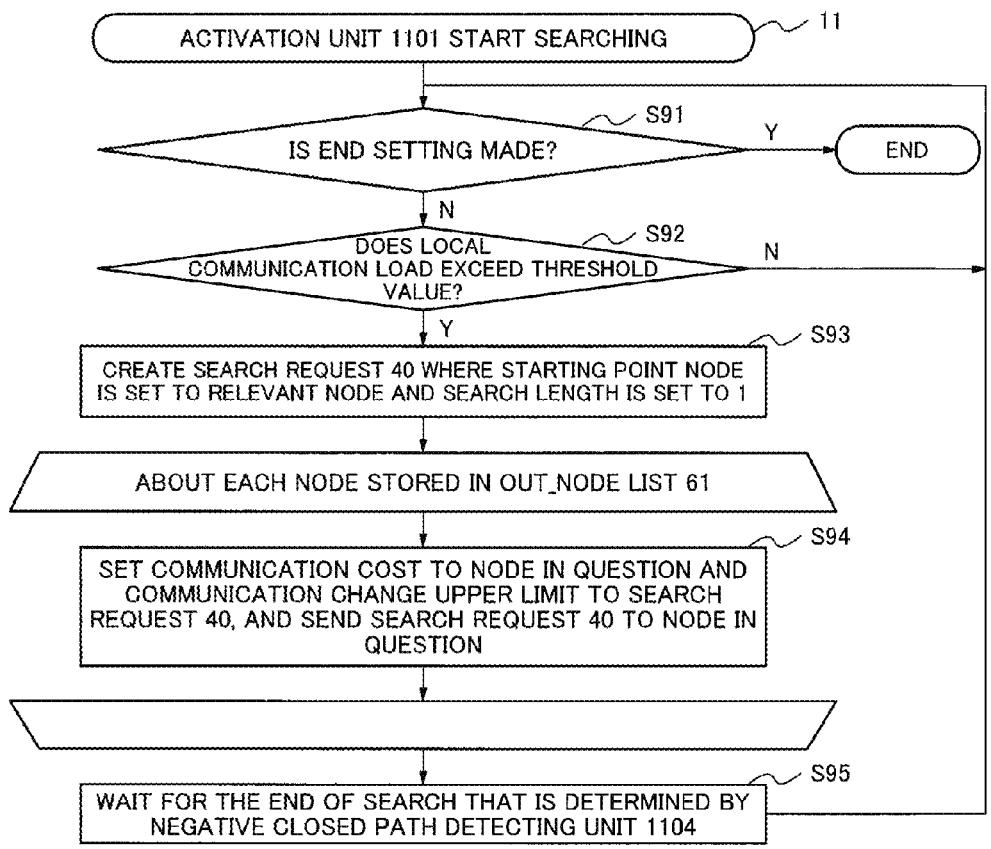
FIG. 9 is an operation flowchart of an activation unit 1101.

FIG. 9 is an operation flowchart of the activation unit 1101. Unless the end setting such as a service end has been set, the activation unit 1101 keeps operating (in S91, N). The activation unit 1101 monitors a local communication load about the relevant node, and, when the local load exceeds a threshold value (in S92, Y), generates a search request 40, while making a starting point node be the relevant node and a search length be 1 (S93).

The activation unit 1101 transmits the search request 40 to each of a plurality of nodes stored in the out_node list 61 of the node information storage unit 111 of this node. At that time, the activation unit 1101 sets the communication cost to the node in question as the total cost of the search request 40, and a communication change upper limit to the node in question as the communication change upper limit, and adds the identifier of the node in question to the node list of the search request 40 (S94). After that, the activation unit 1101 waits for the end of search that is notified of from the negative closed path detecting unit 1104 (S95).

Figure 10:
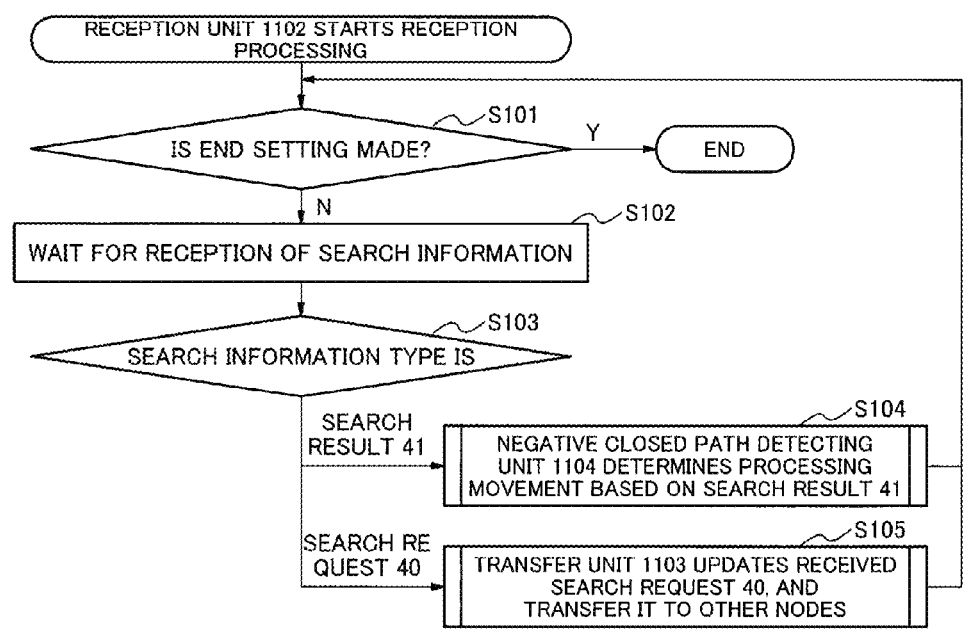
FIG. 10 is an operation flowchart of a reception unit 1102.

FIG. 10 is an operation flowchart of the reception unit 1102. Unless the end setting such as a service end has been set, the reception unit 1102 keeps operating (in S101, N). The reception unit 1102 determines the type of received search information (S103), and, when it is a search result 41, requests processing movement based on the search result 41 to the negative closed path detecting unit 1104 (S104). When it is the search request 40, the reception unit 1102 requests the transfer unit 1103 to update the received search request 40 and transfer it to other nodes (S105).

FIG. 13 indicates the contents of a message exchanged by the reception unit 1102 and the like. The search request 40 includes a starting point node, a node list, a search length, a total cost and a communication change upper limit. The search result 41 includes a node list, a total cost and a communication change upper limit.

The starting point node is the identifier of a node which has generated and sent the search request 40. The node list is a list of the identifiers of nodes on the route (search rout) through which the search request 40 has been transferred. The node list also includes remaining processing capability and a unit processing amount of each node. The search length is the length of the search rout. The total cost is the total of communication costs between nodes existing on the search rout. The communication change upper limit is the minimum value of communication change upper limits corresponding to nodes which exist on the search rout.

Figure 11A:
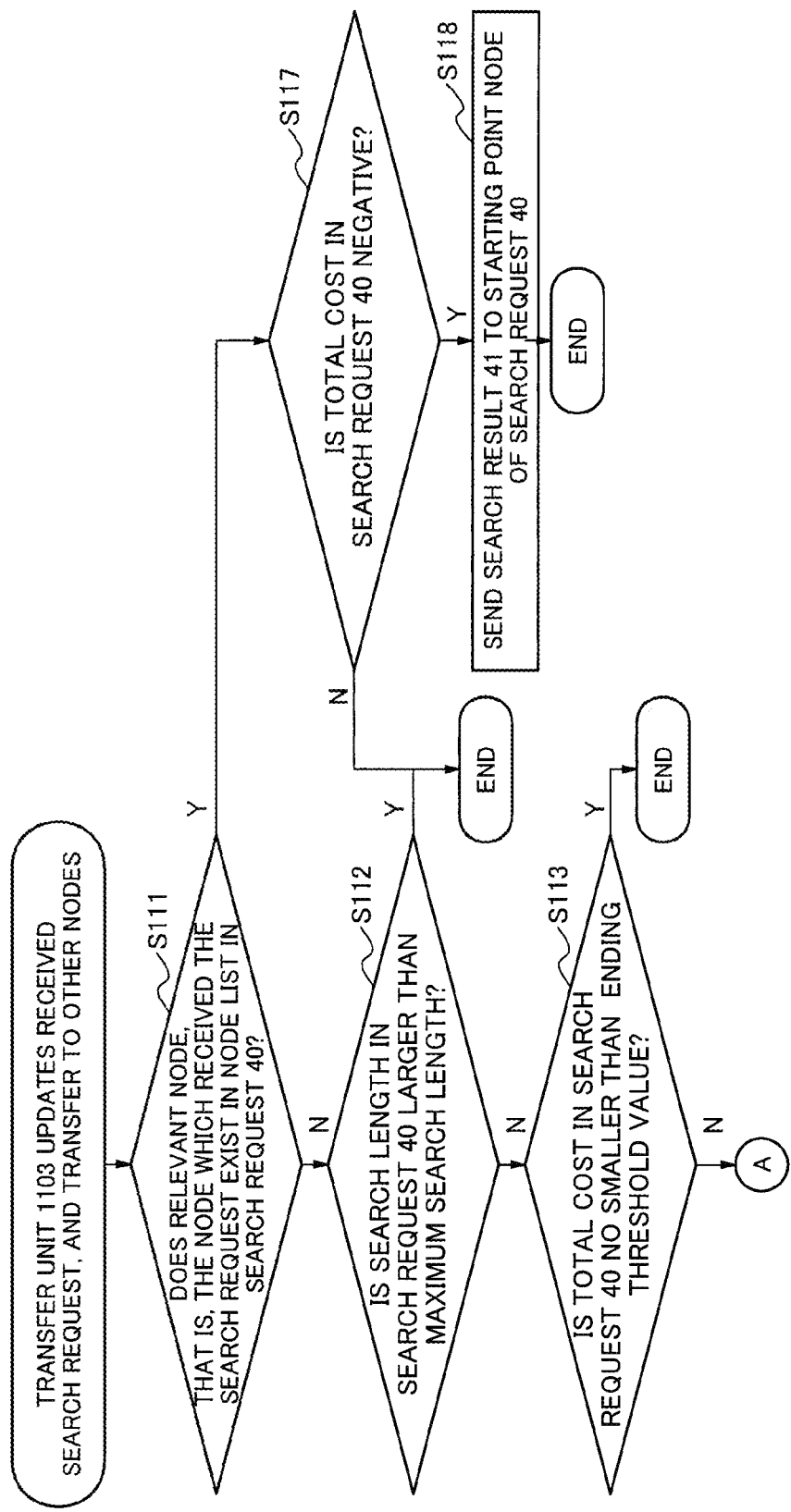
FIG. 11A is an operation flowchart (1) of a transfer unit 1103.

FIG. 11A and FIG. 11B are operation flowcharts of the transfer unit 1103. The transfer unit 1103 confirms whether the relevant node, that is, the node which has received the search request 40, exists in the node list in the search request 40 or not. When existing (in S111, Y), the transfer unit 1103 determines whether the total cost in the search request 40 is negative or not, and, if it is negative (in S117, Y), notifies the starting point node in the search request 40 of the search result 41 (S118). When it is not negative (in S117, N), the transfer unit 1103 ends its operation.

When the relevant node does not exist in the node list of the search request 40 (in S111, N), the transfer unit 1103 determines whether the search length in the search request 40 is larger than a maximum length given in advance, and, when it is larger (in S112, Y), ends its operation.

When the total cost in the search request 40 is no smaller than an ending threshold value given in advance (in S113, Y), the transfer unit 1103 ends its operation. By these conditions, the transfer unit 1103 restricts transmission of the search request 40 in the communication network 10.

When this condition is not satisfied (in S113, N), the transfer unit 1103 performs the following processing about each node of the out_node list 61 of the node information storage unit 111.

The transfer unit 1103 adds the communication cost to the node in question, to the total cost of the received search request 40, adds 1 to the search length, and adds the identifier of the relevant node to the node list. When the relevant node is a processing node, the transfer unit 1103 adds the remaining processing capability and the unit processing amount of the relevant node to the node list. When the communication change upper limit of the node in question is smaller than the communication change upper limit in the search request 40, the transfer unit 1103 updates the communication change upper limit of the search request 40 by the communication change upper limit of the node in question (S114).

After that, when the node in question is the starting point node in the search request 40 (in S115, Y), and the total cost of the search request 40 is negative (in S119, Y), the transfer unit 1103 notifies the starting point node of the search result 41 (S11A). When the node in question is not the starting point node (in S115, N), the transfer unit 1103 transmits the search request 40 to the node in question (S116), and ends its operation.

Figure 12:
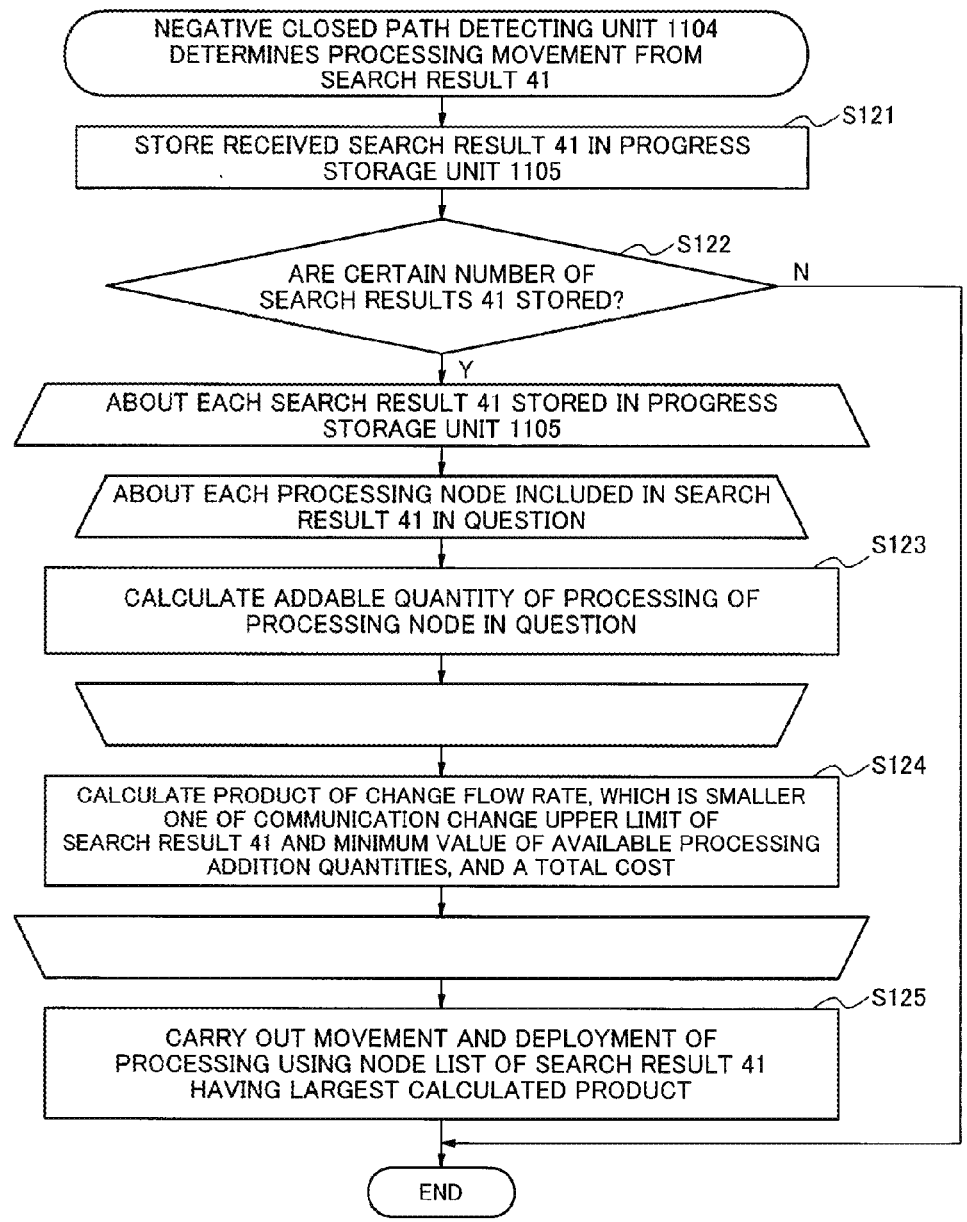
FIG. 12 is an operation flowchart of a negative closed path detecting unit 1104.

FIG. 12 is an operation flowchart of the negative closed path detecting unit 1104. The negative closed path detecting unit 1104 stores the received search result 41 in the progress storage unit 1105 (S121), and, when the amount of the received pieces of search result 41 becomes no smaller than a certain quantity set in advance (in S122, Y), calculates, about each search result 41 stored in the progress storage unit 1105, the product of a change flow rate and a total cost (S123-S124).

First, the negative closed path detecting unit 1104 calculates an addable quantity of processing for each processing node included in the search result 41 in question (S123).

Specifically, first, the negative closed path detecting unit 1104 acquires from the node list of the search result 41 in question a remaining processing capability (P) of the relevant processing node, the minimum value (L2) of unit processing amounts of the relevant processing node and, an unit processing amount (L1) of the data node just before the relevant processing node in the route of the closed path. 1) When the nodes before and behind the processing node in question are data nodes, that is, when the processing node in question reduces a data amount of processing currently executed and processing of new data is added, and when L1≤L2, the negative closed path detecting unit 1104 makes the addable quantity of processing of the processing node in question infinite. In this case, a change amount is not restricted because a processing burden of the processing node in question becomes small. 2) When the nodes before and behind the processing node in question are data nodes, and L1>L2, the negative closed path detecting unit 1104 makes an addable quantity of processing of the processing node in question be P/(L1−L2). In this case, because the processing burden increases by (L1−L2) per unit change amount when the change amount is made large, the change amount is restricted by the remaining processing capability. 3) When the preceding node is a data node, and the succeeding node is a processing node, that is, when a data amount currently processed does not decrease and new data processing is added, the negative closed path detecting unit 1104 makes an addable quantity of processing of the processing node in question be P/L1. 4) When the preceding node is a processing node, that is, when processing of new data is not added, the negative closed path detecting unit 1104 makes the addable quantity of processing of the processing node in question infinite.

A change flow rate is the smaller one of the minimum value among the calculated available processing addition quantities and the communication change upper limit. After the calculation of an addable quantity of processing for each processing node (S123), the negative closed path detecting unit 1104 calculates the product of the change flow rate and the total cost (S124).

Finally, the negative closed path detecting unit 1104 outputs the node list and the change flow rate of the search result 41 having the biggest product of the change flow rate and the total cost to the processing moving unit 17, and requests a movement of processing and deployment of a processing program to the processing moving unit 17 (S125).

The processing moving unit 17 changes the communication destinations of data corresponding to the change flow rate of data nodes included in the closed path indicated by the inputted node lists to the processing nodes just after the data node in question from the processing node just before the data node in question in order of the transfer route. For this reason, the processing moving unit 17 notifies data nodes and processing nodes which will be change targets of change requests and so on, and transmits programs to processing nodes which perform new processing.

Meanwhile, the negative closed path detecting unit 1104 may output the node list and the change flow rate of the search result 41 having the biggest product of the change flow rate and the total cost to the display execution unit 18, and make the display unit indicate it to an operator or the like as a desirable deployment change.

In the communication control system 90 carrying out a plurality of data processing which a plurality of nodes (the processing server devices 1 or the worker devices 2) conduct while communicating data with each other, the communication control system 90 of this exemplary embodiment enables to reduce the communication load of the plurality of data processing as a whole.

The reason of this is that the search processing unit 110 or the like detects a closed path of communication paths of nodes where the total cost will be negative, and outputs the negative closed path (a sequence of the identifiers of nodes in order of the route). The negative closed path can include a plurality of sets of data nodes and processing nodes which are communicating data. The processing moving unit 17 or an operator or the like of the communication control system 90 is capable of processing allocation change which reduces the total of communication cost extending over a plurality of communication based on the output. In particular, the communication control system 90 of this exemplary embodiment can perform flexible allocation changes of processing of such as moving the first processing from the processing node carrying out the first processing to another node, and makes the former node carry out the second processing newly.

Further, this change plan satisfies operation restrictions such as processing all data which should be processed, or not assigning data processing beyond the processing capability of the processing server device 1. Accordingly, this change of processing arrangement does not have an influence on processing itself for which an execution instruction has been received from outside.

Also, when executing the load reduction, the communication control system 90 of this exemplary embodiment makes it easy to avoid specific computers and devices from becoming a bottleneck in a view point of rapidity and reliability of negative closed path detection processing and the like.

The reason of this is that the communication control system 90 detects the negative closed path mentioned above, not by gathering utilization information on communication of the whole system to specific computers, but by referring to a utilizing state of communication which is stored in different nodes in a distributed manner while exchanging messages such as the search request 40.

The Second Exemplary Embodiment

The communication control system 90 according to this exemplary embodiment detects a negative closed path based on the dynamic programming. An optimization algorithm by which a negative closed path with the smallest communication cost is identified is NP-hard for the number of nodes. On the other hand, the theorem of Karp teaches that an algorithm for identifying a negative closed path having the smallest average cost ends in a polynomial time. The theorem of Karp is based on the principle of the following formula.

$$M = \min_{v \in V} \max_{k=1 \sim N-1} (dN(v) - dk(v))/(N - k) \qquad (1)$$

where M is the minimum average cost, N is the number of nodes, V is a set of nodes, dk (v) is the minimum cost among the costs of the routes (Walks) which start from a certain node and reach node v by k hops, and dN (v) is the minimum cost among costs of the routes which start from a certain node and reach node v by N hops.

Meanwhile, the optimal solution is obtained by carrying out removal of a negative closed path having the minimum average cost a polynomial number of times.

The communication control system 90 of this exemplary embodiment carries out optimization processing for reducing communication load among the data storage units 14 and the data processing units 13 without concentrating the processing on specific processing server devices 1 or master devices 3. That is, in stead of a single computer or the like carrying out the whole optimization processing sequentially based on the above-mentioned theorem, it is carried out dispersively by a plurality of processing server devices 1 or master devices 3 which operate asynchronously from each other while exchanging communication messages with each other.

Figure 14:
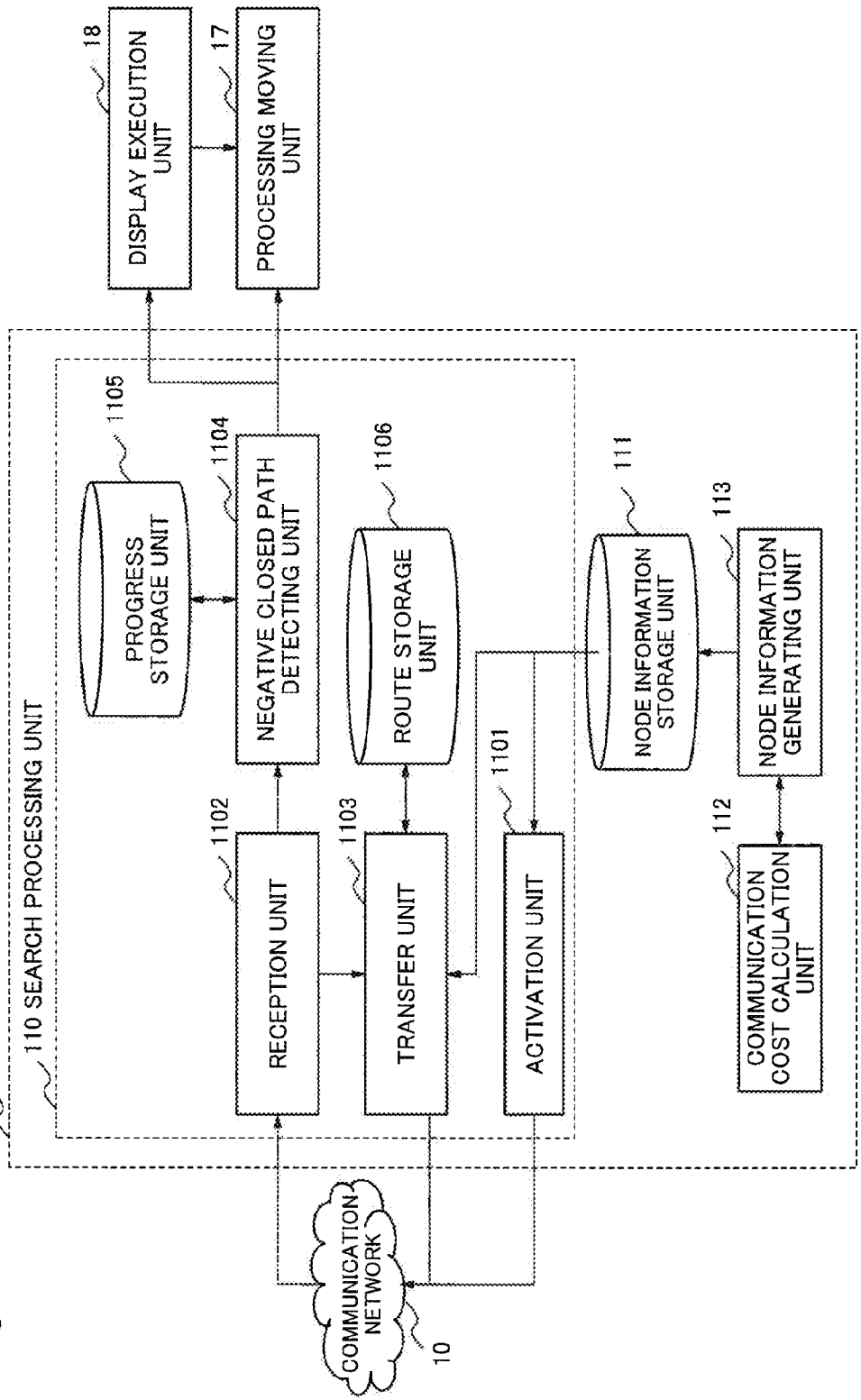
FIG. 14 is a diagram showing a configuration of the negative closed path search unit 11 of a second exemplary embodiment.

FIG. 14 indicates a configuration of a negative closed path search unit 11 of the second exemplary embodiment. A search processing unit 110 of this exemplary embodiment includes an activation unit 1101, a reception unit 1102, a route storage unit 1106, a transfer unit 1103, a progress storage unit 1105 and a negative closed path detecting unit 1104.

The activation unit 1101 performs processing similar to that of the first exemplary embodiment. The reception unit 1102 receives a message for searching for a negative closed path from other processing server devices 1 or master devices 3. The route storage unit 1106 stores a total cost, which is the total of the communication costs along a message transfer route from a starting point node which is a node which starts the search, for each of search lengths which are the numbers of hops from the starting point node.

The transfer unit 1103 performs a message exchange for updating the total cost for the relevant node based on the total cost of a different node and a communication cost between the relevant node and the different node. In order to tally the results of a plurality of searches carried out in parallel and dispersively, the progress storage unit 1105 stores progress information temporarily. From a plurality of pieces of the stored progress information, the negative closed path detecting unit 1104 determines a route that is effective for load reduction when change is made.

FIG. 18 indicates the contents of a message exchanged in this exemplary embodiment. There exist three kinds of the search request 40 of: a notification; a request; and a reply. The search request 40 (notification) includes a starting point node, a node count, a search length, a total cost and a route_node. The search request 40 (request) includes a starting point node, a node count and a search length. The search request 40 (reply) includes a search length, a total cost and a route_node.

Here, a route_node is information about a node which the search request 40 reached just before it reached the relevant node, and includes the identifier of the node, a type (distinction of a data node/a processing node), a communication change upper limit, a unit processing load and remaining processing capability.

The search result 41 includes a search length, the maximum value of average costs and a route_node list. A route_node list is a list of route_nodes for each search length.

FIG. 20 indicates route information stored in the route storage unit 1106. The route storage unit 1106 stores the route information for each search length k from 1 to N of the number of nodes. The route information for search length k includes total cost dk, a fixedness state, a route_node, in_node states and out_node states.

Here, a fixedness state shows whether the total cost for the search length concerned has been fixed or unfixed. The initial value of a fixedness state indicates "unfixed". An in_node state indicates a state of each in_node of the relevant node and an out_node state indicates a state of each out_node of the relevant node. A state represents whether a link between the two nodes has been traced (Done), or not yet traced (Undone: the initial value), or on its way to be traced (Requesting).

Meanwhile, N of the number of nodes is set to each node in advance, or is set to a storage device or the like shared by each node in advance. N of the number of nodes may be stored in the exchanged message.

Figure 15:
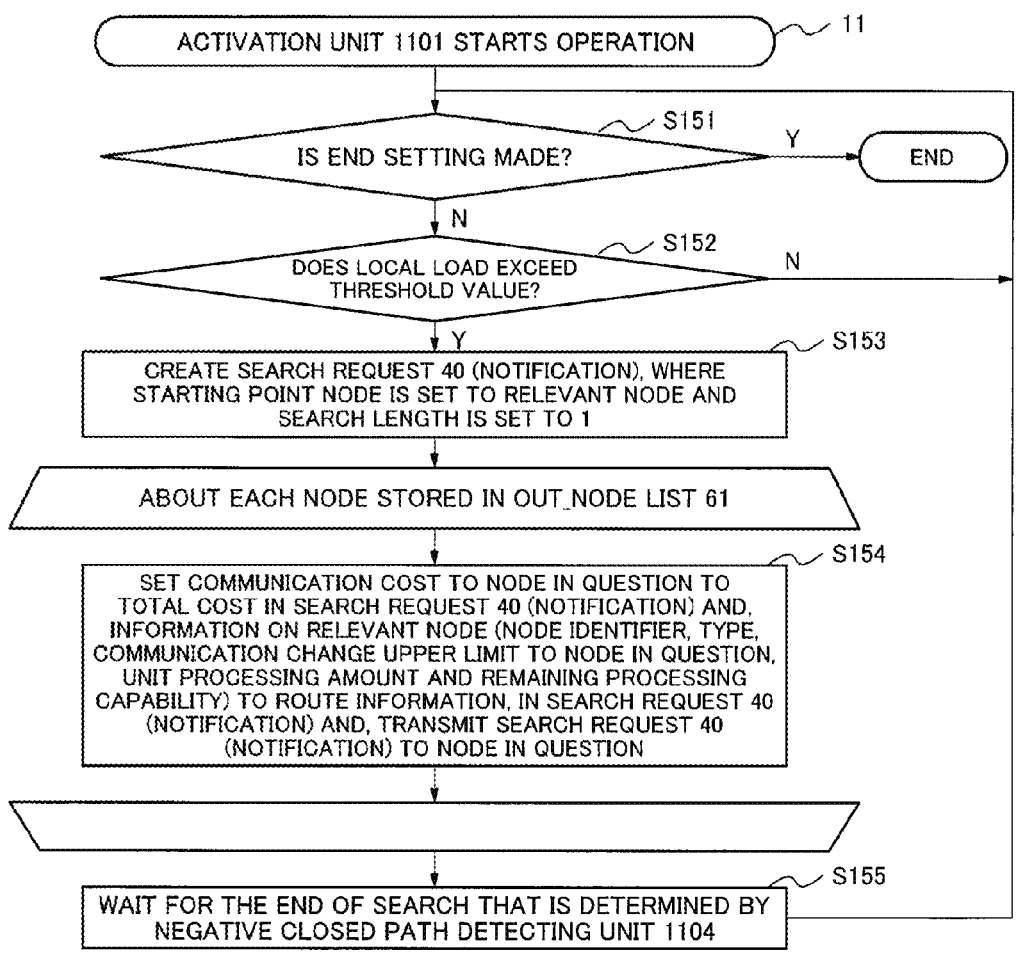
FIG. 15 is an operation flowchart of an activation unit 1101.

FIG. 15 is an operation flowchart of the activation unit 1101 in this exemplary embodiment. The difference with the operation flowchart of the activation unit 1101 in the first exemplary embodiment (FIG. 9) is as follows.

The search request 40 that the activation unit 1101 generates is the search request 40 (notification) (S153). When the search request 40 (notification) is transmitted to each of a plurality of nodes stored in the out_node list 61, the activation unit 1101 sets the communication cost to the node in question as the total cost of the search request 40 and sets information on the relevant node as the route_node of the search request 40 (S154). Information on the relevant node is the identifier of the relevant node, the type, the communication change upper limit to the out_node which is the communication destination, the unit processing load and the remaining processing capability.

Figure 16A:
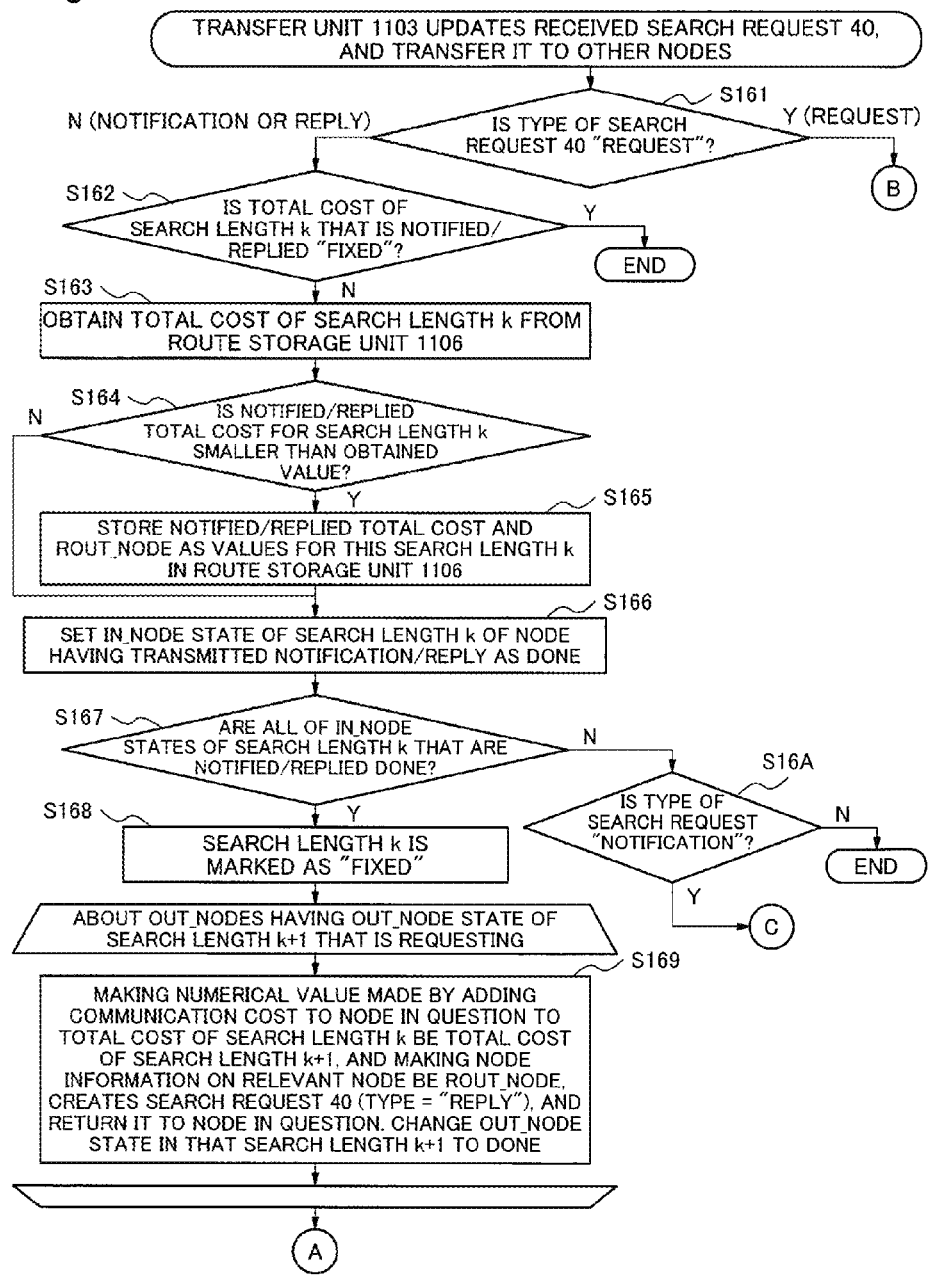
FIG. 16A is an operation flowchart (1) of a transfer unit 1103.
Figure 16B:
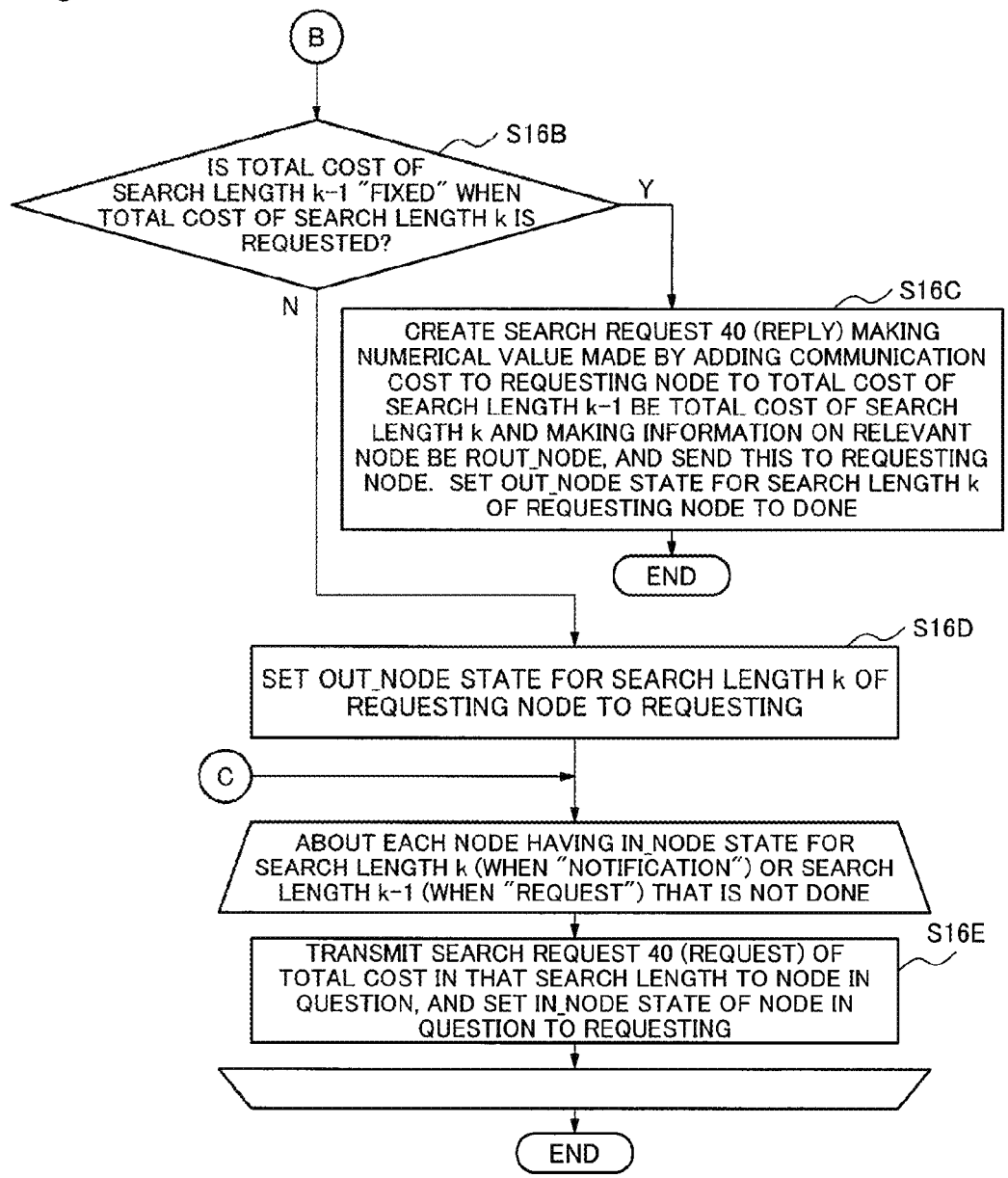
FIG. 16B is an operation flowchart (2) of the transfer unit 1103.
Figure 16C:
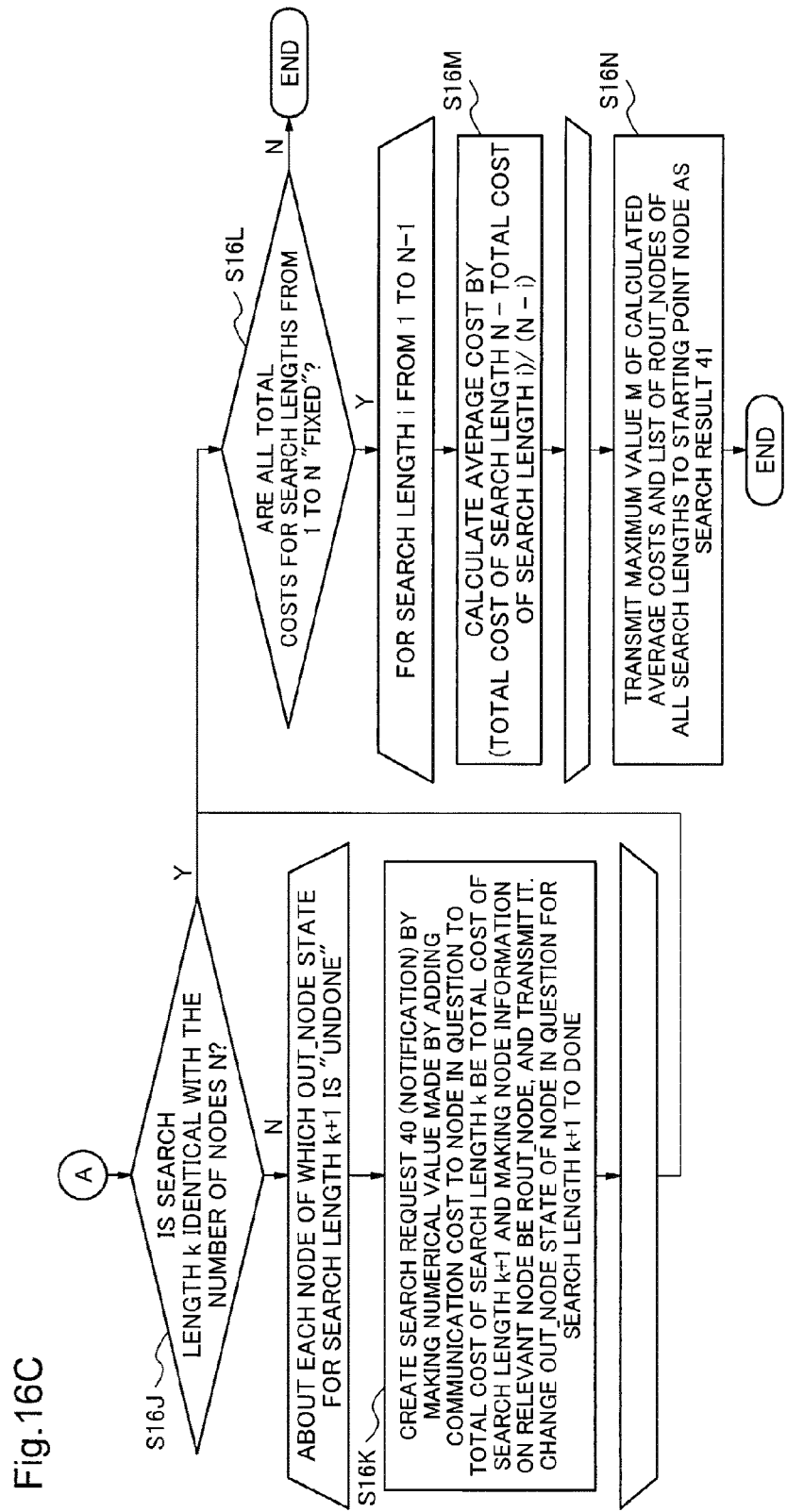
FIG. 16C is an operation flowchart (3) of the transfer unit 1103.

FIGS. 16A to 16C are operation flowcharts of the transfer unit 1103.

When the type of the received search request 40 is a request (in S161, Y), the transfer unit 1103 refers to the route storage unit 1106, and determines whether the total cost of search length k-1, which is 1 smaller than k of the search request 40, is fixed or not.

When fixed (in S16B, Y), the transfer unit 1103 creates the search request 40 (reply) of search length k, while making a numerical value made by adding the communication cost to the requesting node to the total cost of search length k-1 be the total cost of search length k, and making information on the relevant node be the route_node, and sends the search request 40 (reply) to the requesting node as a reply. Further, the transfer unit 1103 sets the out_node state of the requesting node corresponding to search length k of the route storage unit 1106 to Done (S16C).

Here, the information on the relevant node to be set as the route_node is the identifier of the relevant node, the type of the relevant node, the communication change upper limit between the relevant node and the destination node, the unit processing load of the relevant node and the remaining processing capability of the relevant node.

When not fixed (in S16B, N), the transfer unit 1103 sets the out_node state of the requesting node for search length k as Requesting (S16D), and transmits the search request 40 (request) for search length k-1 to each node of which in_node state for search length k-1 is not Done, and sets the in_node state of the node in question to Requesting (S16E).

On the other hand, when the type of search request 40 is of a notification or a reply (in S161, N), the transfer unit 1103 determines whether the total cost of search length k of the received search request 40 is fixed or not by the fixedness state of the route storage unit 1106.

When fixed (in S162, Y), the transfer unit 1103 finishes operation. When not fixed (in S162, N), the transfer unit 1103 compares the total cost in the search request 40 and the total cost of search length k stored in the route storage unit 1106 (S163 and S164). When the value of the search request 40 is smaller (in S164, Y), the transfer unit 1103 stores the total cost and the route_node stored in the search request 40 in the route storage unit 1106 as a value corresponding to search length k (S165).

After that, the transfer unit 1103 sets the in_node state of search length k of the node which has transmitted the search request 40 to Done (S166). When, as a result of this, in_nodes of which in_node states for search length k is not Done are left and the type of search request 40 is a notification (in S167, N and in S16A, Y), the search request 40 (request) of search length k is transmitted to each node of which in_node state of search length k is not Done, and sets the in_node state of the node in question to Requesting (S16E).

When in_node states for search length k are Done about all in_nodes (in S167, Y), the transfer unit 1103 changes the fixedness state of search length k to "fixed" (S168), transmits the search requests 40 (reply) to out_nodes of which each out_node states of search length k+1 are Requesting and changes the out_node states to Done. At that time, the transfer unit 1103 creates the search request 40 (reply) by making the numerical value made by adding the communication cost to the node in question to the total cost of search length k be the total cost of search length k+1, and making information on the relevant node be the route_node (S169).

Next, when this updated search length k is not identical with N of the number of nodes (in S16J of FIG. 16C, N), the search request 40 (notification) is transmitted to each out_node of which an out_node state of search length k+1 is "Undone", and the out_node state of the node in question is changed to Done. At that time, the transfer unit 1103 creates the search request 40 (notification) by making the numerical value made by adding the communication cost to the node in question to the total cost of search length k be the total cost of search length k+1 and making information on the relevant node be the route_node (S16K).

Next, whether the total costs are fixed for all search lengths from 1 to N of the number of nodes is judged and, when not yet fixed (in S16L, N), the transfer unit 1103 finishes operation. When fixed (in S16L, Y), the transfer unit 1103 calculates, about routs having search length i from 1 to N−1, average costs using Formula 2, while making the total cost of search length i be di and the total cost of the search length of N of the number of nodes be dN (S16M).

$$(dN-di)/(N-i) \qquad (2)$$

The transfer unit 1103 transmits the maximum value M among the calculated average costs for search length i from 1 to N−1 and a list of route_nodes for each search length to the starting point node as the search result 41 (S16N), and finishes operation.

Figure 17:
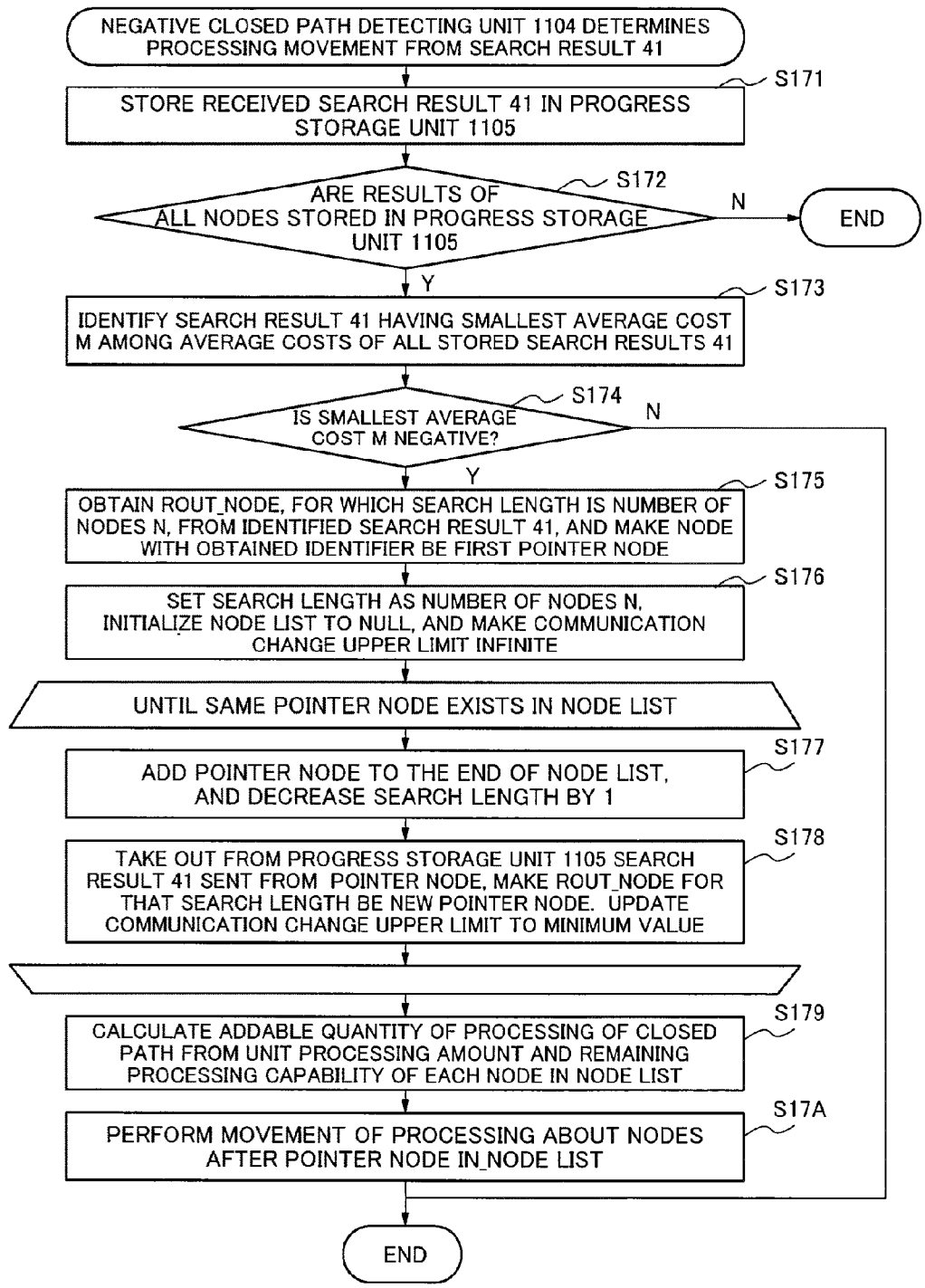
FIG. 17 is an operation flowchart of a negative closed path detecting unit 1104.

FIG. 17 is an operation flowchart of the negative closed path detecting unit 1104. The negative closed path detecting unit 1104 corresponding to the node which has sent the search request 40 carries out operations shown in this flow sheet.

The negative closed path detecting unit 1104 stores the search result 41 received from each node in the progress storage unit 1105 (S171), and judges whether the results of all nodes have been stored in the progress storage unit 1105 (S172).

When all the results have not been stored (in S172, N), the negative closed path detecting unit 1104 finishes operation. When all the results have been stored (in S172, Y), the negative closed path detecting unit 1104 takes out the search result 41 having the smallest average cost M among the average costs of the received search results 41 (S173).

When the smallest average cost M is negative (in S174, Y), the negative closed path detecting unit 1104 obtains the route_node for the search length N, which is the number of nodes, from the taken out search result 41, and makes the identifier of the node be the first pointer node (S175).

Next, the negative closed path detecting unit 1104 sets a search length as N of the number of nodes, initializes a node list to a blank space, and makes the communication change upper limit infinite (S176).

Next, the negative closed path detecting unit 1104 continues the following processing until the same pointer node exists in the node list. The negative closed path detecting unit 1104 adds the pointer node to the end of the node list, and, along with this, decreases the search length by 1 (S177). The negative closed path detecting unit 1104 takes out from the progress storage unit 1105 the search result 41 notified of from the pointer node, makes the route_node corresponding to the numerical value of the search length at that time be a new pointer node, and updates a communication change upper limit to the minimum value (S178).

After that, the negative closed path detecting unit 1104 calculates an addable quantity of processing of the closed path from the unit processing amount and the remaining processing capability of each node in the node list (S179). The calculation method is the same as exemplary embodiment 1. Finally, the negative closed path detecting unit 1104 performs movement of processing about each node in the node list via the processing moving unit 17 and the like (S17A). The method of movement is the same as exemplary embodiment 1. The negative closed path detecting unit 1104 may display a movement plan via the display execution unit 18.

The rate of increase of an amount of messages and an amount of processing of the communication control system 90 of this embodiment is small relative to increase of the number of nodes. Accordingly, even for a large-scale communication control system 90, it is possible to efficiently determine a change plan of a communication utilizing state which enables reduction of a traffic volume.

The reason of this is that, when the processing server devices 1 or the master devices 3 which are dispersed search for a closed path among nodes, each search processing unit 110 performs search while preserving only one route among routes having an identical search length from the starting point node also for different routs. The communication control system 90 of this embodiment does not perform search corresponding to the number of routs which can exist between nodes as is the case with the first exemplary embodiment.

The Third Exemplary Embodiment

Figure 22:
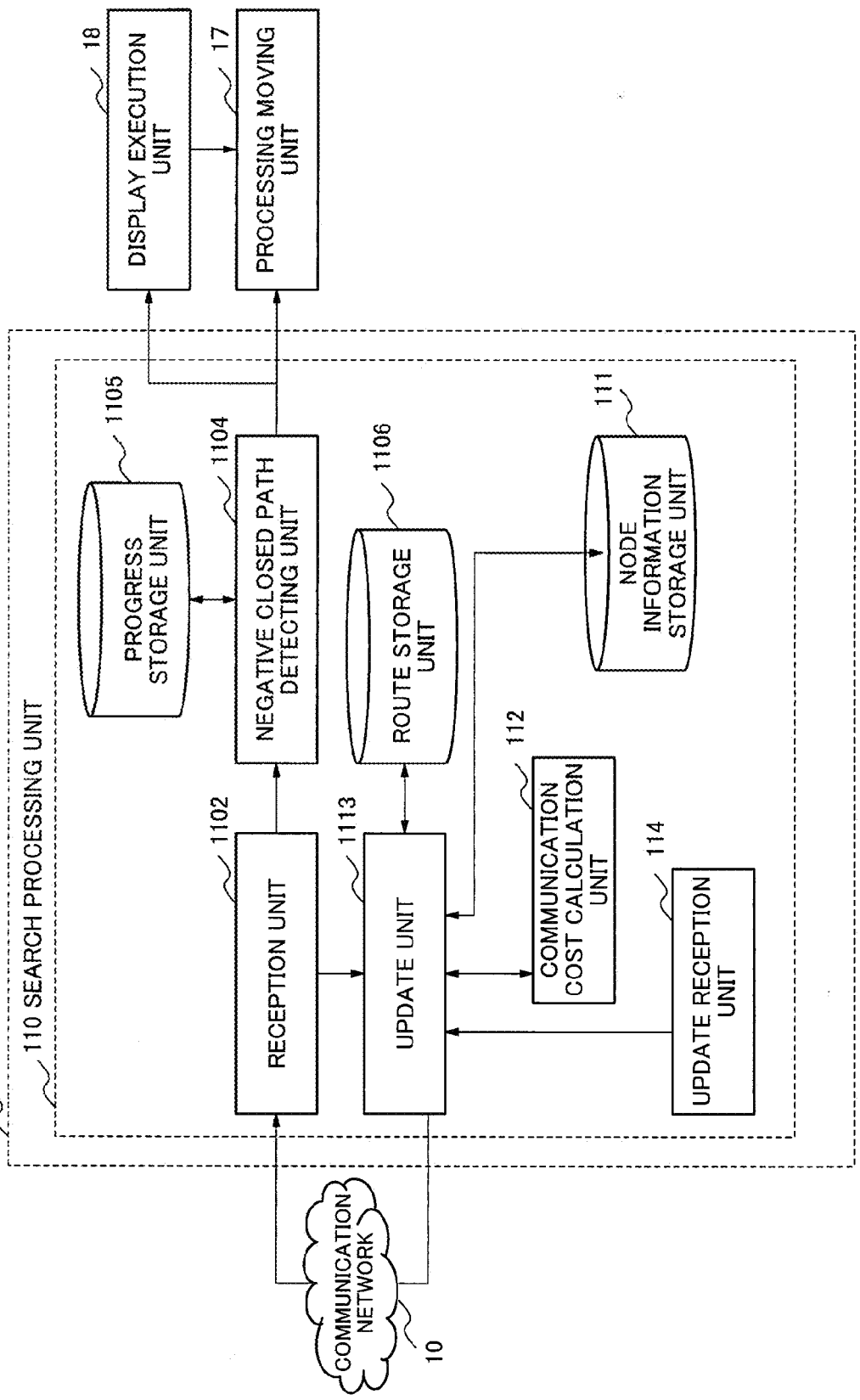
FIG. 22 is a diagram showing a configuration of a negative closed path search unit 11 of a third exemplary embodiment.

FIG. 22 indicates a configuration of a negative closed path search unit 11 of the third exemplary embodiment. The negative closed path search unit 11 of this exemplary embodiment has an update unit 1113 that updates a state of the route storage unit 1106 in place of the activation unit 1101. An update reception unit 114 that accepts directions of such as a start and an end of data reception and transmission from outside calls the update unit 1113 according to the directions.

Further, the negative closed path search unit 11 of this exemplary embodiment does not have a node information generating unit 113, and the update unit 1113 creates the out_node list 61 and the like into the node information storage unit 111. The information stored in a progress storage unit 1105 and a route storage unit 1106 is the same as the second exemplary embodiment.

In the description of this exemplary embodiment, data copied into multiple nodes will be mentioned, too. Data copied into multiple nodes may also exist in other exemplary embodiments.

FIGS. 23A to 28B are operation flowcharts of the update unit 1113. According to the content of an instruction from the update reception unit 114, the update unit 1113 performs a different operation. FIGS. 23A to 26 are flowcharts of operations for mainly carrying out update of a link state.

Figure 23A:
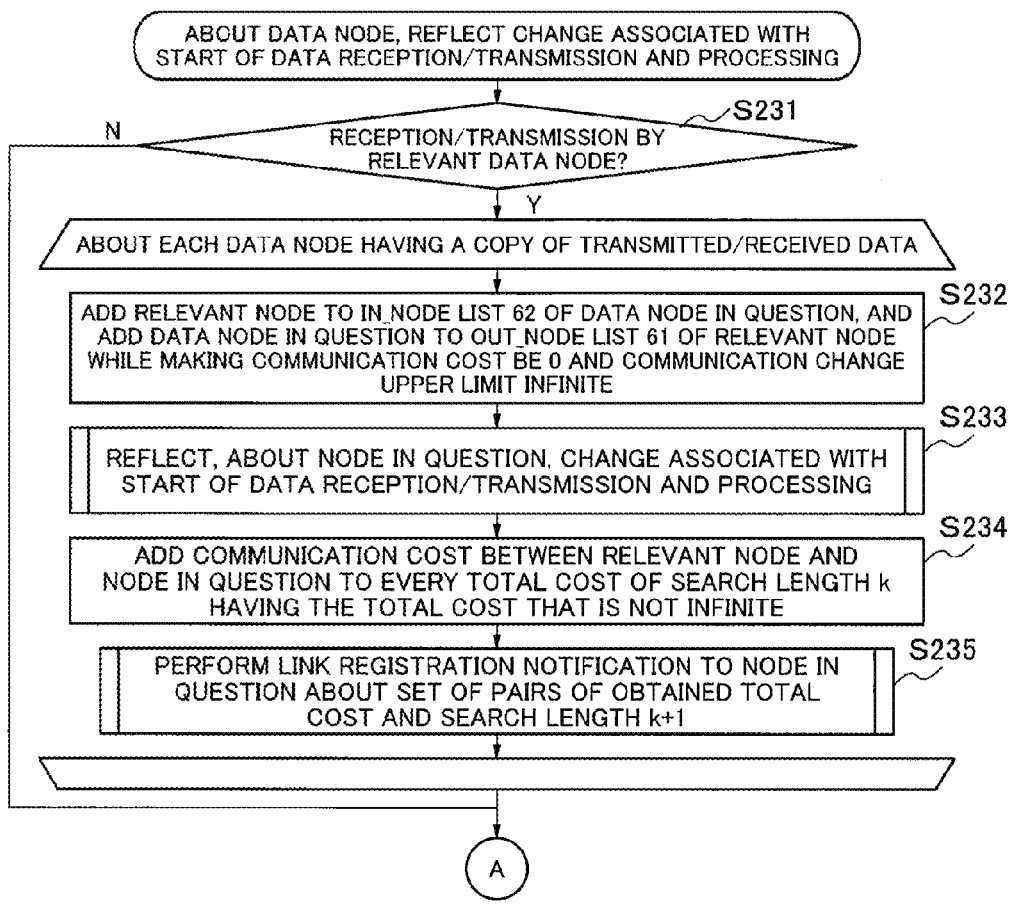
FIG. 23A is a flow chart (1) of processing in which an update unit 1113 reflects a processing start in a data node.
Figure 23B:
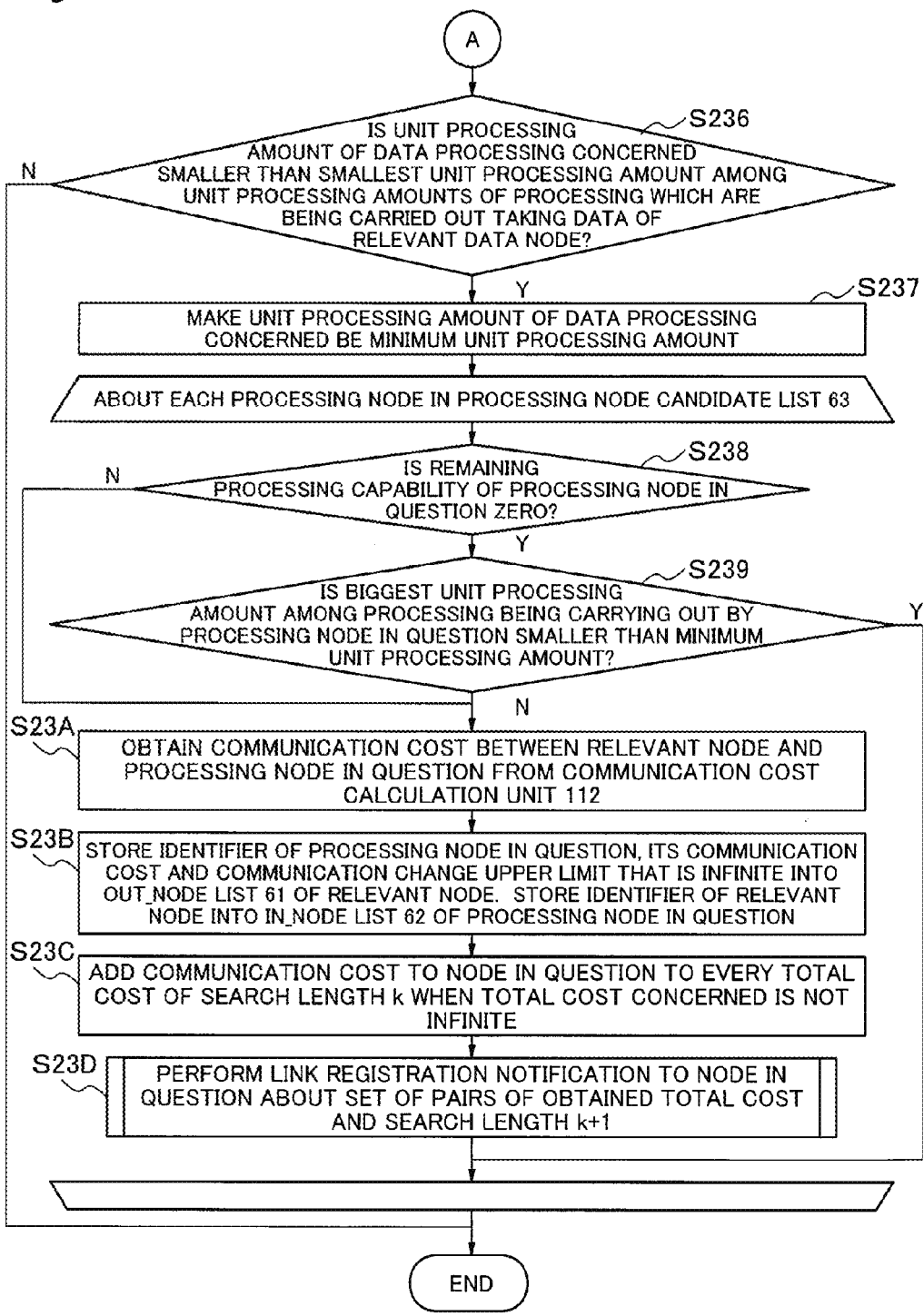
FIG. 23B is a flow chart (2) of processing in which the update unit 1113 reflects a processing start in a data node.
Figure 24B:
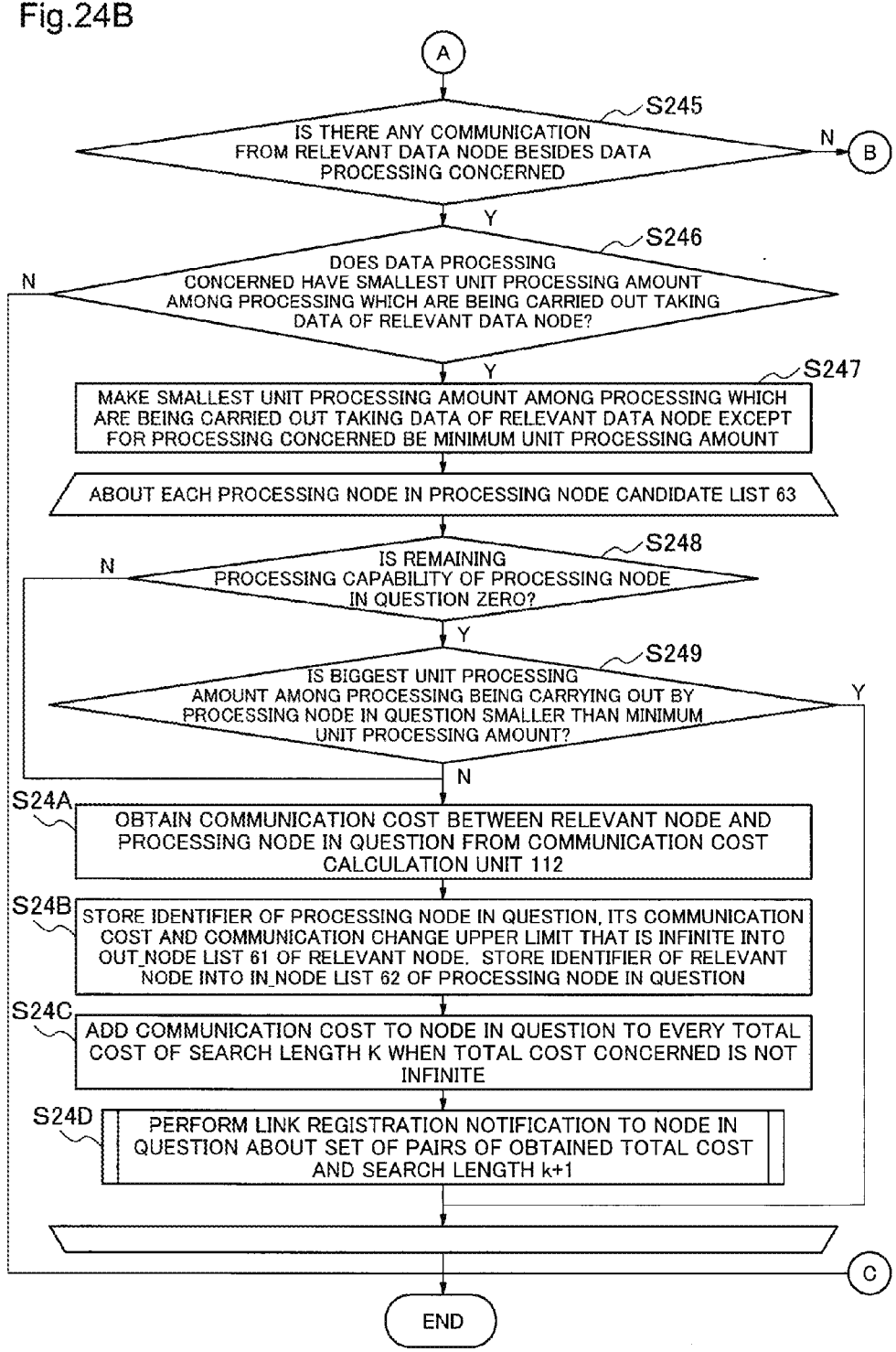
FIG. 24B is a flow chart (2) of processing in which the update unit 1113 reflects a processing end in a data node.
Figure 24C:
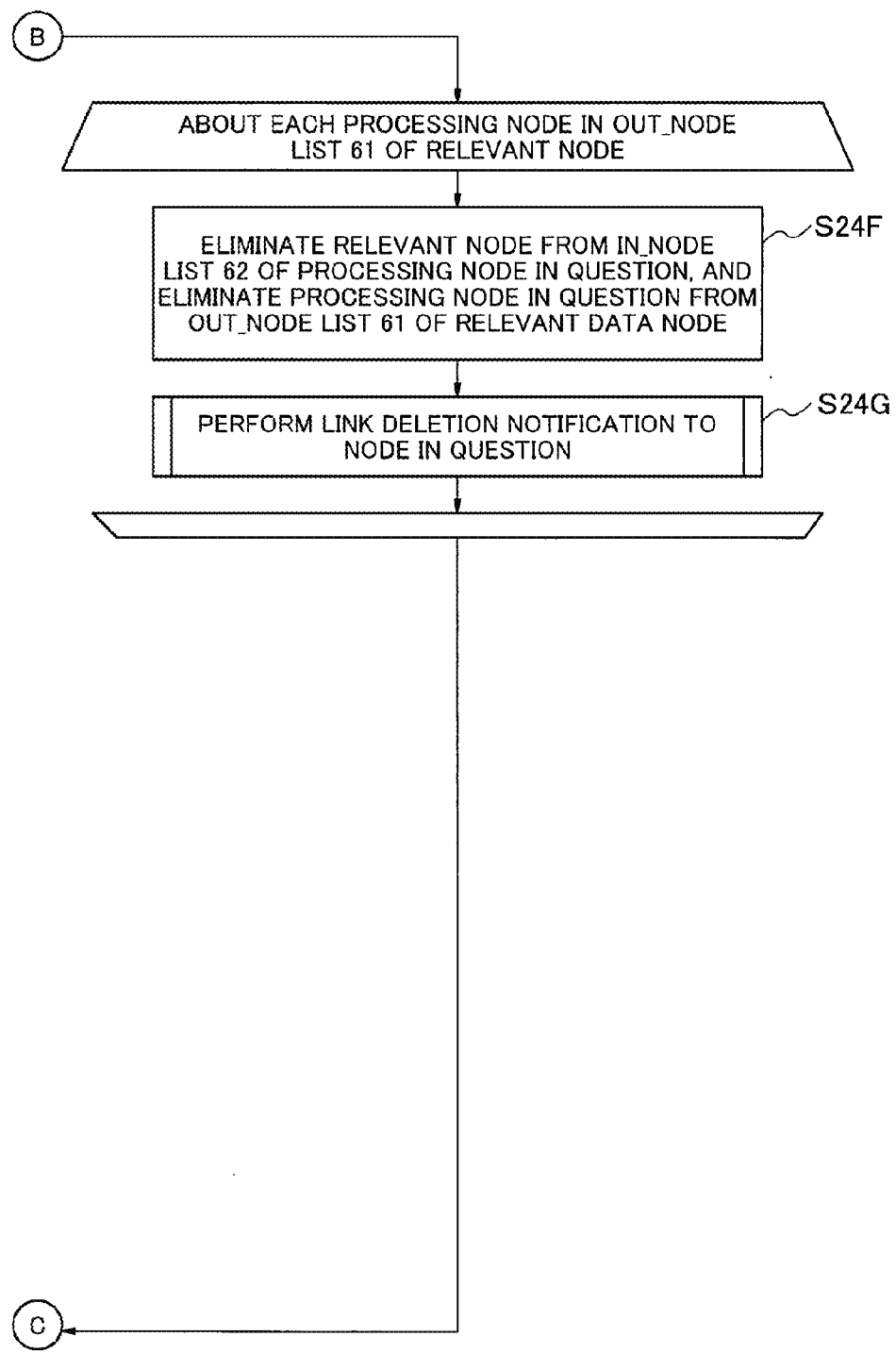
FIG. 24C is a flow chart (3) of processing in which the update unit 1113 reflects a processing end in a data node.
Figure 25A:
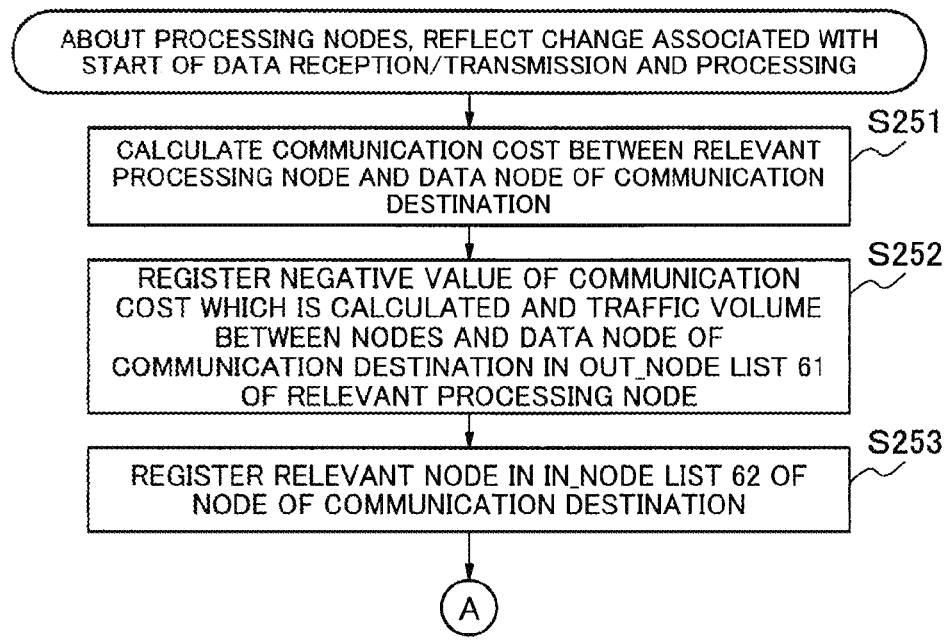
FIG. 25A is a flow chart (1) of processing in which the update unit 1113 reflects a processing start in a processing node.
Figure 25B:
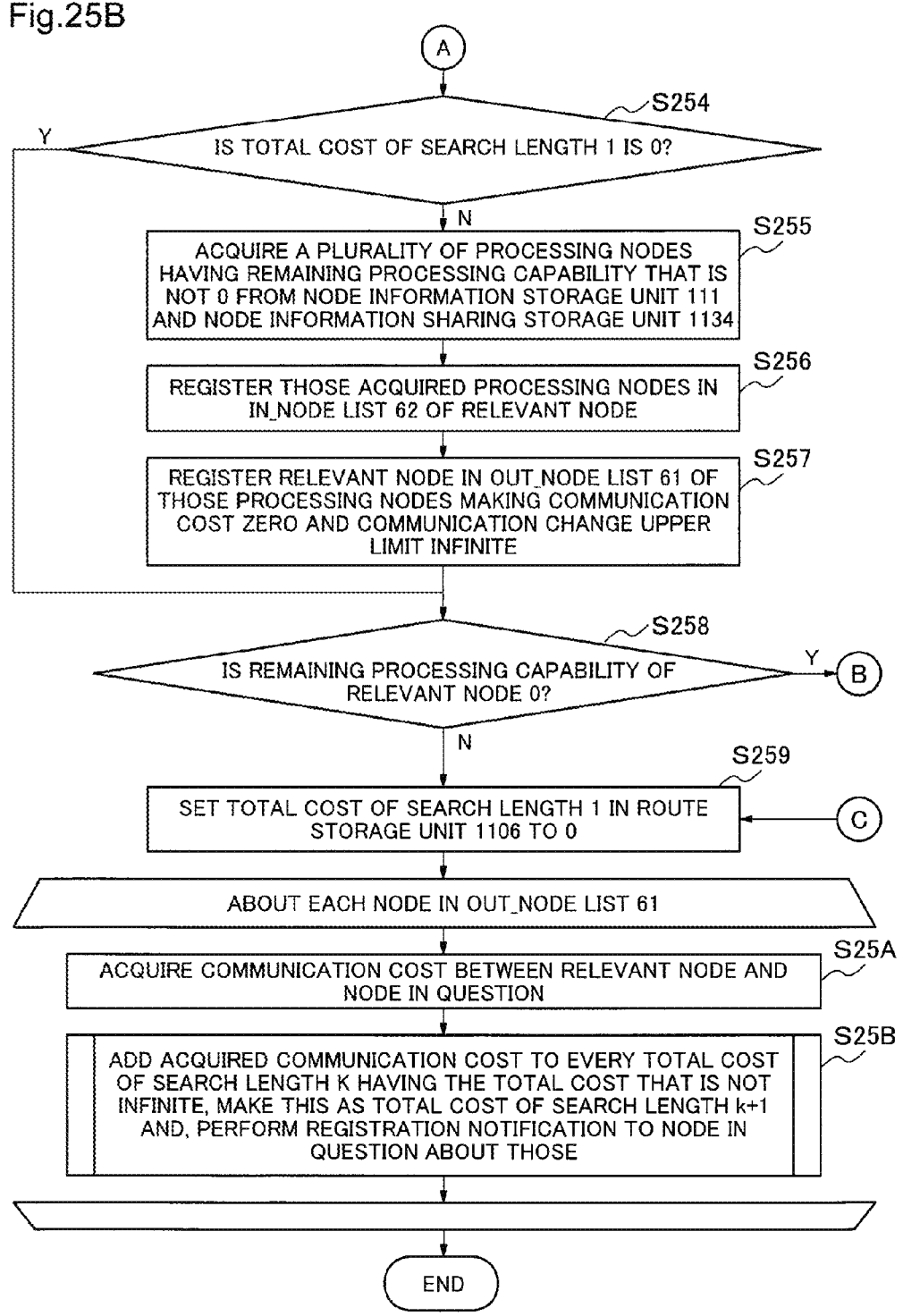
FIG. 25B is a flow chart (2) of processing in which the update unit 1113 reflects a processing start in a processing node.
Figure 25C:
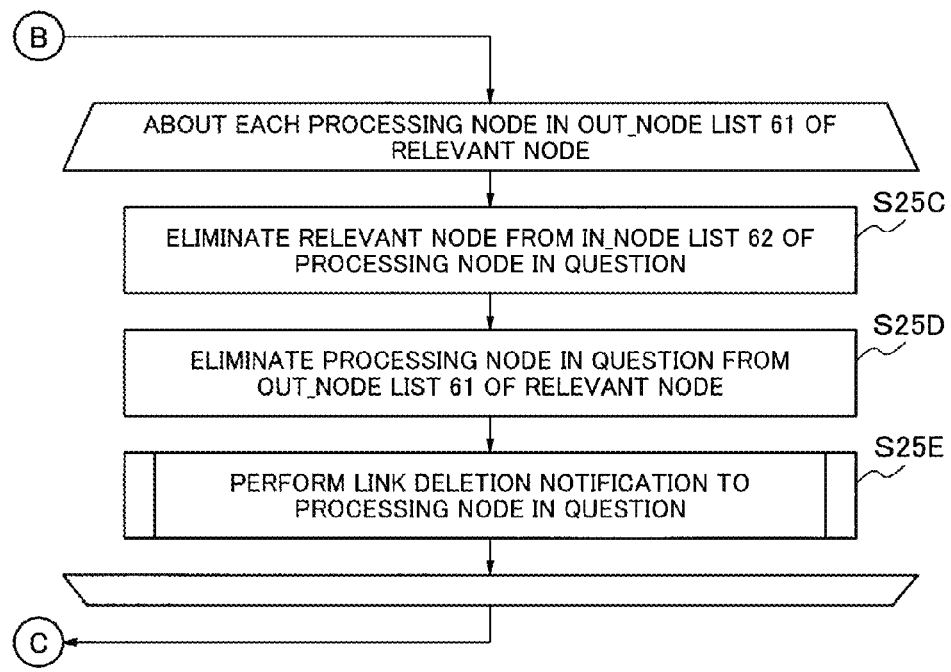
FIG. 25C is a flow chart (3) of processing in which the update unit 1113 reflects a processing start in a processing node.
Figure 26:
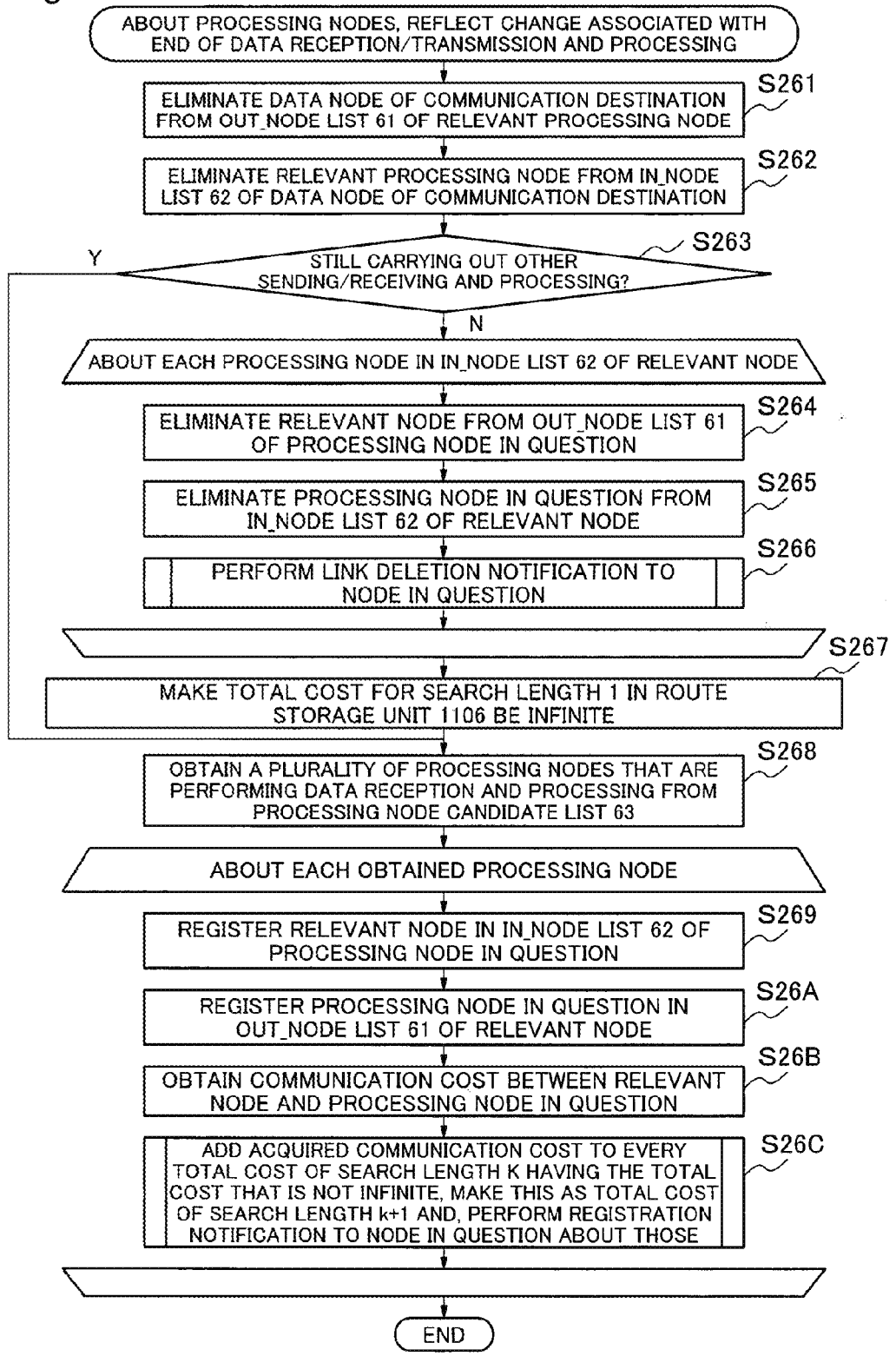
FIG. 26 is a flow chart of processing in which the update unit 1113 reflects a processing end in a processing node.

FIG. 23A and FIG. 23B are flowcharts of operations, about a data node, for reflecting a change associated with a start of data reception/transmission and processing. FIGS. 24A to 24C are flowcharts of operations, about a data node, for reflecting a change associated with an end of data reception/transmission and processing. FIGS. 25A to 25C are flowcharts of operations, about a processing node, for reflecting a change associated with a start of data reception/transmission and processing. FIG. 26 is a flowchart of operations, about a processing node, for reflecting a change associated with an end of data reception/transmission and processing.

Figure 28B:
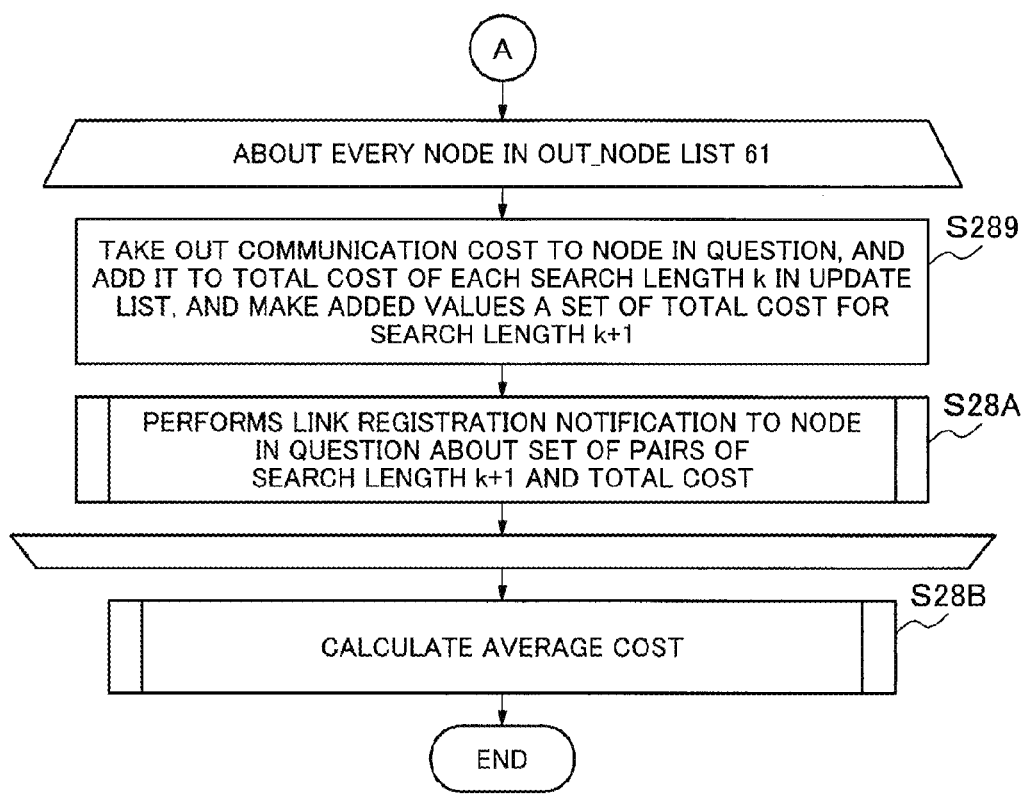
FIG. 28B is a flow chart (2) of link deletion notification processing of the update unit 1113.

FIGS. 27 to 29 are flowcharts of a procedure referred to from the above-mentioned flowcharts. FIG. 27 is a flowchart of a link registration operation of the update unit 1113. FIG. 28A and FIG. 28B are flowcharts of a link deletion notification operation of the update unit 1113. FIG. 29 is a flowchart of an average cost calculation operation of the negative closed path detecting unit 1104.

In the procedure of FIG. 23A and FIG. 23B for reflecting a processing start in a data node, the update unit 1113 performs processing of S232 to S235 about data nodes having a copy of transmitted/received data.

First, the update unit 1113 adds a data node having a copy of transmitted/received data into the out_node list 61 of the relevant node while making a communication cost be 0 and a communication change upper limit infinite, and adds the relevant data node to the in_node list 62 of the data node in question (S232).

Further, the update unit 1113 reflects, about the data node in question, a change associated with a start of data reception/transmission and processing (S233). For example, the update unit 1113 requests the processing server device 1 that is the data node in question (a data node of the copied data) or the master device 3 corresponding to the worker device 2 that is the data node in question to carry out the procedure shown in FIG. 23A and FIG. 23B about the data node in question. Because, for the device which has received the request, it is not sending and receiving by its own relevant data node (in S231, N), there are no cases where this step is carried out repeatedly.

After that, the update unit 1113 performs a link registration notification to the node in question (S234 and S235). The update unit 1113 adds the communication cost to the node in question to every total cost of search length k having the total cost concerned that is not infinite (the initial value), and performs link registration notification about a set of pairs of an obtained total cost and search length k+1.

When the unit processing amount of data processing which has been begun is smaller than the smallest unit processing amount among the unit processing amounts of processing which are being carried out taking data of the relevant data node as a target (processing which takes data of another node which is a copy of data of the relevant data node as a target is also included) (in S236, Y), the update unit 1113 makes this unit processing amount a minimum unit processing amount (S237).

Next, the update unit 1113 performs processing of S238 to S23D about the processing nodes in the processing node candidate list 63.

When the remaining processing capability of the processing node in question is not zero (in S238, N), or even if it is zero, when the biggest unit processing amount among processing being carrying out by the processing node in question is no smaller than the minimum unit processing amount (in S239, N), the update unit 1113 obtains the communication cost between the relevant node and the node in question from the communication cost calculation unit 112 (S23A).

After that, the update unit 1113 stores the identifier of the processing node in question, its communication cost and a communication change upper limit that is infinite into the out_node list 61 of the relevant node, and stores the relevant node into the in_node list 62 of the node in question (S23B). Here, "storing the relevant node into the in_node list 62 of the node in question" means that the identifier of the relevant node is transmitted to the processing server device 1 or the like that is the node in question, and the device that has received it stores the received identifier in the in_node list 62. Henceforth, the same applies to a similar expression.

Then, the update unit 1113 performs link registration notification to this node (S23C and S23D). For example, the update unit 1113 adds a communication cost to the node in question to every total cost of search length k when the total cost concerned is not infinite (the initial value), and performs link registration notification about a set of pairs of a obtained total cost and search length k+1.

Meanwhile, the communication change upper limit here may be an available band of communication between the nodes instead of making it infinite as mentioned above. In this case, the update unit 1113 acquires a physical link band (bps) between the nodes from the communication cost calculation unit 112 or the like. For example, the communication cost calculation unit 112 acquires this available band from the Communication network configuration storage unit 1123 or the like that is being connected. By doing so, the communication control system 90 can avoid a plan which performs communication larger than the band of a communication path.

In the procedures of FIGS. 24A to 24C for reflecting a processing end in a data node, the update unit 1113 performs processing of S242 to S244 about data nodes having a copy of transmitted/received data.

First, the update unit 1113 eliminates the relevant node from the in_node list 62 of the data node in question, and eliminates the data node having a copy of transmitted/received data from the out_node list 61 of the relevant node (S242).

Then, the update unit 1113 reflects, about the node in question, a change associated with the end of data reception/transmission and processing (S243). For example, the update unit 1113 requests the processing server device 1 that is the data node in question or the master device 3 corresponding to the worker device 2 that is the data node in question to carry out the procedures shown in FIGS. 24A to 24C about the data node in question. There are no cases where this step is carried out repeatedly because, for the device which has received the request, it is not sending and receiving by the relevant data node (in S241, N).

After that, the update unit 1113 performs a link deletion notification to the node in question (S244).

When there is not communication from the relevant data node besides the data processing which has ended (in S245, N), the update unit 1113 eliminates the relevant node from the in_node list 62 of a processing node registered in the out_node list 61 of the relevant node, eliminates the processing node in question from the out_node list 61 of the relevant data node, and performs a link deletion notification (S24F and S24G).

When there is communication from the relevant data node besides the data processing (in S245, Y), and the data processing has the smallest unit processing amount among processing which are being carried out and which are taking data of the relevant data node as a target (in S246, Y), the update unit 1113 determines a new processing node.

Specifically, the update unit 1113 makes the smallest unit processing amount among processing which are being carried out and which are taking data of the relevant data node as a target be a minimum unit processing amount (S247), and performs the processing of S248 to S24D about the processing nodes in the processing node candidate list 63.

When a remaining processing capability is not zero (in S248, N) or, even it is zero, when the biggest unit processing amount among the pieces processing which are being carried out by the processing node in question is not smaller than the minimum unit processing amount (in S249, N), the update unit 1113 obtains a communication cost between the relevant node and the node in question (S24A). The update unit 1113 stores this communication cost, the identifier of the processing node in question and an infinite communication change upper limit in the out_node list 61 of the relevant node, adds the identifier of the relevant node to the in_node list 62 of the node in question (S24B), and performs a link registration notification (S24C and S24D). At that time, the update unit 1113 adds the communication cost to the node in question to every total cost of search length k when the total cost concerned is not infinite (the initial value), and performs link registration notification about a set of pairs of a obtained total cost and search length k+1.

In a procedure such as FIG. 25A for reflecting a processing start in a processing node, the update unit 1113 calculates the communication cost between the relevant processing node and a data node of a communication destination (S251), and stores each of the identifier of the node in question, the negative value of a communication cost which has been calculated and the traffic volume between the nodes as an identifier, a communication cost and a communication change upper limit of the out_node list 61 of the relevant processing node (S252). The update unit 1113 registers the relevant node with the in_node list 62 of the node of a communication destination (253).

Next, the update unit 1113 determines whether the relevant node is already carrying out data reception/transmission and processing (S254). This will be a judgment of whether the total cost of search length 1 is 0 or not when the starting point of the search is made be a logical processing node.

When not being carried out, that is, when the total cost is not 0 (in S254, N), the update unit 1113 acquires a plurality of processing nodes having a remaining processing capability that is not 0 from the processing node candidate list 63 (S255). The update unit 1113 may acquire a processing node from the node information sharing storage unit 1134 or the like. The update unit 1113 registers those processing nodes with the in_node list 62 of the relevant node (S256), and registers the relevant node in the out_node list 61 of those processing nodes while making the communication cost zero and the communication change upper limit infinite (S257). This registration is performed by transmitting the identifier, the communication cost and the communication change upper limit of the relevant node to the processing server device 1 or the like that is a processing node.

Next, the update unit 1113 determines whether the remaining processing capability of the relevant node is 0 or not. In the case of zero (in S258, Y), about each of a processing node in the out_node list 61, the update unit 1113 eliminates the relevant node from the in_node list 62 of the processing node in question, eliminates the processing node in question from the out_node list 61 of the relevant node, and performs a link deletion notification to the processing node in question (S25C to S25E).

After this, or, when the remaining processing capability of the relevant node is not 0 (in S258, N), the update unit 1113 makes the total cost of a search length 1 of the route storage unit 1106 be 0 (S259), and performs link registration notification to each node in the out_node list 61 (S25A and S25B). In other words, the update unit 1113 acquires the communication cost between the relevant node and the node in question (S25A), adds the acquired communication cost to every total cost of search length k having a total cost that is not infinite (the initial value), and performs link registration notification about a set of pairs of the obtained total cost and search length k+1.

In the procedure of FIG. 26 for reflecting a processing end in a processing node, the update unit 1113 eliminates the data node of a communication destination from the out_node list 61 of the relevant processing node, eliminates the relevant processing node from the in_node list 62 of the data node of a communication destination, and determines whether the relevant processing node is still carrying out sending/receiving and processing of data with another data node or not (S261 to S263).

When not carrying out (in S263, N), the update unit 1113 eliminates, about each of the nodes in the in_node list 62 of the relevant node, the relevant node from the out_node list 61 of the processing node in question, eliminates the processing node in question from the in_node list 62 of the relevant node, and performs a link deletion notification to the node in question (S264 or S266). Next, the update unit 1113 makes the total cost of search length 1 be infinite (S267). This is because the relevant node will be in a state that any piece of processing is not being carrying out.

Finally, about the processing nodes obtained from the processing node candidate list 63, the update unit 1113 registers the relevant node with the in_node list 62 of the processing node in question, registers the processing node in question with the out_node list 61 of the relevant node, and performs link registration notification to the node in question (S268 to S26C).

In the link registration procedure of FIG. 27, the update unit 1113 receives a node identifier for which link registration notification has been performed and a plurality of pairs of search length k and a corresponding total cost, acquires a total cost of the search length k from the route storage unit 1106 about each search length k which has been notified of (S271). The update unit 1113 compares the acquired numerical value and the numerical value which it has been notified of, and, when the notified value is smaller than the stored value (in S272, Y), updates the total cost in the search length k by the notified value, and, further, updates the identifier of a route_node of search length k by the node identifier which has performed this notification (S273).

When a search length for which a total cost has been updated exists (in S274, Y), about the nodes in the out_node list 61, the update unit 1113 adds, for each total cost of updated search length k, a communication cost to the node in question from the relevant node (the node which has received the notification), and stores the obtained numerical value as the total cost of search length k+1, and performs link registration notification to the node in question (S275 to S277). Finally, the update unit 1113 calculates an average cost (S278).

In the link deletion notification procedure of FIG. 28A and FIG. 28B, the update unit 1113 accepts the node identifier which has performed this notification, and performs the processing of S281 to S288 about search length k for which the node identifier of the route storage unit is identical with the notified node identifier.

First, the update unit 1113 stores an infinite numerical value in a numerical value of a total cost (S281 and S282) while holding the total cost of search length k as a past value. Next, about each node in the in_node list 62, the update unit 1113 requests a total cost of search length k−1 to the node in question, compares the obtained numerical value and the total cost of search length k, and, when the obtained numerical value is small, registers this value with a total cost of search length k, and makes the node identifier in search length k be the identifier of the node in question in the in_node list 62 (S283 to S286).

When processing of the all nodes in the in_node list 62 is finished, the update unit 1113 compared it with the past value which holds the total cost of search length k. When updated (in S287, Y), the update unit 1113 adds search length k to an update list (S288).

When processing is finished for every search length k, about the nodes in the out_node list 61, the update unit 1113 adds a communication cost to the node in question to a total cost of each search length k in the update list, makes it a set of search length k+1 and its total cost, and performs link registration notification to the node in question (S289 and S28A). Finally, the update unit 1113 calculates the average cost (S28B).

In the calculation procedure of the average cost in FIG. 29, the negative closed path detecting unit 1104 calculates a numerical value of Formula 2 (dN−dk)/N−k about search length k from a search length 1 to N of the number of nodes−1 (S291), and makes the biggest numerical value among calculated values the average cost (S292). When this numerical value is negative (in S293, Y), the negative closed path detecting unit 1104 acquires a closed path by following route_nodes (S294). For example, the negative closed path detecting unit 1104 accesses the route_node of search length k while reducing search length k by 1 at a time successively from N of the number of nodes, acquires the route_node of search length k−1, and detects a closed path of the route_nodes (two times of appearance of an identical node as a route_node, or appearance of the relevant node). Even if a search length is reduced to 1, a closed path may not be detected. When a closed path exists (in S295, Y), the negative closed path detecting unit 1104 performs movement of processing of each node in the closed path through the processing moving unit 17 or the like (S296). The method of movement is the same as exemplary embodiment 1. The negative closed path detecting unit 1104 may indicate a movement plan via the display execution unit 18.

When the average cost is not negative (in S293, N) or a closed path cannot be detected (in S295, N), the negative closed path detecting unit 1104 finishes operation.

Figure 56:
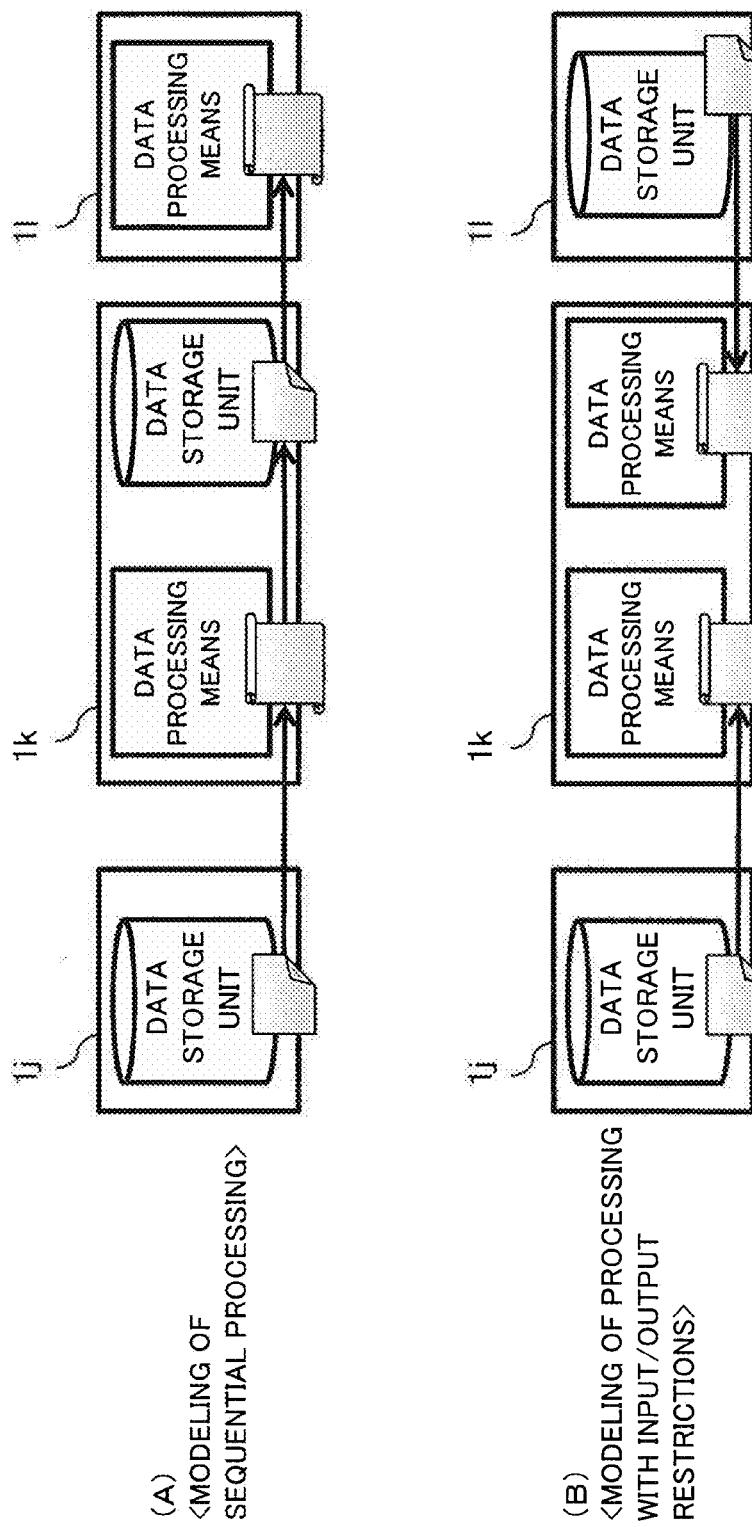
FIG. 56 is an explanatory drawing (4) of an operation example in the third exemplary embodiment.

Here, when pieces of data inputted or outputted by certain data processing exist in a plurality of places as shown in (B) of FIG. 56, the negative closed path detecting unit 1104 manages processing server device 1 to be storage locations of the data having a restricted relationship in each of the processing mentioned above by organizing them as a list. On this occasion, the negative closed path detecting unit 1104 manages the ratio of the data amount in each place to a unit data amount to be processed.

Figure 30:
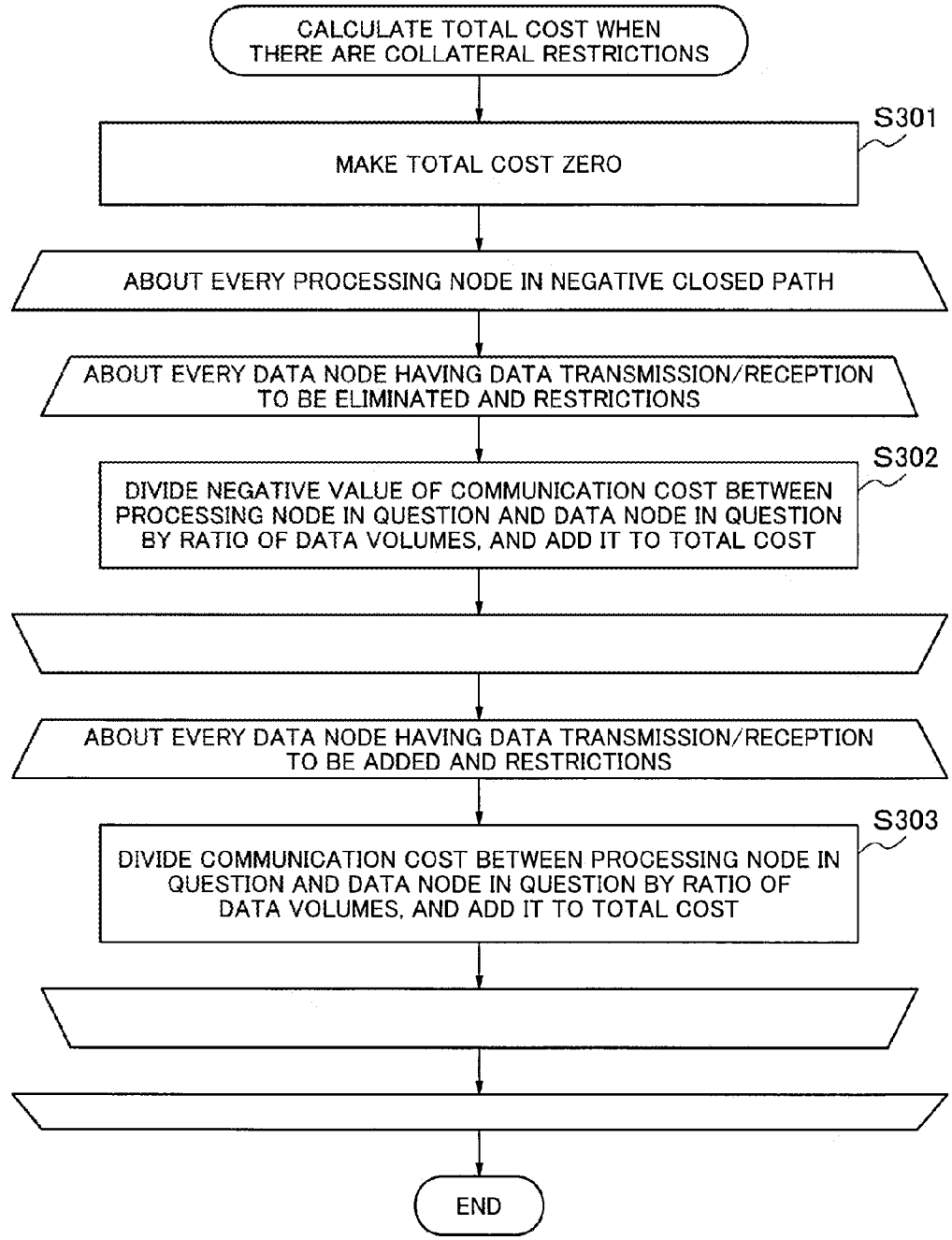
FIG. 30 is a flow chart of total cost calculation processing when there are collateral restrictions.

When a certain negative closed path is detected and a node belonging to the negative closed path has a list of processing nodes having its restricted relationship, it is necessary for the negative closed path detecting unit 1104, when performing addition/deletion of communication about the node in question, to perform addition/deletion also to other nodes in the list. Accordingly, the negative closed path detecting unit 1104 calculates the total cost about this by the procedure of FIG. 30.

In calculation of this total cost, the negative closed path detecting unit 1104 also reflects a ratio of a data amount in addition to a communication cost between processing nodes (S302 and S303). When a result of adding a total cost calculated in this way and the total cost of a negative closed path is negative, the negative closed path detecting unit 1104 generates this communication change plan (S296 of FIG. 29).

The communication control system 90 of this exemplary embodiment can reduce a communication load of processing data by a message amount and a processing amount less than those of the second exemplary embodiment. The reason of this is that the update unit 1113 reflects, taking the communication of processing data and a start or an end of the processing as an opportunity, only a variation caused by the start or the end in the route storage unit 1106. That is, the search processing unit 110 of this exemplary embodiment is not one that generates a route again newly every time it is started as is the case with the second exemplary embodiment.

<A Modification of the Third Exemplary Embodiment>

The communication control system 90 may update a route of the route storage unit 1106 not when a start and end opportunity of communication between a processing node and a data node, but when a certain node detects a change in N of the number of nodes. For example, the update unit 1113 of a node which has detected a change in N of the number of nodes notifies all the other nodes of N of the number of nodes, and, taking this as an opportunity, the update unit 1113 of each node may update a rout.

Figure 31:
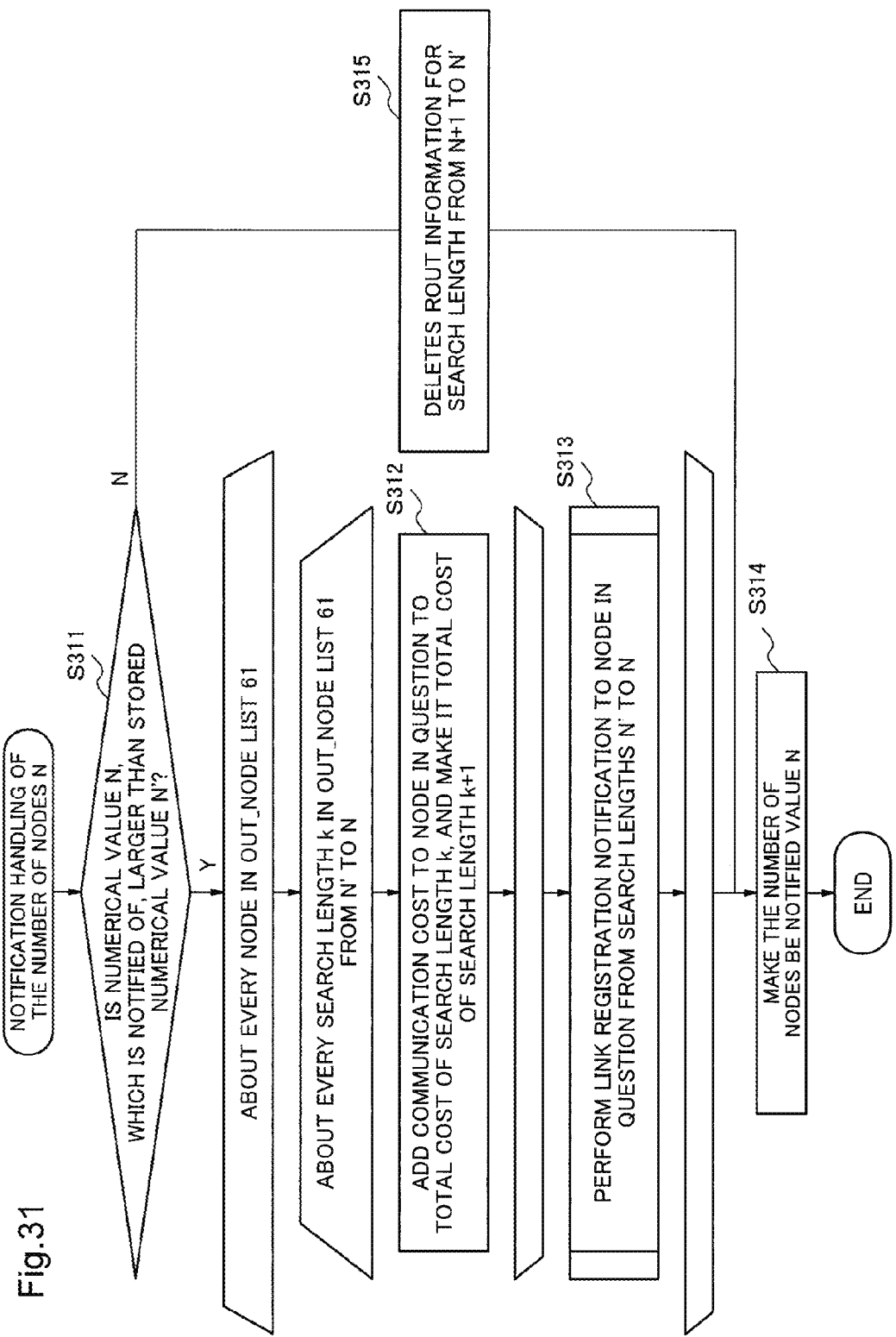
FIG. 31 is a flow chart of a notification handling operation for N of the number of nodes.

FIG. 31 is a flowchart of a notification handling operation of N of the number of nodes. When the numerical value N which has been notified of is larger than a numerical value N' which is being stored in the node count 64 (in S311, Y), the update unit 1113 performs link registration notification for search lengths from N' to N to each node in the out_node list 61 (S313).

For this reason, about each search length k from N' to N of the number of nodes, the update unit 1113 adds the communication cost to the node in question to the numerical value of the total cost of search length k to calculate the total cost of search length k+1 (S312).

When the numerical value N which has been notified of is not larger than the numerical value N' which is being stored (in S311, N), the update unit 1113 eliminates route information corresponding to search length N' to N (S315).

Finally, the update unit 1113 updates the numerical value of the node count 64 by the numerical value which has been notified of (S314).

The Fourth Exemplary Embodiment

In the fourth exemplary embodiment of the present invention, a set of logical data is modeled as a data node. That is, the communication control system 90 of this exemplary embodiment handles data stored in a plurality of data storage unit 14 as one data node logically. For this reason, it is easier for the communication control system 90 of this exemplary embodiment to be realized in the configuration shown in FIG. 2, in which the negative closed path search unit 11 of one master device 3 performs a message exchange on behalf of a plurality of worker devices 2, than other forms. The following description premises on this configuration.

The following description refers to data for which copied data, that is, identical data are being stored in a plurality of worker devices 2 redundantly. The following description also refers to data to which Erasure coding is applied and which is stored in a plurality ("m") of worker devices 2. Although the original of the coded data cannot be restored from data stored in a single worker device 2, they can be restored from data stored in "n" or more than "n" number of worker devices 2 where "n" is a fixed number no more than the number of "m".

Such copied data and coded data may also exist in other exemplary embodiments.

Although the communication cost calculation unit 112 in the first to third exemplary embodiments calculates a communication cost between worker devices 2 as nodes, the communication cost calculation unit 112 of this exemplary embodiment calculates a communication cost between a certain worker device 2 and logical data in addition to that. A communication cost between this worker device 2 (the worker device 2a, for example) and logical data is calculated using a communication cost between the worker device 2a and a plurality of worker devices 2 that store the logical data (the worker device 2b and worker device 2d, for example).

The node information generating unit 113 and the update unit 1113 and the like of this exemplary embodiment should simply handle "m" worker devices 2 in which coded data are stored as one data node all together.

In the following description, communication cost cij means a communication cost from a worker device $2j$ to (logical) data i.

When copied data i is stored in worker devices 2 included in set Ri, the communication cost calculation unit 112 of this exemplary embodiment makes communication cost cij be the smallest value among communication costs ckj, each of which is a cost between a worker device $2k$, which is included in set Ri of the worker devices 2 that have stored data I, and the worker device $2j$. In this case, cij can be expressed by the following Formula.

$$cij = \min_{k \in Ri} ckj \quad (3)$$

Meanwhile, when data i is stored in a single worker device $2k$, the communication cost calculation unit 112 performs calculation such that communication cost cij=ckj.

When data i is stored after applied Erasure coding, the communication cost calculation unit 112 calculates the total of communication costs ckj each of which is a cost between a worker device $2k$ included in set Ei (j) of worker devices 2, and worker device $2j$, and makes it be communication cost cij. Here, set Ei (j) means a set of worker devices 2 that are collected until the number of collected worker devices 2 reaches a fixed number "n" required for restoration (decryption) in order of communication costs from smallest to largest among communication costs ckj between worker device $2k$ which are included in set Ei of worker devices 2 that have stored a fragment of data i, and worker device $2j$. In this case, cij can be expressed by the following Formula.

$$cij = \sum_{k \in Ei(j)} ckj \quad (4)$$

Meanwhile, when in the case where a coded fragment is further copied and arranged and so on, the communication cost calculation unit 112 performs calculation in which ckj of the right sides of Formula (3) and Formula (4) are employed as the left sides of Formula (3) and Formula (4) recursively.

Next, calculation of a communication cost when a processing node, that is, the worker device 2 as a processing node, processes a combination of a plurality of data which are distributed will be described.

Processing which handles a combination of data is, for example, processing inputting one kind of data and outputting another kind of data, or processing inputting two kinds of data. Such processing is processing in which a processing program executed in the worker device 2a processes each line of a file "/foo/in.txt" stored in the worker device 2b, and stores a data element obtained as a result of this in a file "/foo/out.txt" of the worker device 2c, for example.

In this case, data i is not a subset of a single data set, but is a set of a combination of subsets (d1, d2, . . . dM) (where, d1 ⊂ D1 and d2 ⊂ D2 and . . . dm ⊂ DM) which becomes a cover of each set included in a certain family of data sets {Dm} (m=1, 2, . . . M). In the above example, "/foo/in.txt" is d1 and "/foo/out.txt" is d2, for example.

There are cases where each subset dm (m=1, . . . M) is stored in a single worker device 2, respectively, and cases where it is stored in a plurality of worker devices 2 in a manner being copied or coded. Given that a communication cost between data of this subset dm and worker device $2j$ is cmj, the communication cost calculation unit 112 calculates communication cost cij between data i and worker device $2j$ based on the following Formula (5).

$$cij = \sum_{m=1,2,\ldots M} (\delta m \times cmj) \quad (5)$$

where δm is a numerical value made by dividing a data amount of each subset dm by the total about all subsets (m=1, 2, . . . M).

$$\sum_{m=1,2,\ldots M} (\delta m) = 1.$$

Next, communication cost calculation when data i is data made by taking the direct product of a plurality of sets of data which are dispersed, and processing is carried out for each element of the direct product set will be described.

In this case, data i is a member of direct product Π Dm (dm1, dm2, . . . dmm, . . . dmM) (here, dm 1 ⊂ D 1 (m1=1, 2, . . . M1), dm 2 ⊂ D 2 (m1=1, 2, . . . M2) . . . , dmm ⊂ Dm and dm ⊂ DM) of subsets to be a cover of each set Dm (m=1, 2, . . . M) included in a certain family of data sets {Dm}.

For example, when subsets d11 and d12 included in data set D1 and subsets d21 and d22 included in D2 are inputted, processing carried out by the worker device 2 processes (d11, d21), (d12, d21), (d11, d22) and (d12, d22). Also in this case, the communication cost calculation unit 112 calculates communication cost cij based on Formula (5).

Even when data is copied among a plurality of worker devices 2 or the like, the communication control system 90 of this exemplary embodiment can achieve reduction in communication loads. The communication control system 90 can also achieve reduction in communication loads about processing which takes a combination of data stored in the worker device 2 or the like and data stored in another worker device 2 or the like as a target.

The reason of this is that the negative closed path search unit 11 handles logical data as a data node.

The Fifth Exemplary Embodiment

Figure 60:
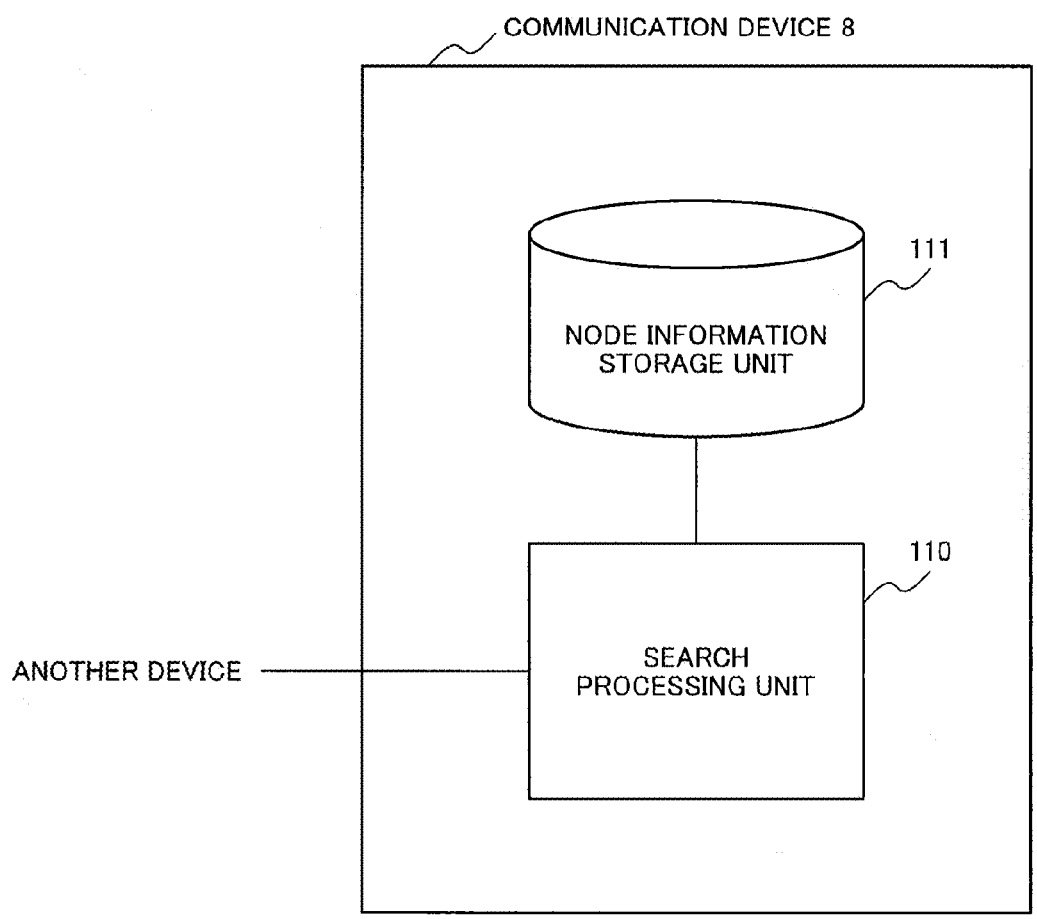
FIG. 60 is a diagram showing a configuration of a communication device 8 according to a fifth exemplary embodiment.

FIG. 60 shows a configuration of a communication device 8 of this exemplary embodiment. The communication device 8 of this exemplary embodiment corresponds to the processing server device 1 of FIG. 1 or the master device 3 of FIG. 2. The communication device 8 of this exemplary embodiment is connected with other communication devices 8 by a communication path. The communication device 8 includes a node information storage unit 111 and a search processing unit 110.

When the communication device 8 functions as a processing device which carries out given processing, its node information storage unit 111 stores an out_node list 61 including a set of an identifier of a data device associated with the data for the processing and the communication cost to the data. When the communication device function as a data device, the node information storage unit 111 stores an out_node list 61 including a set of an identifier of a processing device which inputs and outputs the associated data and the communication cost between the processing device and the data.

The search processing unit 110 receives a message that originated from a sender which is the own device or another device and includes a transfer route of the message and the total cost which is a communication cost of the transfer route, and detects and outputs a closed path of the transfer route for which the total cost is negative.

Or, the search processing unit 110 transmits to a data device registered in the out_node list 61a message including a new total cost made by subtracting a communication cost corresponding to the data device from the total cost stored in the received message and a new transfer route made by adding the own device to the transfer route stored in the received message, and transmits to a processing device registered in the out_node list 61a message including a new total cost made by adding the communication cost corresponding to the processing device to the received total cost and the new transfer route.

Meanwhile, the communication device 8 may be constituted as follows.

When the worker device 2 corresponding to the communication device 8 is a processing device which carries out processing given to it, the node information storage unit 111 stores an out_node list 61 including a set of an identifier of a data device associated with data of the processing and the communication cost to the data. When the worker device 2 corresponding to the communication device is a data device, the node information storage unit 111 stores an out_node information 61 including a set of an identifier of a processing device which inputs and outputs associated data and the communication cost between the processing device and the data.

The search processing unit 110 receives a message that originated from a sender which is the own device or another device, and includes a transfer route of the message and a total cost which is a communication cost of the transfer route, and detects and outputs a closed path of the transfer route for which a total cost becomes negative.

Or the search processing unit 110 transmits, to a communication device corresponding to a data device registered in the out_node information 61, a message including a new total cost made by subtracting the communication cost corresponding to the data device from the total cost stored in the message and a new transfer route made by adding the worker device 2 corresponding to the own device to the transfer route, and transmits, to a device corresponding to a processing device registered in the out_node list 61, a message including a new total cost made by adding the communication cost corresponding to the processing device to a received total cost and the new transfer route.

In the communication control system 90 carrying out a plurality of data processing which a plurality of nodes (processing server device 1 or worker device 2) conduct while communicating data with each other, the communication control system 90 of this exemplary embodiment enables to reduce a communication load of the plurality of data processing as a whole.

The reason of this is that the search processing unit 110 or the like detects a closed path of a communication path of nodes for which a total cost will be negative, and outputs the negative closed path (a sequence of the identifiers of nodes in the order of their appearance on the rout).

<<Example of Specific Operations>>

Next, operations of the communication control system 90 of the present invention will be described using specific examples.

Operation Example in the First Exemplary Embodiment

Figure 32:
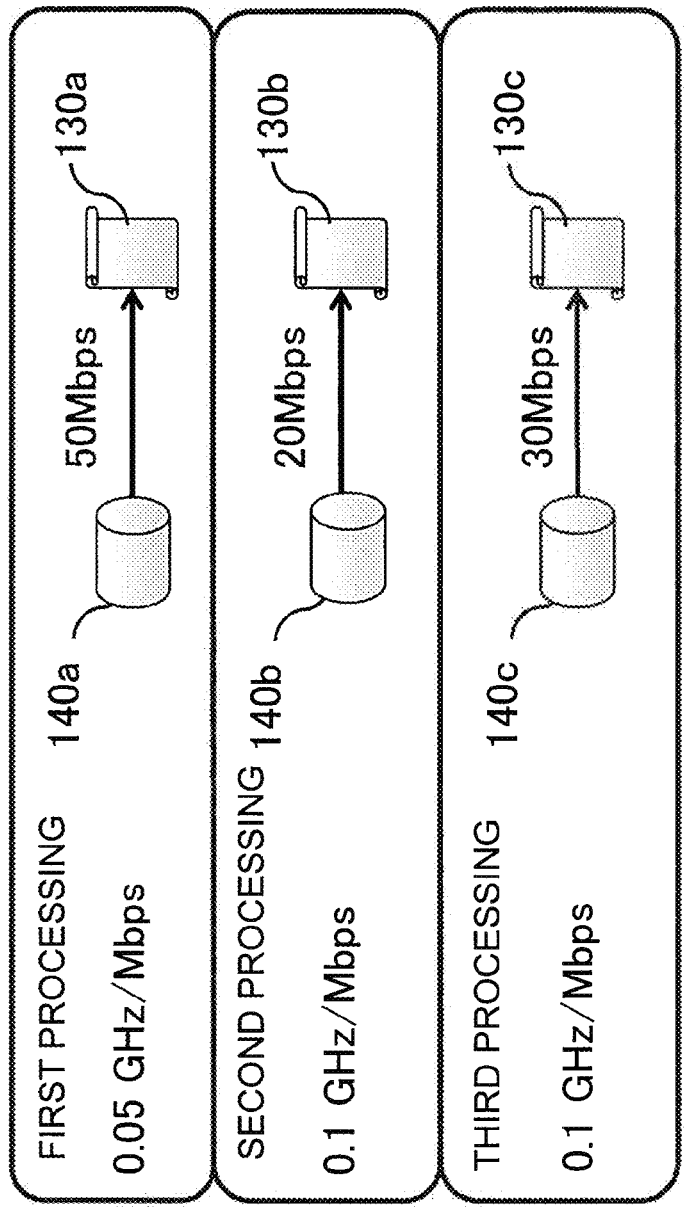
FIG. 32 is a diagram showing an example of processing which is directed to be executed from a user.

FIG. 32 indicates an example of processing in which execution directions are issued by a user. First processing is processing in which a program 130a processes a stream 140a by which data is generated steadily. The program 130a is an application program used by a user. The stream 140a is generating data of approximately 50 Mbps, and the computing capability needed for the program 130a per a unit data amount of the stream 140a is 0.05 GHz/Mbps.

In this example, it is supposed that a computing capability is proportional to the number of clock cycles of a CPU. A computing capability may be expressed by a processing capability value calculated by the number of cores of a processor or by measurement and a benchmark.

Second processing is processing that processes a data stream of 20 Mbps with a processing program 130b that is needed a processing capability of 0.1 GHz/Mbps. Third processing is processing that processes a data stream of 30 Mbps with a processing program 130c that is needed a processing capability of 0.1 GHz/Mbps.

Figure 33:
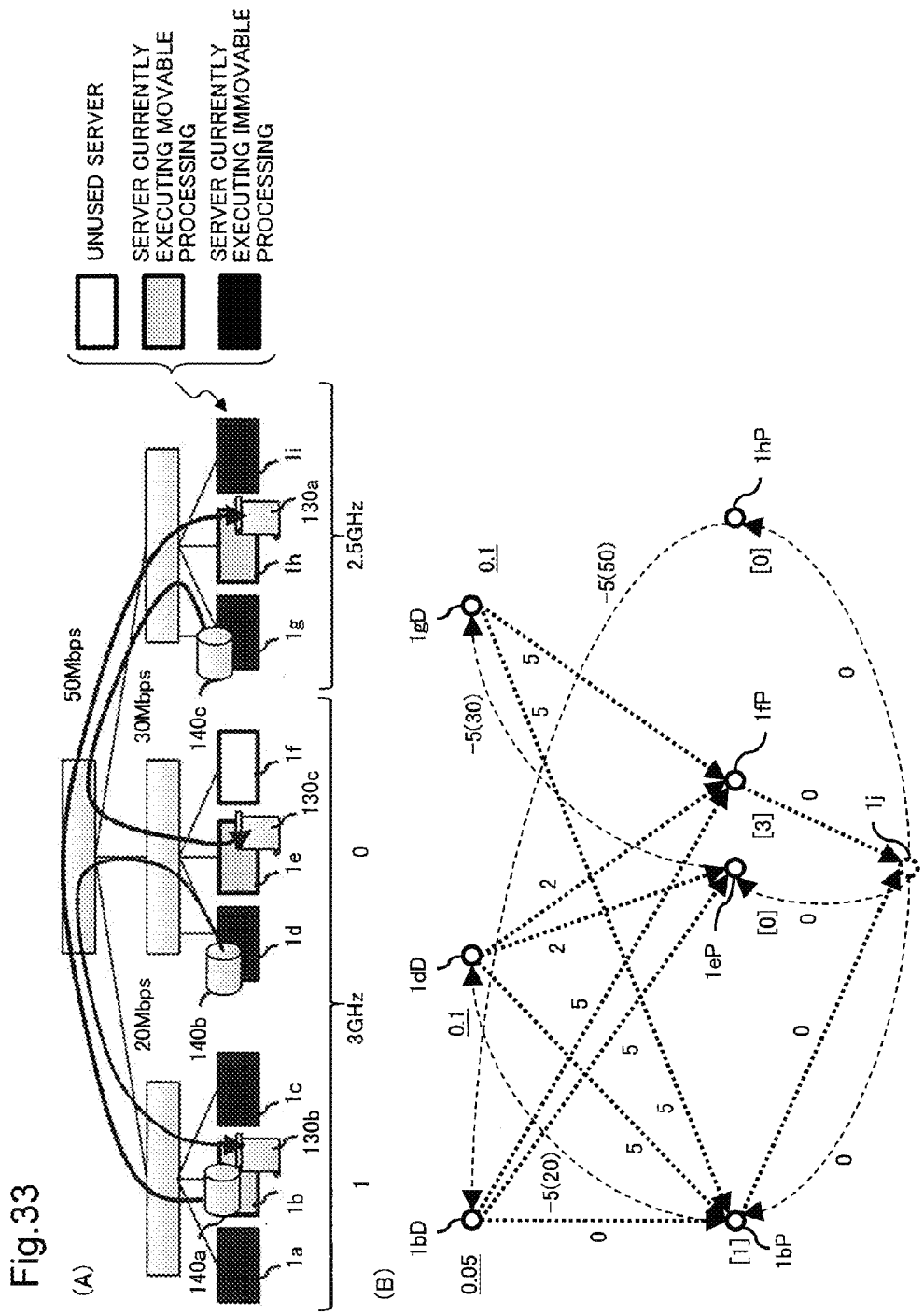
FIG. 33 is an explanatory drawing (1) of an example of operations in the first exemplary embodiment.

FIG. 33 (A) indicates a configuration of the communication control system 90 of this example. In the communication control system 90, there are included nine processing server device 1 that are connected to switches in units of three devices, and further the three switches are connected to a higher rank switch. Processing server devices 1a to 1f have a computing capability of 3 GHz, and processing server devices 1g to 1i have a computing capability of 2.5 GHz.

Meanwhile, this description premises on the form of FIG. 1. In the communication control system 90 of the form of FIG. 2, the processing server device 1 is replaced by the worker device 2. The master device 3 is not illustrated in this figure.

In this system, the stream 140a, a stream 140b and a stream 140c are stored in a processing server device 1b, a processing server device 1d and a processing server device 1g, respectively. The processing programs 130a, 130b and 130c are arranged and carried out in a processing server device 1h, a processing server device 1b and a processing server device 1e, respectively. Such data and processing is arranged according to the processing carried out before it and a state of a free processing server device 1, and so on.

About this arrangement of data and processing, the node creating unit 1132 of the search processing unit 110 stores a graph described in (B) of FIG. 33 in the node information storage unit 111 of a plurality of processing server device 1. A node 1bD of FIG. 33 (B) represents data stored in the processing server device 1b, and a node 1bP expresses processing which is being carried out in the processing server device 1b.

A communication cost is attached to a side (edge) between each node. The cost 0 is attached to the side from the node 1bD to the node 1bP, and it represents that a communication cost is a zero because this is communication within an identical device.

Information on the side from the node 1bD to the node 1bP is stored in the out_node list 61 of the node information storage unit 111 about the node 1bD and the in_node list 62 of the node information storage unit 111 about the node 1bP. From the node 1bP to a node 1dD, a side is created with communication cost of −5, and, further, 20 is given by the number in the parenthesis as a communication change upper limit. The negative value communication cost of −5 shows that the absolute value of a communication cost such as transmission delay which occurs between the two processing server device 1 is 5, and, further, data is being transmitted from the processing server device 1d corresponding to the node 1dD to the node 1b.

The communication change upper limit is set to 20 because the traffic volume that is being used is 20. In this figure, a side without parentheses means that a communication change upper limit is infinite. A remaining processing capability is attached to a processing node by square brackets.

A node 1j is a logical node, and a processing server device 1 corresponding to it does not exist. A side from a node representing processing such as the node 1bP and 1fP to the node 1j is generated when the processing server device 1 of the processing node has a remaining processing capability, that is, a capacity to be able to process other data, and its cost is set as 0. A side from the node 1j to a node representing processing is generated when any processing is being carried out by the processing node, and its cost is also set to 0.

Figure 34:
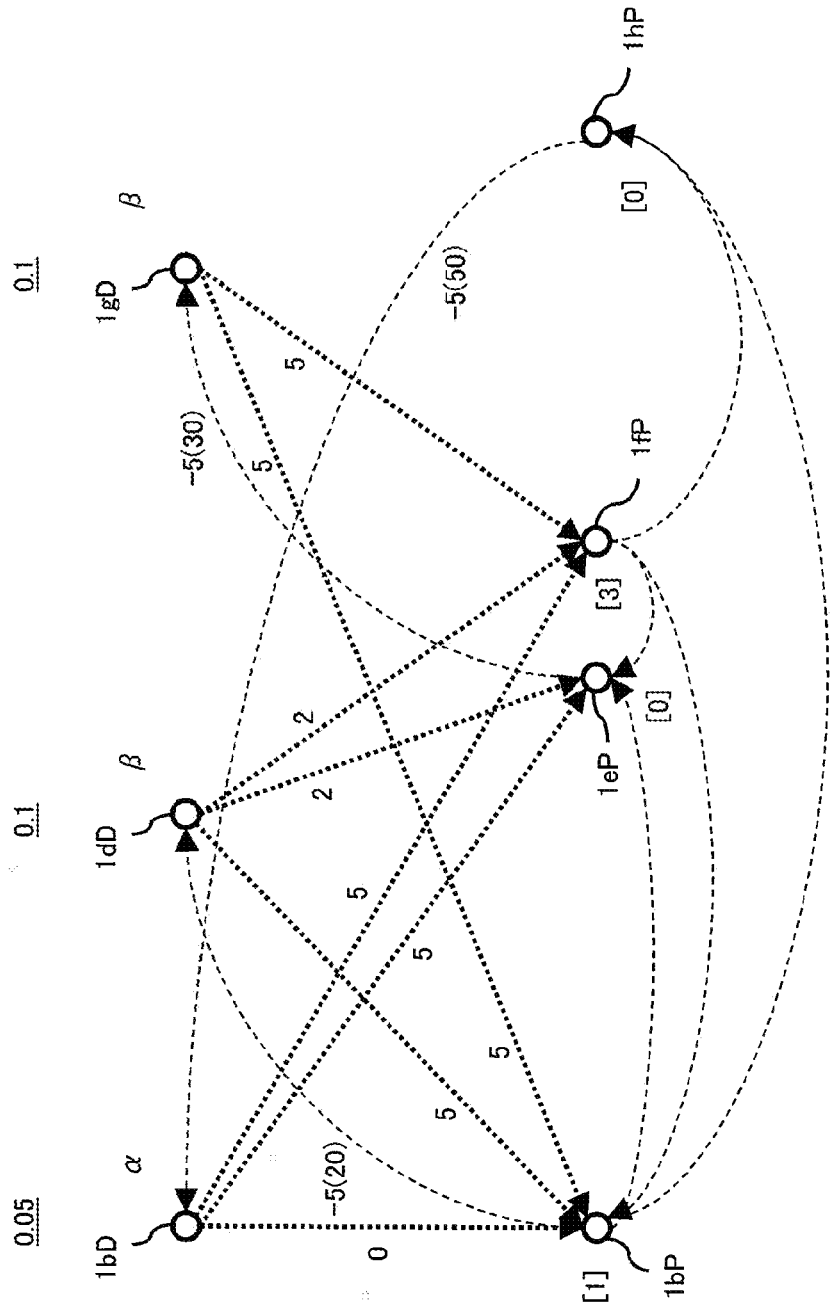
FIG. 34 is an explanatory drawing (2) of the example of operations in the first exemplary embodiment.

FIG. 34 indicates a graph expressed so that nodes between which a link is established via the logical vertex 1j may be connected. In this figure, sides are set to all nodes performing any processing from all nodes having an excess processing capability with a cost 0. These sides are being stored in each node information storage unit 111.

Meanwhile, FIG. 8A indicates a node information generation procedure when logical node 1j is not included. When the node 1j is included, the node creating unit 1132 determines a processing node device 1 corresponding to this node uniquely based on input parameter designation or the like. Then, the node creating unit 1132 sets, when there is a remaining processing capability in a processing node, a link to the processing node from the node 1j at a cost 0, and, when any processing is being carried out in a processing node, a link from the processing node to the node 1j at a cost 0.

Figure 35:
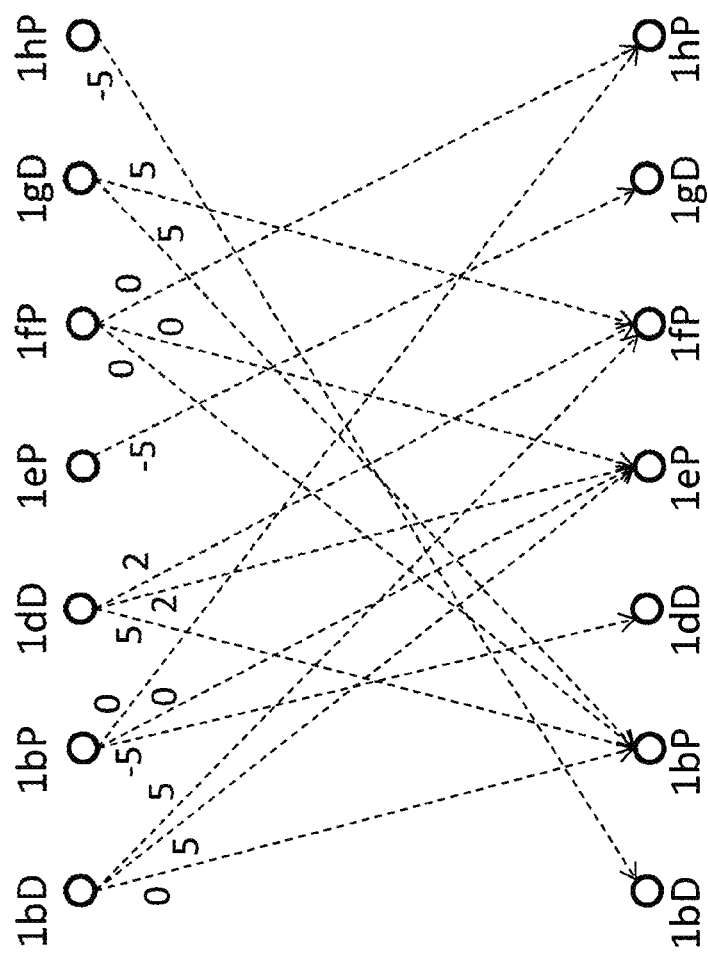
FIG. 35 is an explanatory drawing (3) of the example of operations in the first exemplary embodiment.

FIG. 35 is a diagram of a modified version of the digraph of FIG. 34, indicating the nodes of a link source in the upper part and the nodes of a link destination in the lower part. The node creating unit 1132 of each node stores information on each side in the out_node list 61 in the node information storage unit 111 of a node of link source and the in_node list 62 of a node of a link destination.

The transfer unit 1103, the negative closed path detecting unit 1104 and the like refer to the node information storage unit 111 that stores such information and operate as follows.

When the node 1bP detects that a local communication load has exceeded a threshold value, for example, the node transmits a message (the search request 40) to the node 1dD, 1eP and 1hP stored in the out_node list 61, making a total cost 5, 0 and 0, respectively. The search length is 1.

The node 1dD that has received it adds to the total cost in the message a communication cost to each node in the out_node list 61, adds 1 to the search length, and transfers the message to each node in the out_node list 61.

Figure 36:
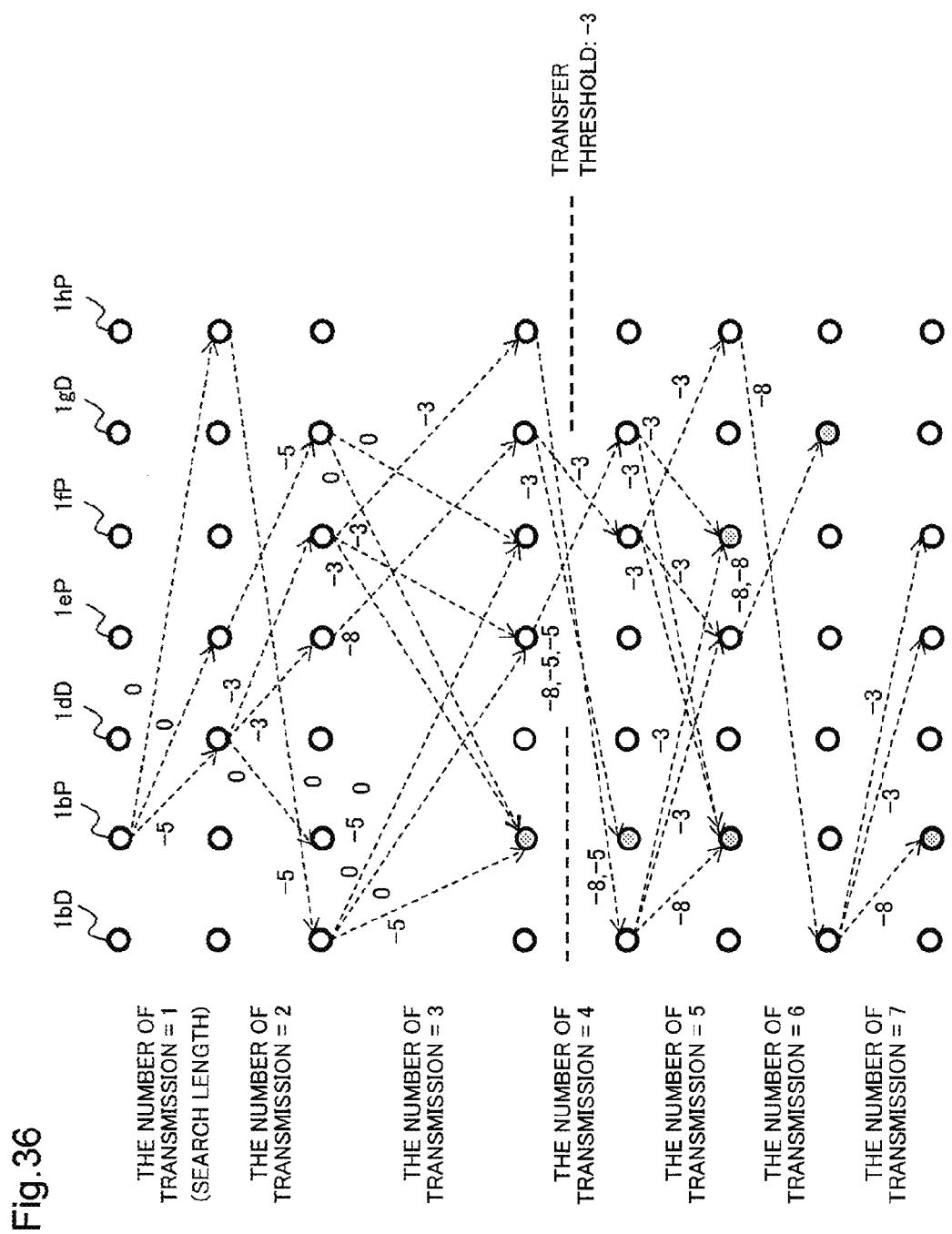
FIG. 36 is an explanatory drawing of a message flow of an operation example in the first exemplary embodiment.

FIG. 36 indicates progresses in which a message is transmitted through each node successively. Here, when a transfer threshold value is set as −3, each node transfers a message only when a total cost is not more than −3. By this transfer threshold value, the communication control system 90 can reduce a message amount.

Because each node adds a node identifier to a node list at the time of this message transfers, when a message is transferred to the node 1bP and then to 1hP, 1bD and 1bP in turn, the node 1bP can detect a closed path of nodes from the node list. The node 1bP creates the search result 41 from information such as the detected closed path and its total cost, and transmits it to the starting point node stored in the message. The node 1bP that is a starting point node accumulates pieces of received search result 41.

FIG. 37 indicates pieces of search result 41 collected by the node 1bP that is the starting point node. A communication change upper limit a of the search result 41 is a minimum value of a communication change upper limit that has been put to a route which forms a closed path. An addable quantity of processing b of the search result 41 is a minimum value among the available processing addition quantities of the processing nodes in the closed path.

The node 1bP that is the starting point node selects one (the fourth row from the top in FIG. 37) having the maximum product of a value Min (a, b), which is the smaller value between the communication change upper limit a and the addable quantity of processing b, and the total cost from these pieces of search result 41. Meanwhile, when a plurality of pieces of search result 41 for which such products are an equivalent value exist, any one of them may be selected.

Figure 38:
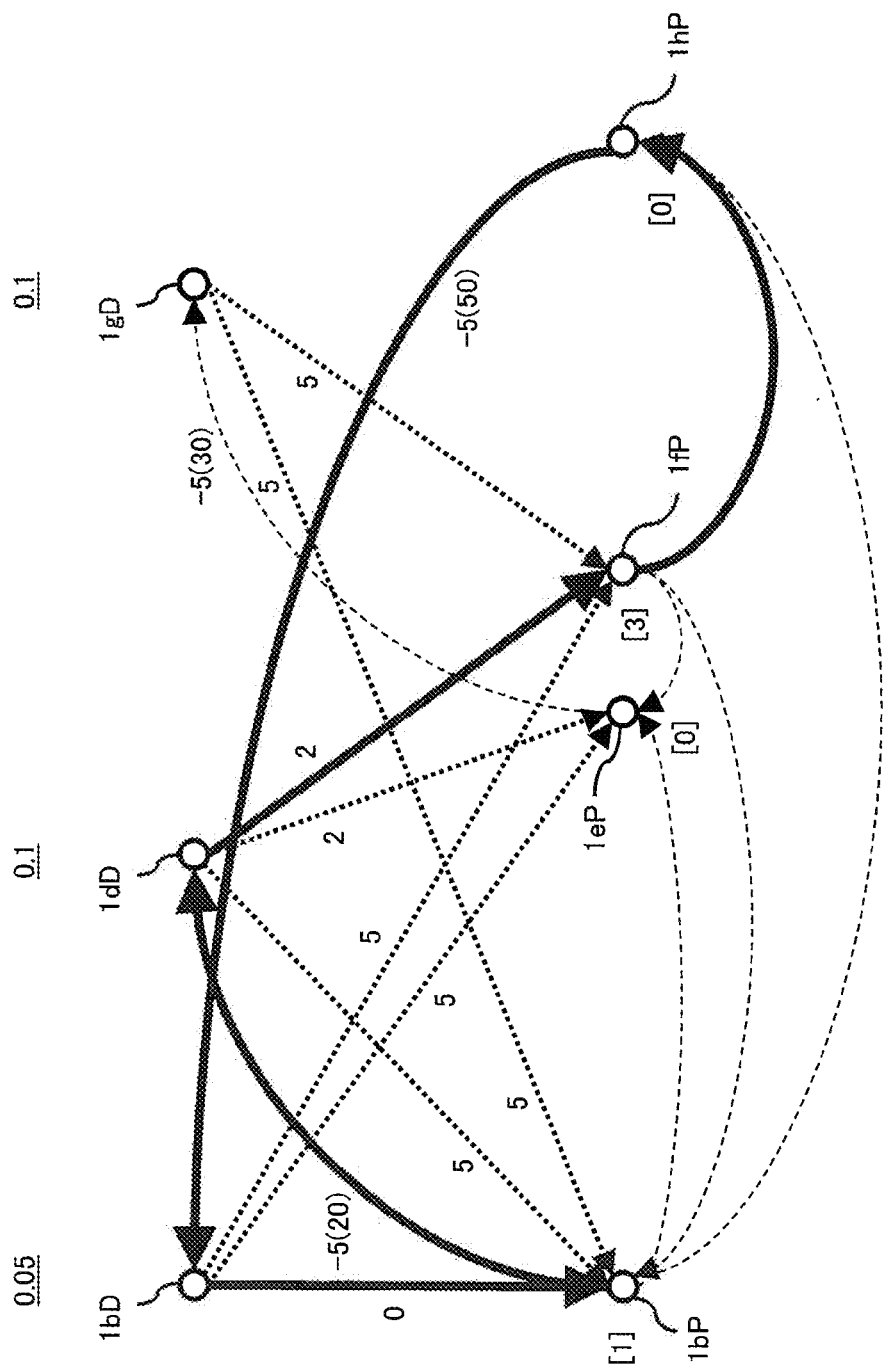
FIG. 38 is an explanatory drawing (4) of an operation example in the first exemplary embodiment.

The node 1bP obtains the closed path including the node 1bP, 1dD, 1fP, 1hP, 1bD and 1bP as a negative closed path from the selected search result 41. FIG. 38 indicates a negative closed path which the node 1bP that is the starting point node has acquired.

Figure 39:
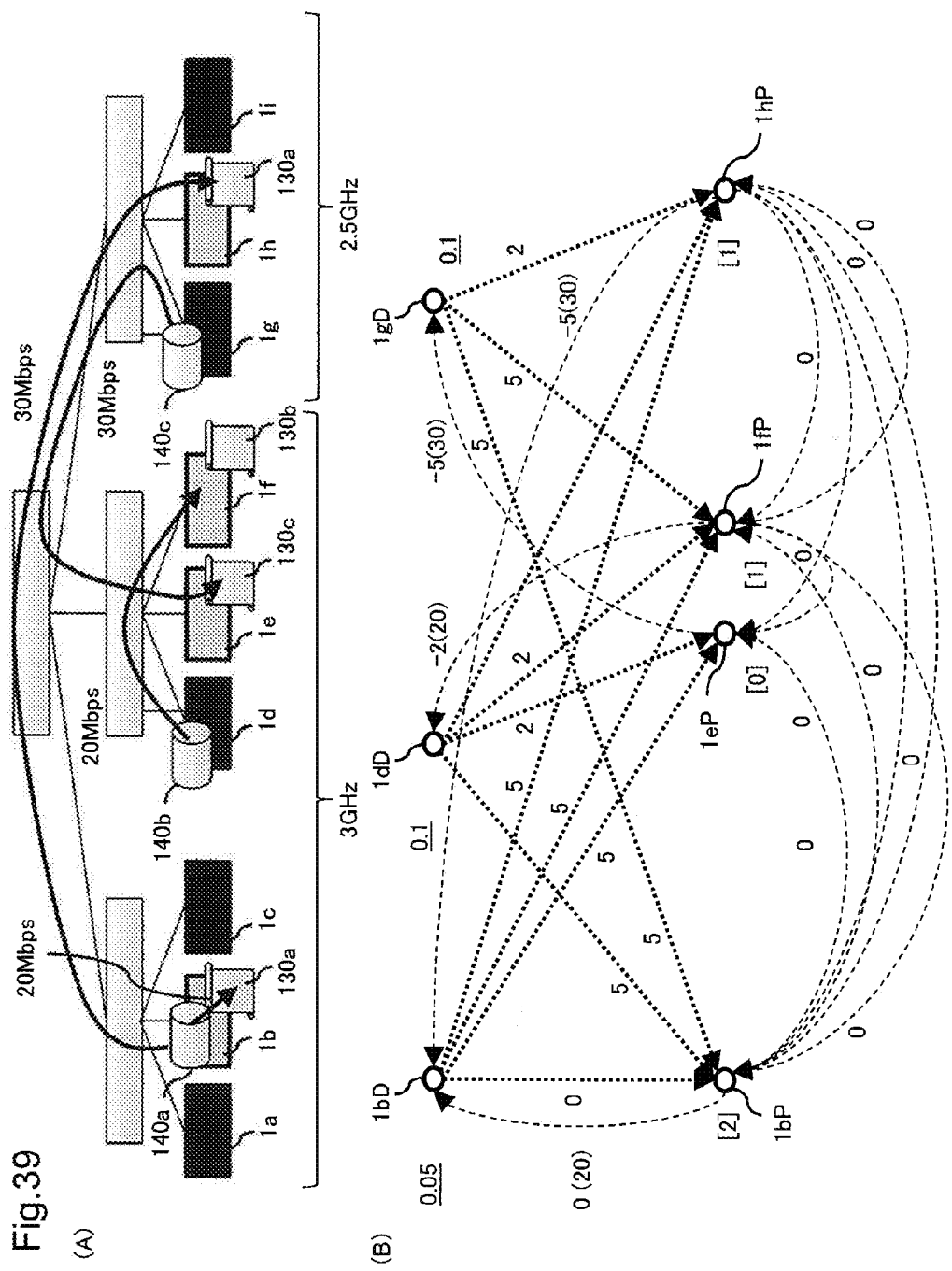
FIG. 39 is an explanatory drawing (5) of an operation example in the first exemplary embodiment.

FIG. 39(A) indicates an arrangement of data and processing, the arrangement being obtained by carrying out a change of a traffic volume and a movement of processing based on this closed path. That is, the data node 1dD (the processing server device 1d) changes a destination of data corresponding to 20 Mbps in its data volume from the processing node 1bP (the processing server device 1b) to the processing node 1hP (the processing server device 1h). The data node 1bD changes a destination of data corresponding to 20 Mbps in its data amount from the processing node 1hP to the processing node 1bP.

The both of these changes are changes which make a communication load reduced. All pieces of data which should be processed are processed also after the change. Further, new data processing is assigned to the processing server device 1 to be used newly in a manner that the processing does not exceed its processing capability.

Meanwhile, a processing program has been moved along with the communication change. The processing program 130b has been eliminated from the processing server device 1b, and deployed in the processing server device 1f. The processing program 130a is also deployed in the processing server device 1b.

Figure 40:
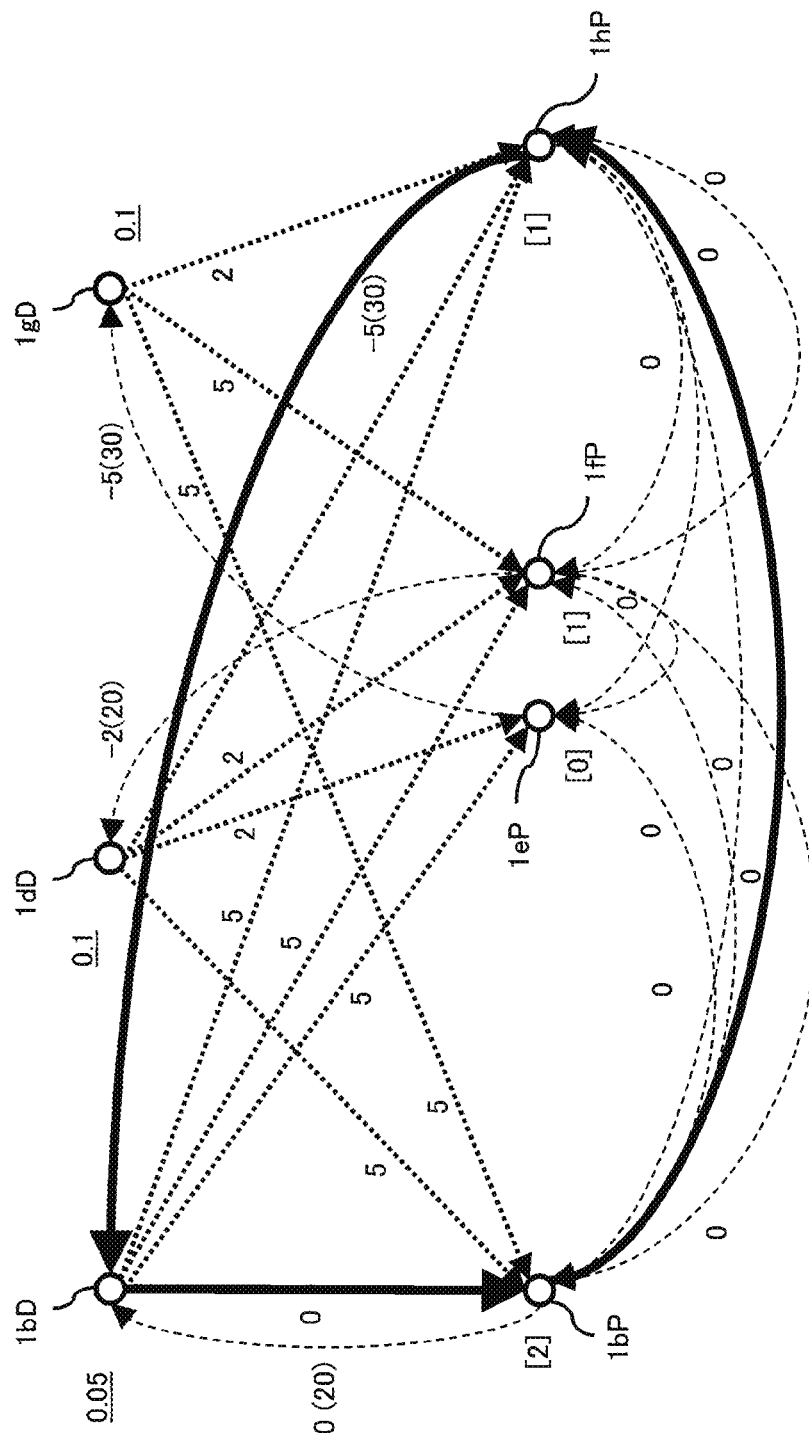
FIG. 40 is an explanatory drawing (6) of an operation example in the first exemplary embodiment.

When an allocation change of processing is carried out, the change is reflected in the communication destination storage unit 12. FIG. 39(B) indicates a graph that is generated with reference to this and stored in the node information storage unit 111. When a search processing of a negative closed path is performed once again about this, a negative closed path indicated in FIG. 40 is detected.

Figure 41:
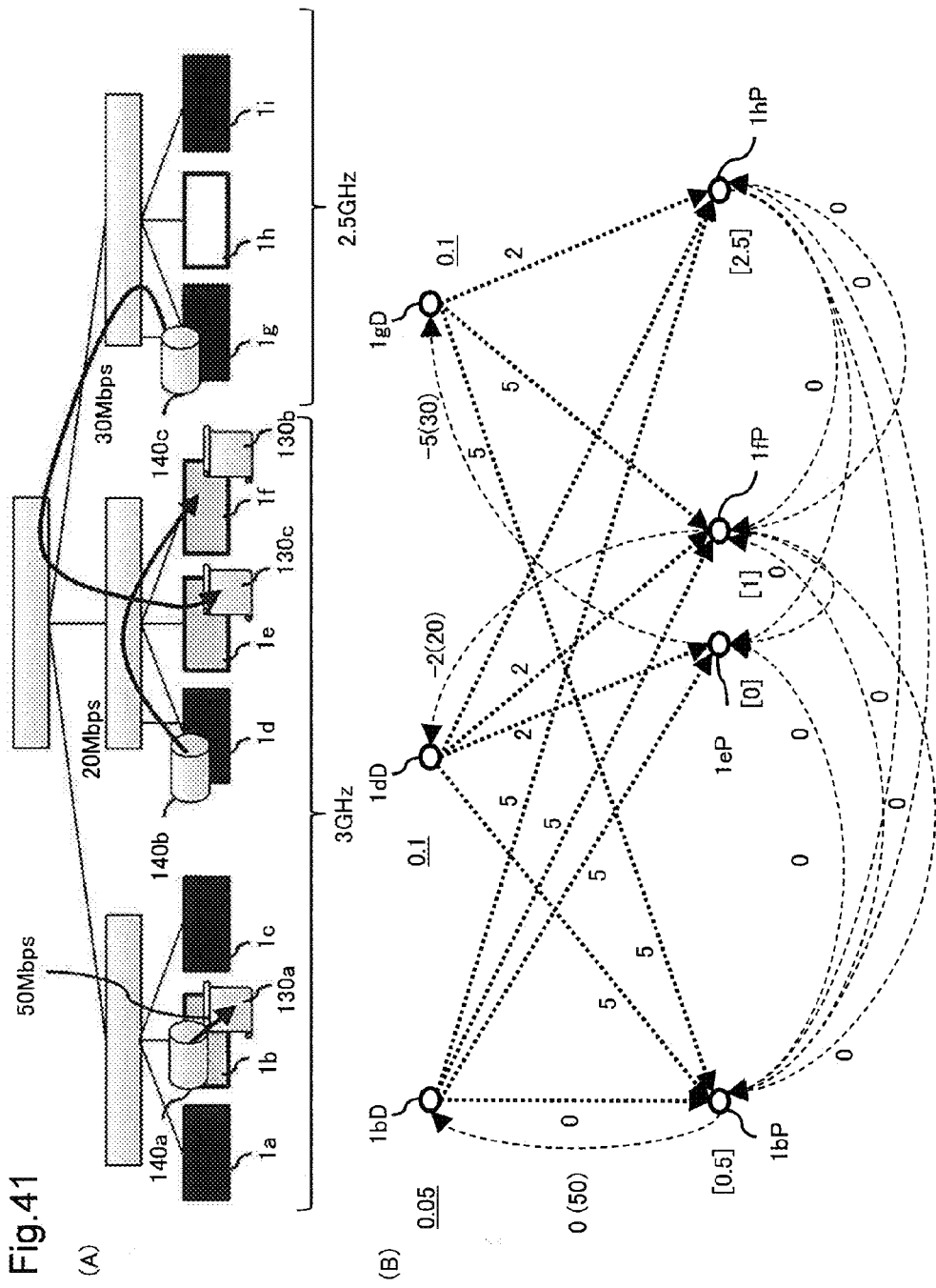
FIG. 41 is an explanatory drawing (7) of an operation example in the first exemplary embodiment.

FIG. 41(A) indicates an arrangement of data and processing to be obtained by performing a change of a traffic volume and a movement of processing based on this second closed path. The communication load is further reduced.

FIG. 41(B) indicates a graph that is generated with reference to this and stored in the node information storage unit 111. When another search processing of a negative closed path is performed again about this, a negative closed path indicated in FIG. 42 is detected.

FIG. 43 indicates an arrangement of data and processing obtained by carrying out a traffic volume change and a movement of processing based on this third closed path. The communication loads is reduced further.

Figure 42:
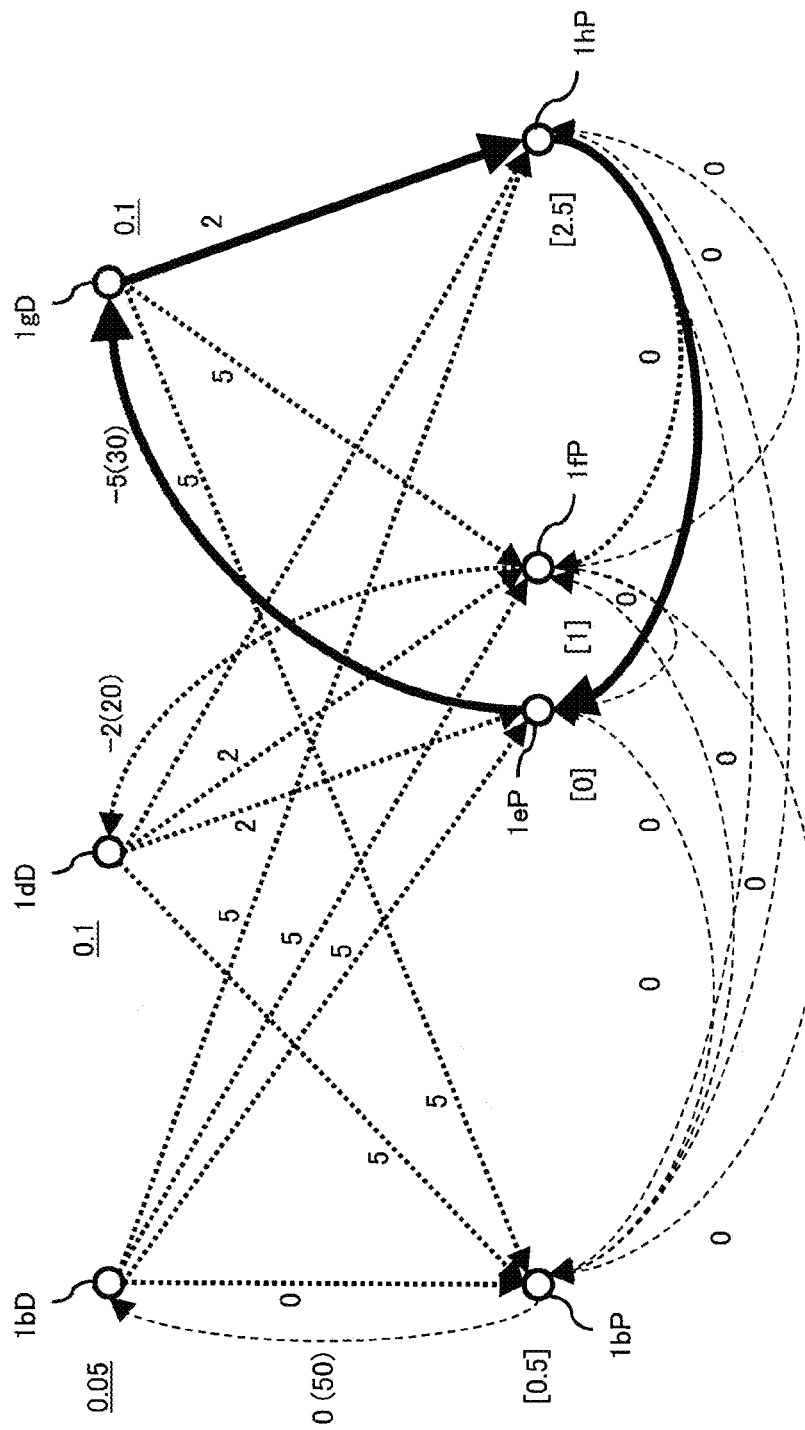
FIG. 42 is an explanatory drawing (8) of an operation example in the first exemplary embodiment.
Figure 44A:
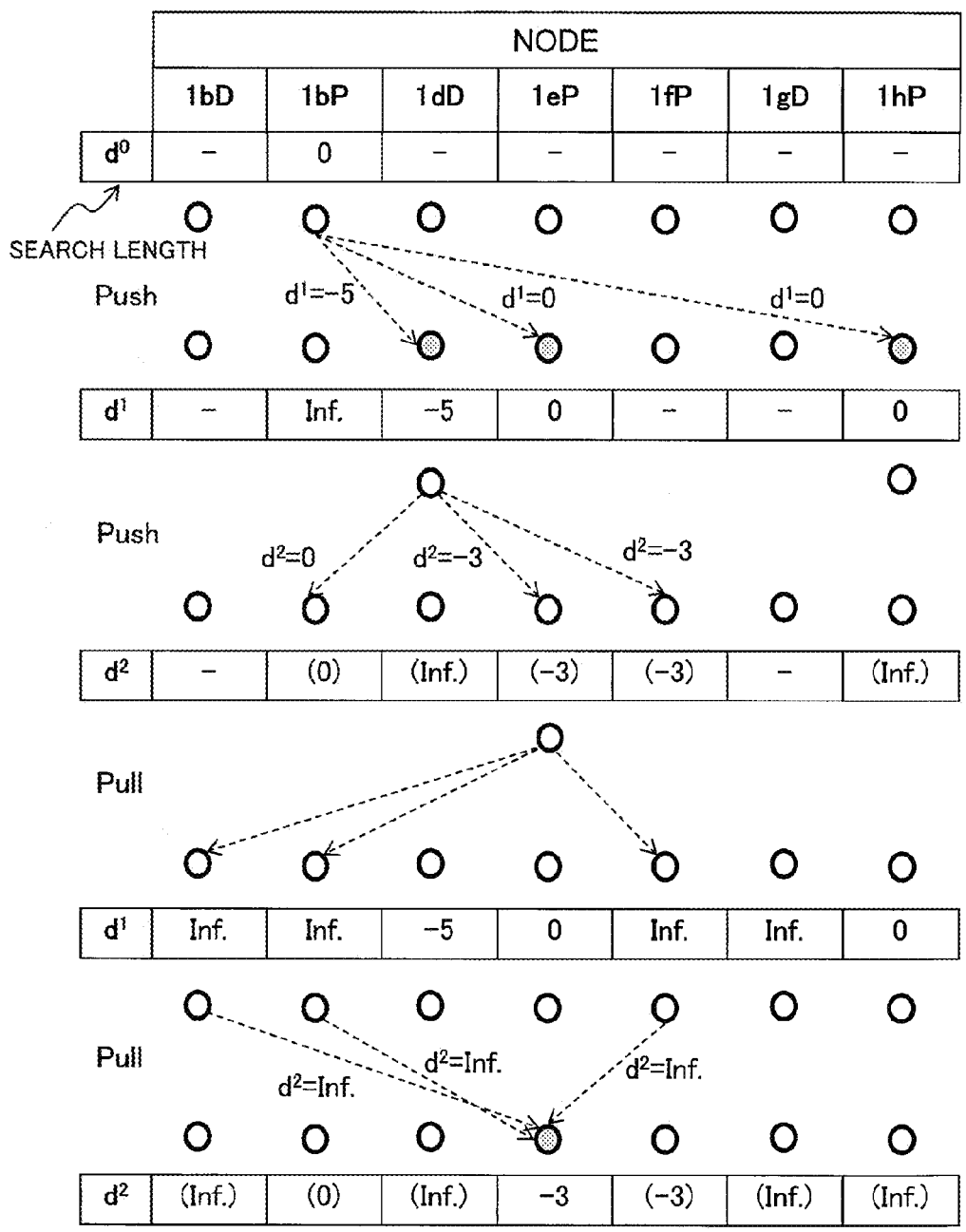
FIG. 44A is an explanatory drawing (1) of a message flow of an operation example in the second exemplary embodiment.
Figure 44B:
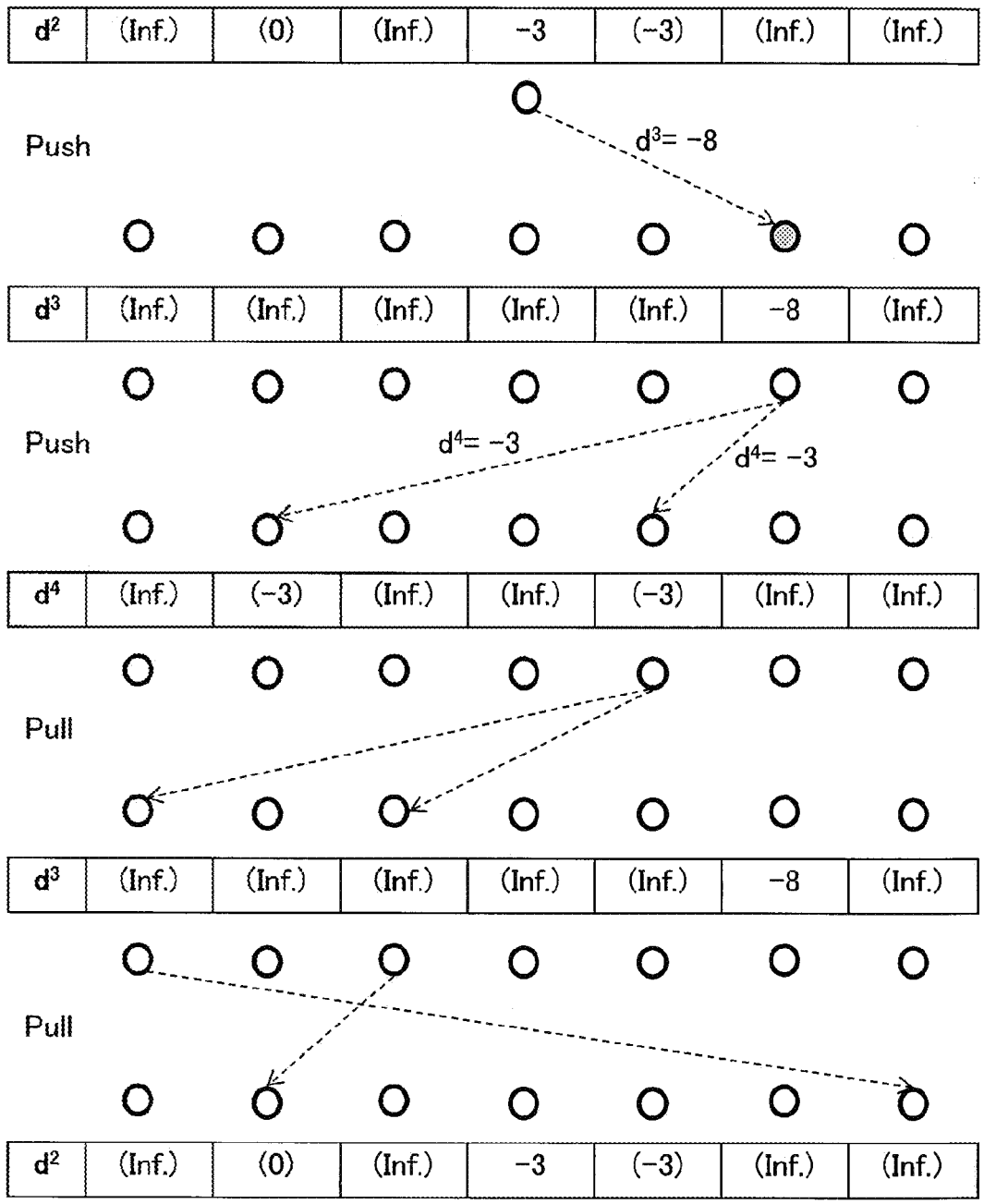
FIG. 44B is an explanatory drawing (2) of a message flow of an operation example in the second exemplary embodiment.
Figure 44C:
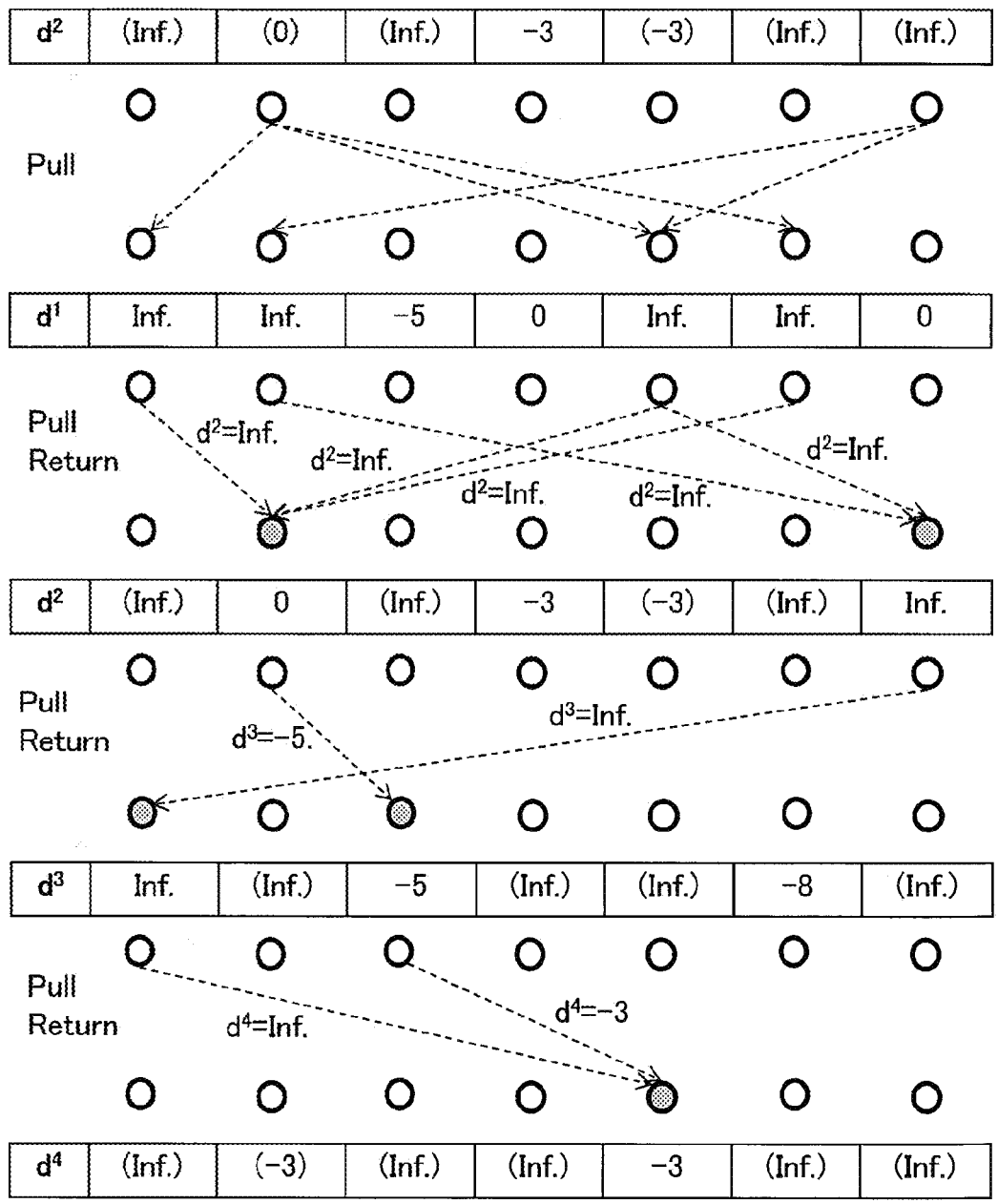
FIG. 44C is an explanatory drawing (3) of a message flow of an operation example in the second exemplary embodiment.
Figure 44E:
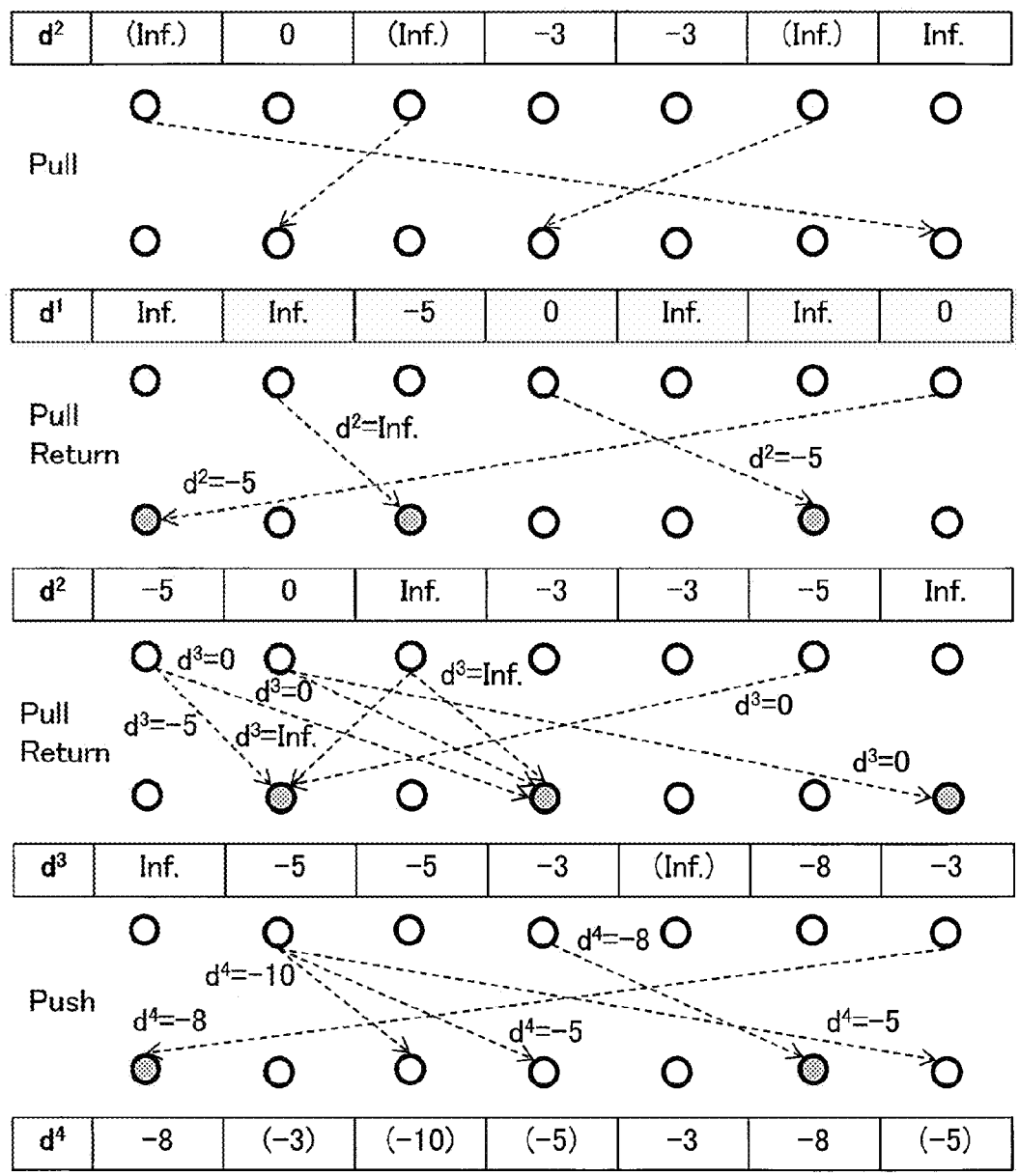
FIG. 44E is an explanatory drawing (5) of a message flow of an operation example in the second exemplary embodiment.

Meanwhile, in stead of performing a traffic volume change and a movement of processing every time the negative closed paths of FIG. 38, FIG. 40 and FIG. 42 are detected, the negative closed path detecting unit 1104 may updates only the node information storage unit 111, and, when a negative closed path is not detected any more, execute a change plan in one lump to change a traffic volume and move processing. In this case, a processing arrangement of the communication control system 90 is changed from the state of FIG. 33 (A) to the state of FIG. 43 at a time. The negative closed path detecting unit 1104 may display a change plan on the display execution unit 18 as shown in FIG. 20, and change the arrangement of processing according to directions from a user. Further, the negative closed path detecting unit 1104 may display a negative closed path shown in FIG. 48 on the display execution unit 18, and change the arrangement of processing according to directions from a user.

An Operation Example in the Second Exemplary Embodiment

As is the case with the above description, it is premised also in this description that the processing indicated in FIG. 32 is being carried out in the communication control system 90 of FIG. 33 (A), and the graph of FIG. 34 is stored in the node information storage unit 111 of such as each processing server device 1 in a dispersed manner.

In this exemplary embodiment, the transfer unit 1103 that detects a negative closed path by a search of a minimum average cost performs a message exchange with other processing server device 1 or the master device 3, and updates information on a total cost stored in the route storage unit 1106 along with progress of a search.

FIGS. 44A to 44E indicate changes in information on a total cost stored in the route storage unit 1106. In this figure, dn (n is an integer of no smaller than 0) shows a search length of a message. "Push" shows communication by the search request 40 (notification), "Pull" shows communication by the search request 40 (request), and "Pull Return" shows communication by the search request 40 (reply). In the total cost of each search length, "-" is a value representing an initial value, and "inf." is a value expressing infinity.

FIG. 45 indicates total costs stored in the progress storage unit 1105 of the starting point node finally. In this figure, dn (n is an integer of no smaller than 0) shows a search length.

FIG. 46 indicates the node identifiers of route_nodes stored in the progress storage unit 1105 of the starting point node finally. FIG. 47 indicates the communication change upper limits of route_nodes stored in the progress storage unit 1105 of the starting point node finally. In the both figures, vn (n is an integer of no smaller than 0) shows a search length.

Meanwhile, although not illustrated, a node type, a unit processing load and a remaining processing capability of a route_node are also stored in the progress storage unit 1105 of the starting point node similarly.

Henceforth, tracing the order of the search, an example of a message exchange and a state change will be described in detail.

The node 1bP makes itself a starting point node, and makes the total cost from a node in a search length 0 be 0. About the node 1dD, 1eP and 1hP stored in the out_node list 61, the node 1bP calculates the summation of the total cost 0 in the search length 0 and a cost to each of them, and notifies them of total costs -5, 0 and 0 in the search length 1.

Because a message has been received from the node 1bP in the in_node list 62, the node 1dD that has received this makes the in_node state of the node 1bP be Done. Because there are no other nodes in the in_node list 62, the node 1dD makes the total cost in the search length 1 be fixed by this received numerical value -5.

The node 1dD stores the identifier of the node 1bP that has participated in this fixed total cost in the route_node, and stores a numerical value 20 attached to this message as the communication change upper limit. Because the value has been fixed, the node 1bP adds, about each node in the out_node list 61, a cost to each node to the total cost -5 in this search length 1, and notifies: the node 1bP of a total cost 0 in a search length 2; -3 to the node 1eP; and -3 to the node 1fP.

Among these, the node 1eP stores the total cost -3 of the message that it has received as the numerical value of the total cost in that search length, and makes the in_node state of the node 1dD of the in_node list 62 be Done. However, because an in_node state from other nodes is Undone, a numerical value of a total cost is not fixed in the node 1eP. Accordingly, the node issues the search request 40 (request) to the other nodes in_node list 62. That is, the node 1eP issues the search request 40 (request) of a total cost in the search length 2 to the node 1bD, 1bP and 1fP.

Each node which has received the request confirms whether a total cost in the search length 1, which corresponds to the received "search length-1", has been fixed or not. In the node 1bD, because it has received a request about that search length for the first time, the total cost in the route storage unit 1106 is still in the initialized state. Because the starting point node does not exist in the in_node list 62 of the node 1bD, the node 1bD sets the total cost of a search length 1 to Inf. The node 1bD sends back the search request 40 (reply) of a search length 2 to the node 1eP while making the total cost be Inf. as a result of calculating the summation of the numerical value of this Inf. and the communication cost from the node 1bD to the node 1eP.

The node 1eP receives the search request 40 (reply) from the all nodes of the in_node list 62, makes all in_node states be Done, and fixes the total cost of a search length 2 as the minimum value -3 among the notified or replied total costs.

When the numerical value is fixed, the node 1eP notifies a node 1gD which exists in the out_node list 61 of a total cost –8 in a search length 3.

Because all in_node states of the in_node list 62 becomes Done, the node 1gD that has received this notifies the node 1bP and the node 1fP of a total cost –3 in a search length 4.

Between the two nodes, a numerical value of a search length 4 is not fixed in the node 1fP. Accordingly, the node 1fP transmits the search request 40 (request) to the node 1bD and 1dD for which an in_node state is Undone. Because a numerical value in a search length 3 are not fixed for both of the node 1bD and 1dD, a total cost in a search length 3 is requested to nodes having an in_node state of a search length 3 which is Undone.

In this way, the transfer unit 1103 of each piece of processing server device 1 or master device 3 of the communication control system 90 fixes the total cost of each search length of each node, and finally, obtains a total cost which each line of FIG. 45 indicates, the identifier of a route_node which each line of FIG. 46 indicates, a communication change upper limit of a route_node which each line of FIG. 47 indicates, and a unit processing amount of a route_node and a remaining processing capability which are not illustrated.

When the transfer unit 1103 of each node calculates a maximum value M of average costs, it will be a numerical value which the last row of FIG. 45 indicates. Each node transmits a search result 41 including this numerical value M, the identifier of a route_node of FIG. 46, a communication change upper limit of FIG. 45 and a unit processing load and a remaining processing capability which are not illustrated to the node 1bP that is the starting point node.

The negative closed path detecting unit 1104 of the node 1bP selects the smallest numerical value in these average costs. Here, the negative closed path detecting unit 1104 acquires total cost information transmitted by the node 1dD or 1hP for which the maximum value M of average costs is –1.7. The negative closed path detecting unit 1104 may acquire the both.

The negative closed path detecting unit 1104 acquires, from the route_node information received from the node 1dD, for example, 1bP as a route_node of a search length corresponding to the number of nodes 7, and adds this to the node list.

Figure 48:
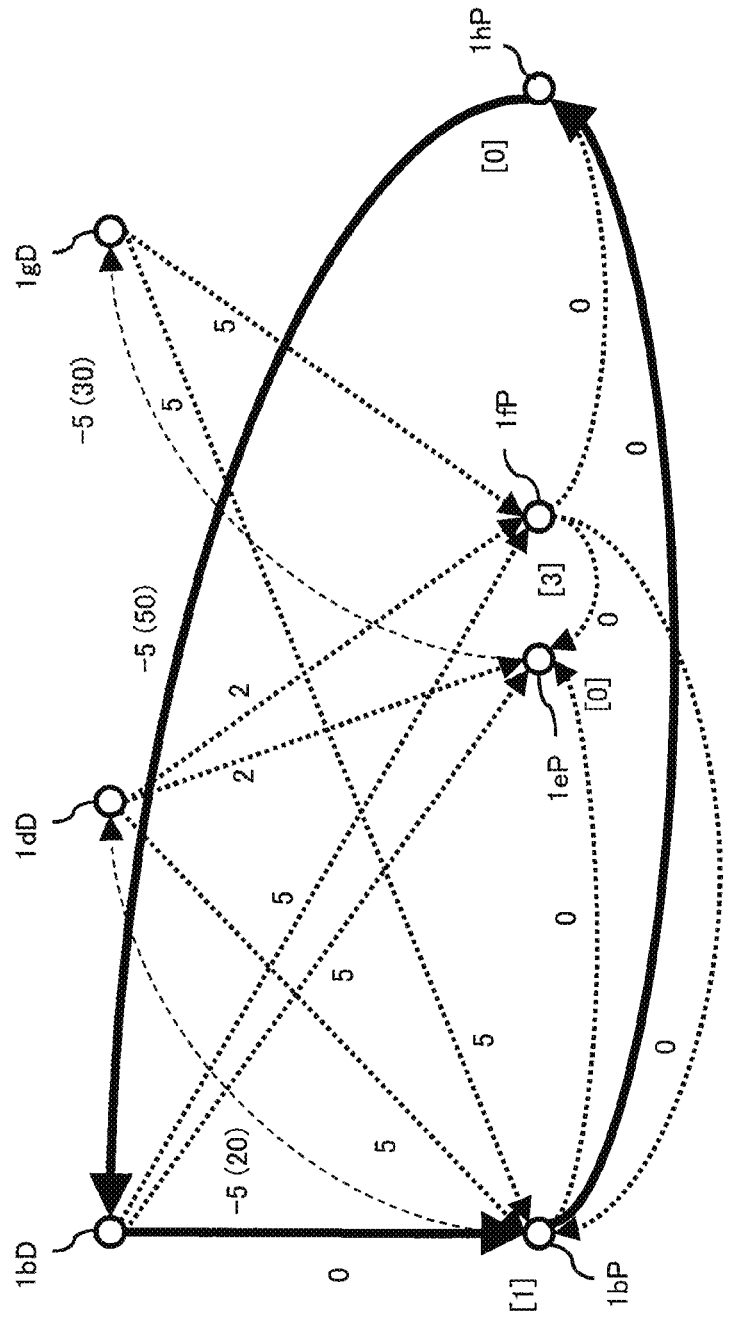
FIG. 48 is an explanatory drawing (1) of an operation example in the second exemplary embodiment.

Next, from the route_node information received from that node 1bP, the negative closed path detecting unit 1104 acquires 1bD as the route_node of a search length 6, confirms whether this exists in the node list, and, because it does not exist, adds this to the node list. Further, the negative closed path detecting unit 1104 acquires 1hP from the route_node information received from the node 1bD as the route_node of a search length 5 and adds it to the node list. Next, the negative closed path detecting unit 1104 acquires the node 1bP from the route_node information obtained from the node 1hP. Because the node 1bP already exists in the node list, this processing is ended, and a closed path {1bP, 1bD, 1hP and 1bP} is obtained. FIG. 48 indicates the closed path obtained here.

Next, the negative closed path detecting unit 1104 acquires a maximum value (change flow rate) of a flow amount that can be removed along this closed path of FIG. 48.

First, the negative closed path detecting unit 1104 refers to the communication change upper limits (FIG. 47) stored in the progress storage unit 1105, and obtains 50 which is the smallest numerical value among a numerical value Inf. of 1bP in a search length 6, 50 in a search length 5 and Inf. in a search length 4.

Next, the negative closed path detecting unit 1104 calculates an addable quantity of processing of the closed path of FIG. 48. As a communication addition change from a node of the data type (data node) to a node of the processing type (processing node) in the closed path, the negative closed path detecting unit 1104 performs a traffic volume addition from the node 1bD to the node 1bP, and does not reduce a traffic volume from the node 1bP. A remaining processing amount of the node 1bP is 1. A unit processing load of the program 130a that processes the stream 140a in the node 1bD is 0.05. The negative closed path detecting unit 1104 calculates 1/0.05 and finds an addable quantity of processing at the node 1bP as 20. In this closed path, this is the smallest addable quantity of processing.

The negative closed path detecting unit 1104 compares the minimum value 50 of a communication change upper limit and the minimum value 20 of an addable quantity of processing, and acquires the smaller numerical value 20 as a change flow rate. The negative closed path detecting unit 1104 changes communication in this closed path so that a traffic volume corresponding to this may be reduced via the processing moving unit 17 or the like.

The negative closed path detecting unit 1104 deploys the program 130a that processes the stream 140a of the node 1bD in the node 1bP, and gives the node 1bP an assignment to carry out a stream corresponding to 20 Mbps. Further, the negative closed path detecting unit 1104 reduces communication from the node 1bD to the program 130a of the node 1hP by 20 Mbps and reduces its processing load.

Figure 49:
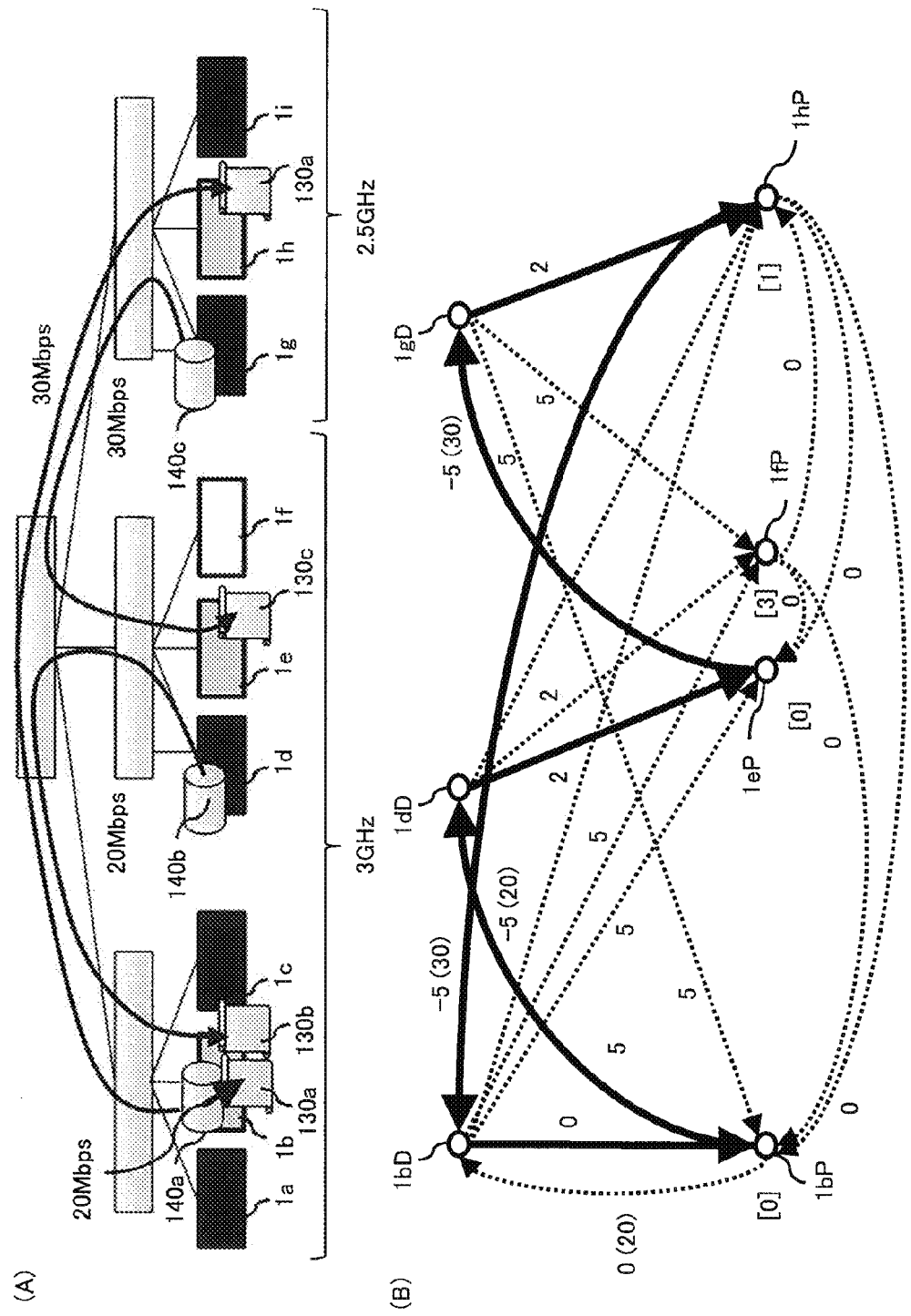
FIG. 49 is an explanatory drawing (2) of an operation example in the second exemplary embodiment.

FIG. 49 (A) indicates an arrangement of data and processing obtained by changing a traffic volume and moving processing based on the closed path of FIG. 48. FIG. 49 (B) indicates a graph which is generated with reference to this and stored in the node information storage unit 111, and a negative closed path which is detected when search processing of a negative closed path is performed again to that.

The negative closed path detecting unit 1104 obtains 20 as a minimum value of a communication change upper limit to this negative closed path.

The negative closed path detecting unit 1104 finds a minimum value of an addable quantity of processing to this closed path as follows. First, about the node 1bP, the negative closed path detecting unit 1104 makes the addable quantity of processing of the node 1bP infinite because a unit processing load 0.1 to be removed is larger than a unit processing load 0.05 to be added. Next, about the node 1eP, the negative closed path detecting unit 1104 makes the addable quantity of processing of the node 1eP infinite because a unit processing load to be removed and a unit processing load to be added are identical. About the node 1hP, the negative closed path detecting unit 1104 makes the addable quantity of processing of the node 1hP be 20 by calculation of 1/(0.1−0.05) because a unit processing load to be removed is 0.05, a unit processing load to be added is 0.1 and a remaining processing capability is 1. As a result, the negative closed path detecting unit 1104 makes the smallest addable quantity of processing be 20.

The negative closed path detecting unit 1104 makes the change flow rate be 20 because the smallest communication change upper limit value 20 and the smallest addable quantity of processing 20 are identical, and applies it to the closed path of FIG. 49 (B).

That is, the negative closed path detecting unit 1104 plans a change in which an amount of processing of the data 140a on the node 1bD by the node 1bP is increased by 20, processing of the stream 140b that the node 1bP has received from the node 1dD and been processing is stopped, and this stream is processed by the node 1eP. Further, the negative closed path detecting unit 1104 plans a change to stop processing of 20 Mbps among the streams on the node 1gD that have been being processed by the node 1eP, and process a stream corresponding to 20 Mbps by the node 1hP. The negative closed path detecting unit 1104 plans such that a stream from a node 1b which has been being processed by the node 1h is decrease by an amount corresponding to 20 Mbps.

Figure 50:
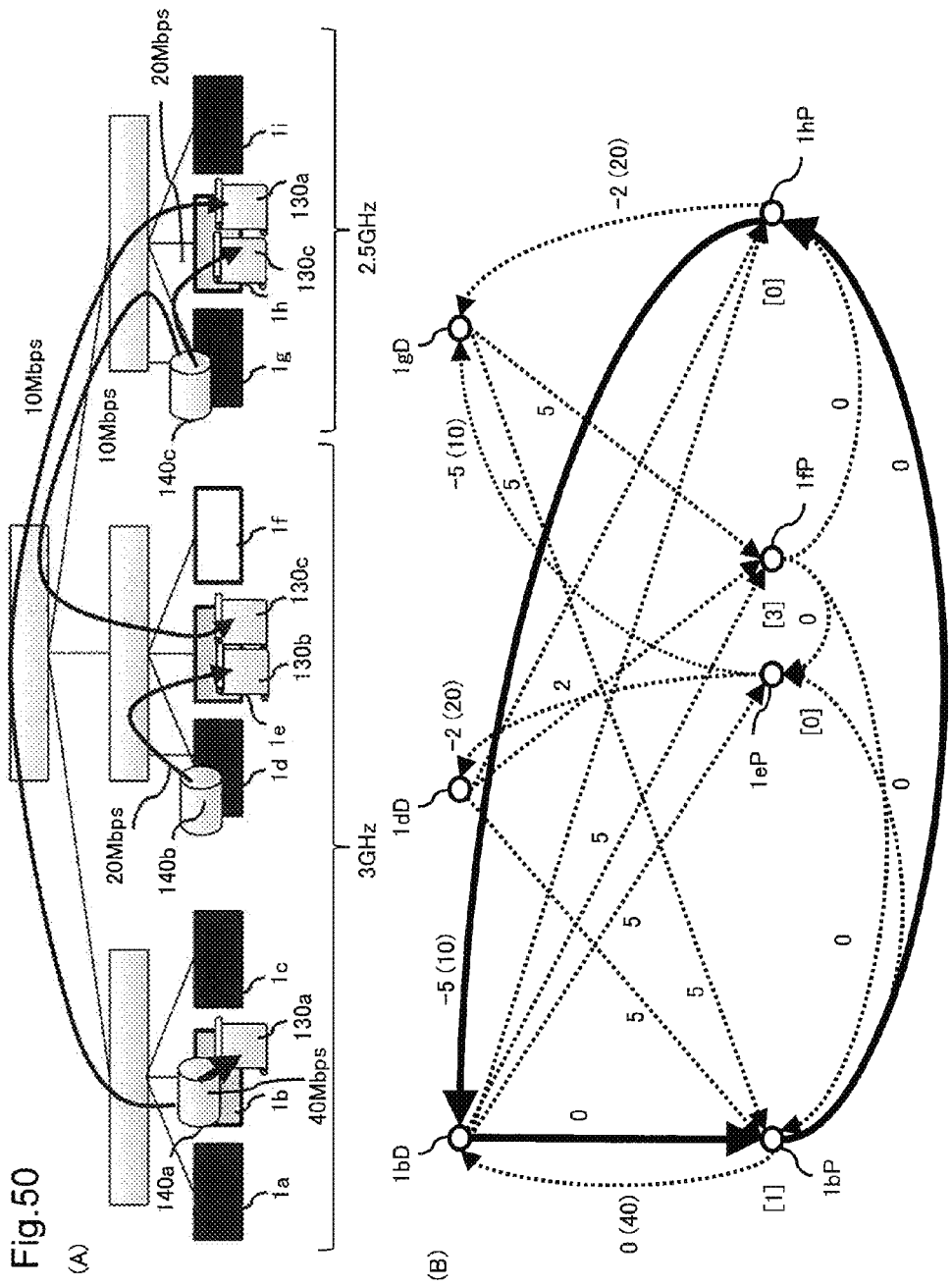
FIG. 50 is an explanatory drawing (3) of an operation example in the second exemplary embodiment.

FIG. 50 (A) indicates an arrangement of data and processing to be obtained by changing a traffic volume and moving processing based on the closed path of FIG. 49 (B). FIG. 50 (B) indicates a graph which is generated with reference to this and stored in the node information storage unit 111, and a negative closed path which is detected when a search processing of a negative closed path is performed further once more to that.

Figure 51:
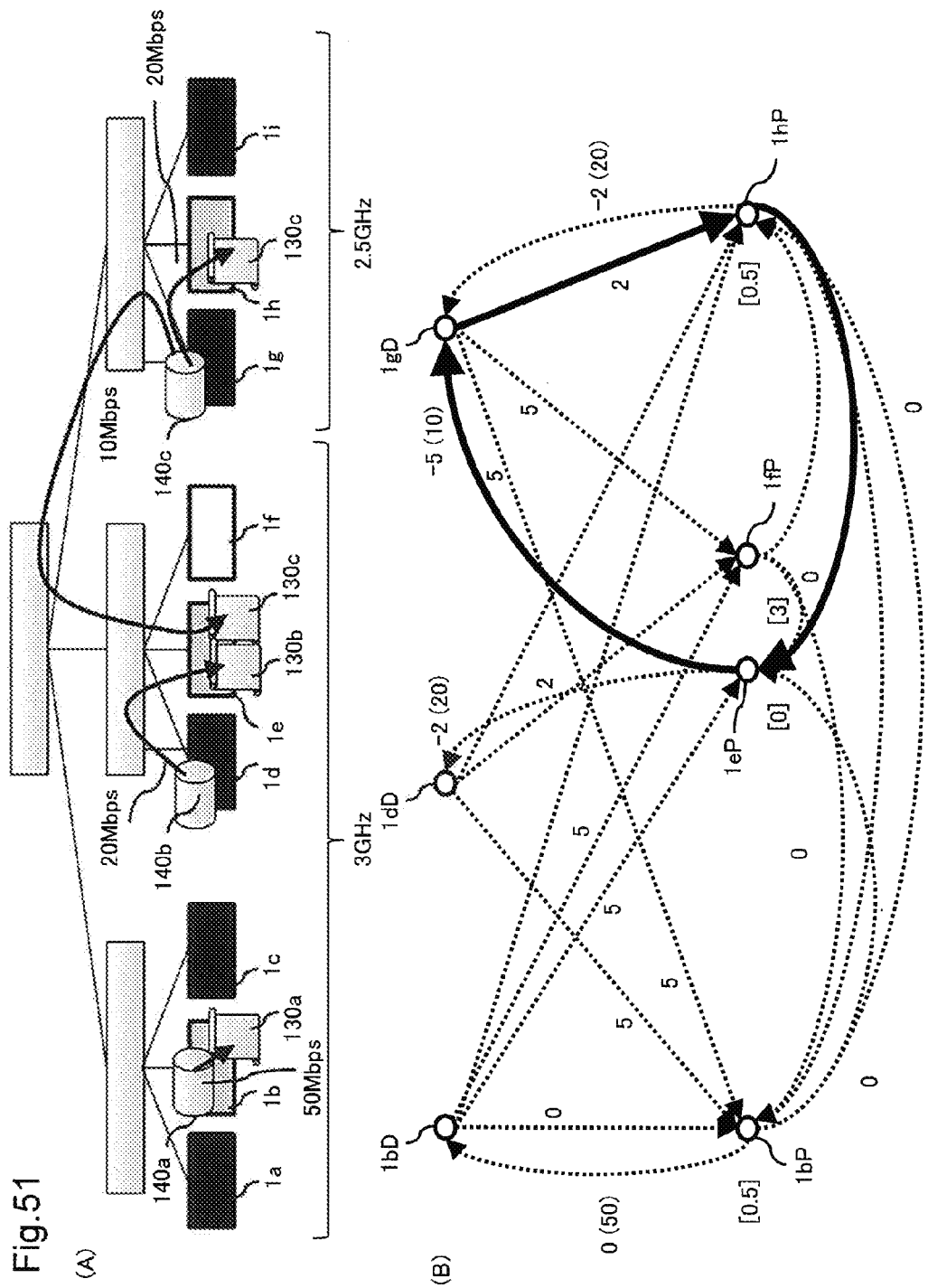
FIG. 51 is an explanatory drawing (4) of an operation example in the second exemplary embodiment.

FIG. 51 (A) indicates an arrangement of data and processing to be obtained by a traffic volume change and a movement of processing of 10 Mbps based on the closed path of FIG. 50 (B). FIG. 51 (B) indicates a graph which is generated with reference to this and stored in the node information storage unit 111, and a negative closed path which is detected when a search processing of a negative closed path is performed yet again to this.

Figure 52:
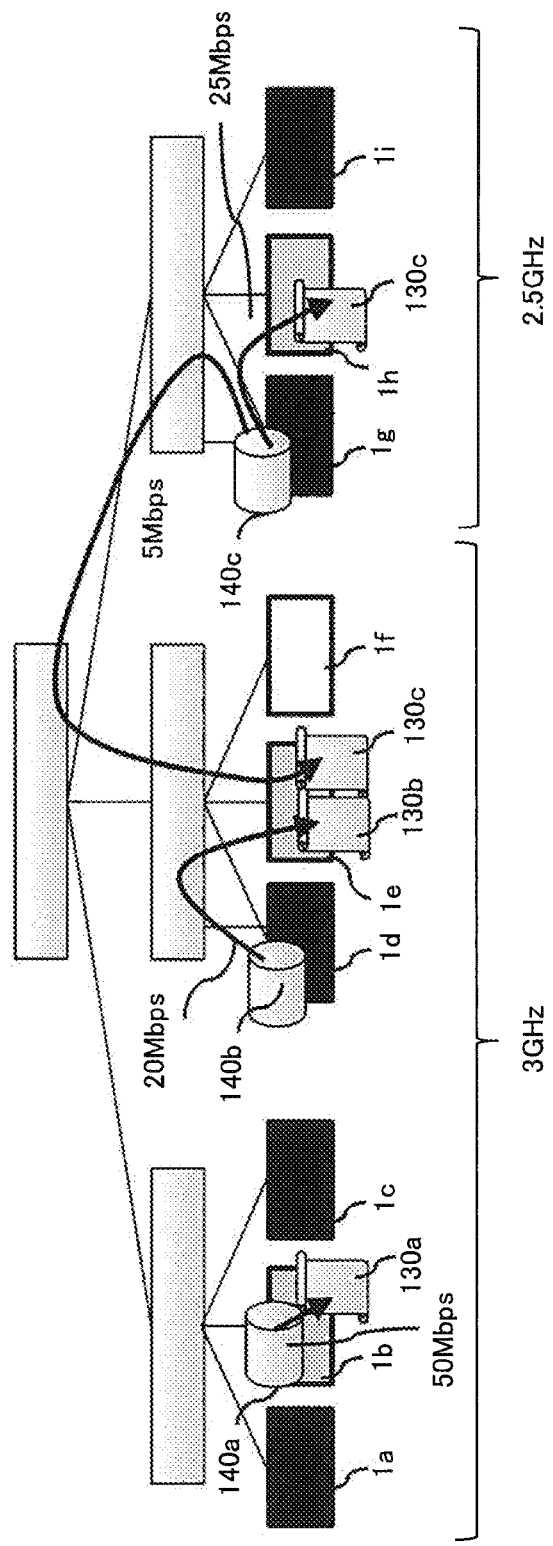
FIG. 52 is an explanatory drawing (5) of an operation example in the second exemplary embodiment.

FIG. 52 indicates an arrangement of data and processing to be obtained by performing a change of traffic volume and a movement of processing corresponding to 5 Mbps based on the closed path of FIG. 51 (B). The negative closed path detecting unit 1104 cannot obtain a negative closed path from this configuration.

Meanwhile, in stead of performing a traffic volume change and a movement of processing every time the negative closed paths of FIG. 48, FIG. 49(B), FIG. 50(B) and FIG. 51(B) are detected, the negative closed path detecting unit 1104 may update only the node information storage unit 111, and execute a change plan in one lump when a negative closed path is not detected any more. In this case, the processing arrangement of the communication control system 90 is changed from the state of FIG. 33 (A) to the state of FIG. 52 at once. As shown in FIG. 20, the negative closed path detecting unit 1104 may display a change plan on the display execution unit 18, and change the arrangement of processing according to directions from a user.

Operation Example in the Third Exemplary Embodiment

Figure 53:
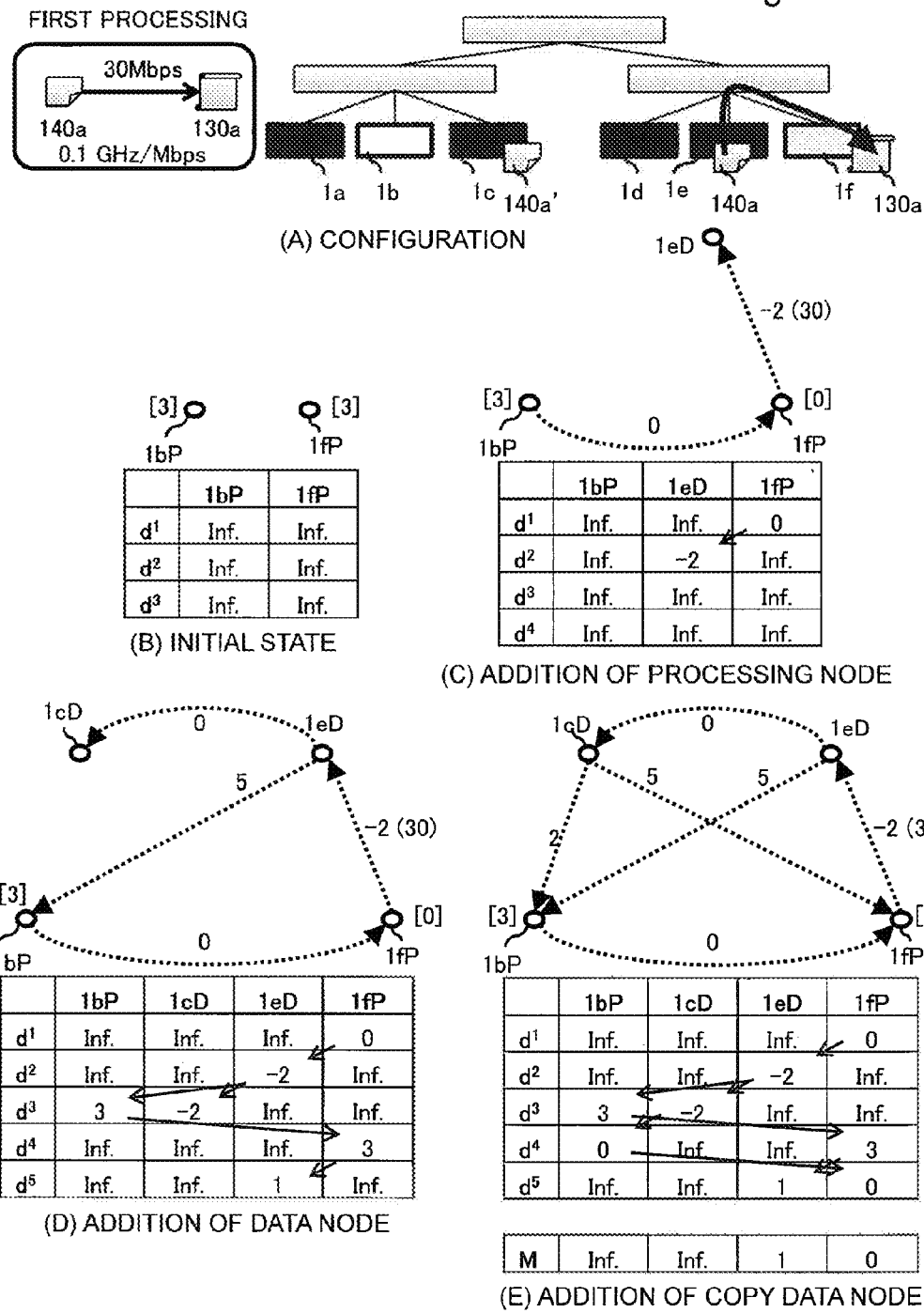
FIG. 53 is an explanatory drawing (1) of an operation example in the third exemplary embodiment.

FIG. 53 (F) shows an example of a first processing for which an execution instruction is issued from a user. The first processing is processing in which a program 130a processes a stream 140a by which data is generated steadily. The program 130a is an application program which a user uses. The stream 140a is generating data of approximately 30 Mbps, and a computing capability which is needed for the program 130a per a unit data amount of the stream 140a is 0.1 GHz/Mbps.

FIG. 53 (A) indicates a configuration of the communication control system 90 of this operation example. The communication control system 90 includes six processing server device 1, and they are connected to two switches in units of three devices, and the two switches are further connected to a higher rank switch.

The data 140a of the first processing is being stored in processing server devices 1c and 1e, and the program 130a that processes this is carried out in a processing server device 1f.

FIG. 53 (B) indicates route information stored in the processing server devices 1b and 1f before execution of the first processing. Because no processing is being carried out, the total cost in a search length 1 is Inf.

When execution of the first processing is begun in this state, and this is informed via the update reception unit 114, the update unit 1113 of the node 1fP carries out the procedure of FIG. 25. The update unit 1113 acquires a communication cost 2 between a processing node 1fp and a data node 1eD, registers a negative value −2 of this and a using traffic volume 30 with the out_node list 61 of the processing node 1fp and registers the processing node 1fp with the in_node list 62 of the data node 1eD.

At that time, the total cost of the processing node 1fp in a search length 1 is Inf., but not zero. Accordingly, the update unit 1113 acquires processing nodes having a remaining processing capability that is not zero in the processing node candidate list 63 acquired from the node information sharing storage unit 1134 or the like. As a result, the update unit 1113 obtains a processing node 1bP. Although the remaining processing capability of this processing node 1fp is zero, there is no processing node existing in the out_node list 61.

Next, the update unit 1113 makes the total cost of a search length 1 of this processing node 1fp be 0, and performs link registration notification with a total cost −2 and a search length 2 to the node 1eD which is a node in the out_node list 61. The node 1eD makes this numerical value the total cost of a search length 2, and registers the identifier of the node 1fP with a node identifier of a route_node (FIG. 53(C)).

By a notification or the like from the processing server device 1f, a procedure (FIG. 23) involving a start of data reception/transmission and processing is carried out about the node 1eD in the processing server device 1e. Because this is a start of processing which takes this node 1eD itself as an object, not a start of communication in a copying destination, the update unit 1113 acquires a node 1cD which is storing a copy of processing target data.

The update unit 1113 adds the node 1cD to the out_node list 61 of a data server 1eD with a communication cost zero and a communication change upper limit that is infinite, and adds the node 1eD to the in_node list 62 of a data server 1cD.

Next, the update unit 1113 directs execution of a procedure (FIG. 23) involving a start of data reception/transmission and processing about the node 1cD that is storing the copied data, and performs link registration notification to the node 1cD. The update unit 1113 of the node 1cD updates the total cost of a search length 3 to −2.

Next, the update unit 1113 makes a unit processing amount 0.1 GHz/Mbps of processing that is processing data of the data node 1eD be a minimum unit processing amount. Because a remaining processing capability of the node 1bP in the processing node candidate list 63 is not zero, the update unit 1113 adds a communication cost 5 between the node 1eD and the node 1bP to the out_node list 61 of the node 1eD together with the identifier of the processing node 1bP, and adds the identifier of the node 1eD to the in_node list 62 of the processing node 1bP.

The update unit 1113 of the node 1eD performs link registration notification to the node 1bP. The node 1bP makes the total cost in a search length 3 be 3. Because route information has been updated by the link registration notification in the node 1bP, influence of this update propagates to the node 1fp and the node 1eD, successively (FIG. 53 (D)).

Receiving a start reflection instruction of data reception/transmission and processing about the data node 1cD mentioned above, the update unit 1113 of such as the processing server device 1c communication costs 2 and 5, respectively.

FIG. 53(E) indicates information of such as the node information storage unit 111 and the route storage unit 1106 obtained as a result of this. The starting point of an arrow in the table indicates a route_node. The lowest row in the table indicates a maximum value M of average costs of the respective nodes.

Because there is no closed path having a negative average costs existing in this state, a communication change plan is not generated. Meanwhile, here, a node which has detected increase of N of the number of nodes notifies other nodes of this, and route information is updated according to that.

FIG. 54(A) indicates a state where the communication control system 90 that is in the state indicated by FIG. 53 (E) has begun a second processing.

FIG. 54(F) shows an example of the second processing. The second processing is processing in which a program 130*b* processes a stream 140*b* generating data steadily. The program 130*b* is an application program which a user uses. The stream 140*b* is generating data of approximately 30 Mbps, and a computing capability which is needed for the program 130*a* per a unit data amount of the stream 140*b* is 0.1 GHz/ Mbps.

The data 140*b* of the second processing is being stored in processing server devices 1*a* and 1*f*, and the program 130*b* that processes this is carried out in the processing server device 1*b*.

When the second processing is begun in the processing server device 1*b*, and this is notified of via the update reception unit 114, the update unit 1113 of the processing node 1*b*P establishes a link to a node 1*a*D with a communication cost −2, and updates route information of the route storage unit 1106 about the data node 1*a*D (FIG. 54(B)).

Figure 54:
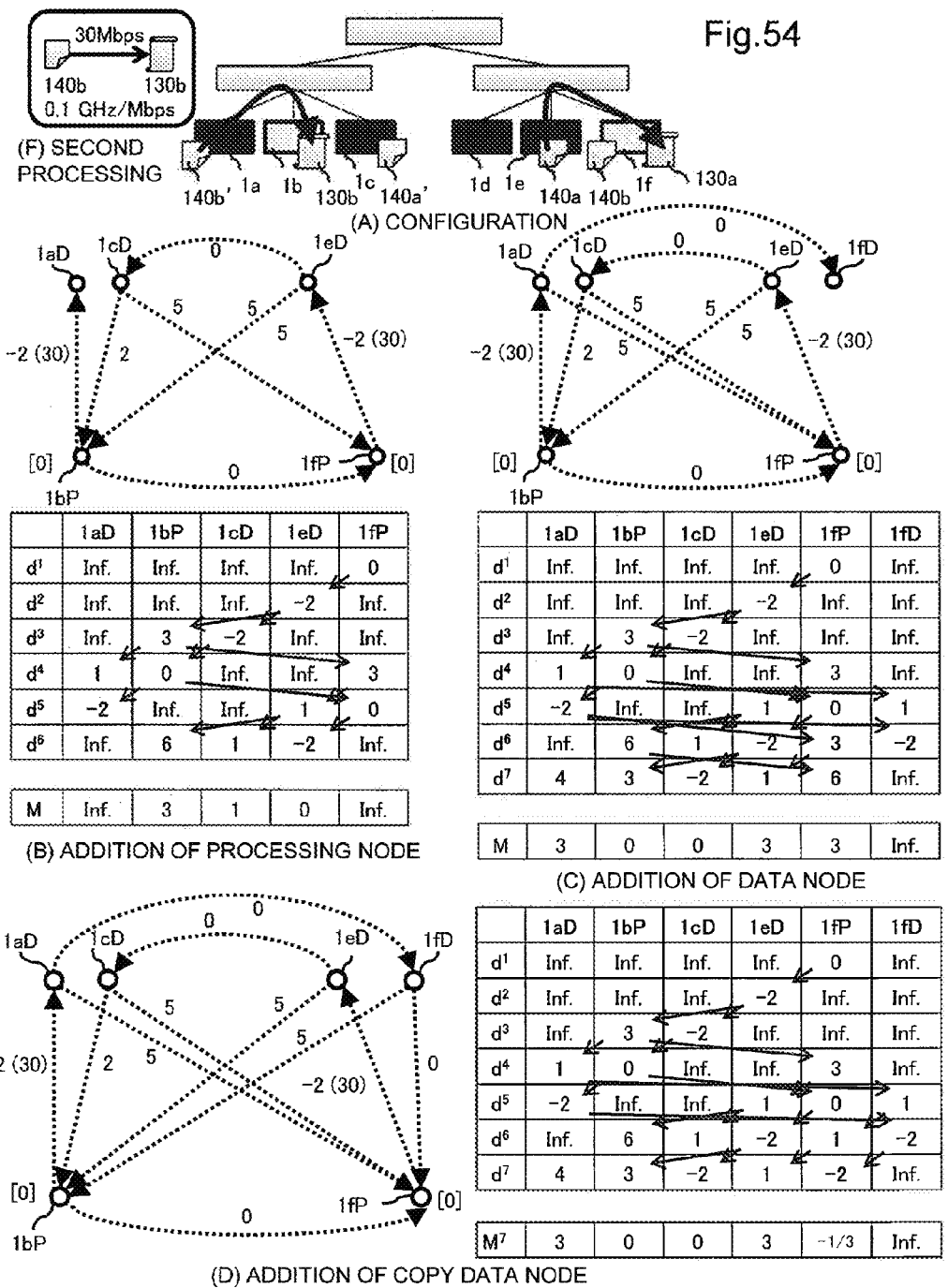
FIG. 54 is an explanatory drawing (2) of an operation example in the third exemplary embodiment.

The update unit 1113 of the node 1*a*D establishes a link to other data node 1*f*D having a copy of data for which communication and processing has been begun with a communication costs 0, and to the node 1*f*P with a communication cost 5, and updates respective pieces of route information (FIG. 54 (C)).

Similarly, the update unit 1113 of the node 1*f*D establishes a link to the node 1*f*P with a communication cost 0 and to the node 1*b*P with a communication cost 5, and updates route information (FIG. 54 (D)).

The update unit 1113 of the node 1*f*P detects a negative numerical value (−⅓) as a calculation result of a maximum value M of average costs (the lowest row in the table of FIG. 54(D)).

Figure 55:
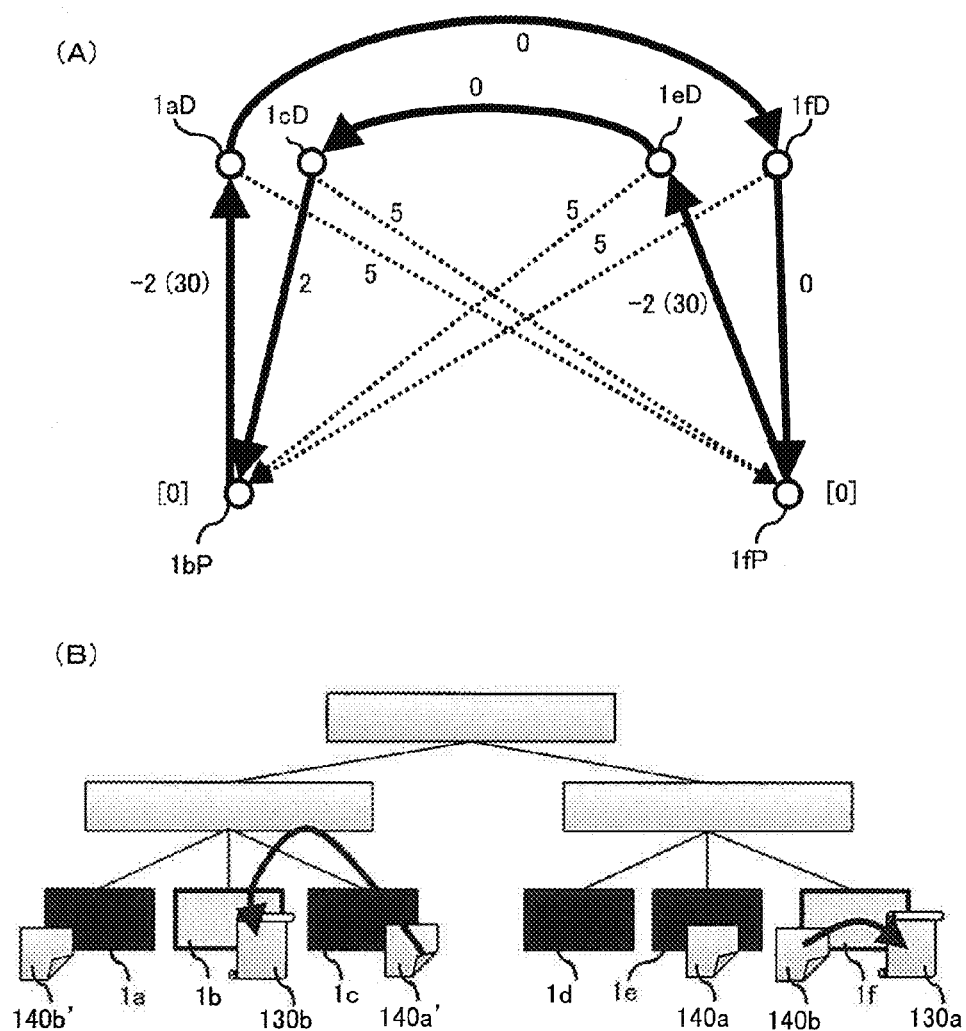
FIG. 55 is an explanatory drawing (3) of an operation example in the third exemplary embodiment.

By following the route_nodes, the closed path (FIG. 55(A) of (1*f*P, 1*f*D, 1*a*D, 1*b*P, 1*c*D, 1*e*D and 1*f*P) is obtained, and, when a change plan based on this is executed, the communication control system 90 can realize a processing assignment of a low communication cost (FIG. 55 (B)).

Next, operations when there are processing flow restrictions will be described, taking the processing indicated in FIG. 57(A) as an example. Here, two pieces of data are stored in the processing server device 1*b* and the processing server device 1*d*, and they are processed in the processing server device 1*c* and the processing server device 1*e*, respectively. Outputs of the processing are stored in the processing server device 1*f* and the processing server device 1*a*, respectively.

Figure 57:
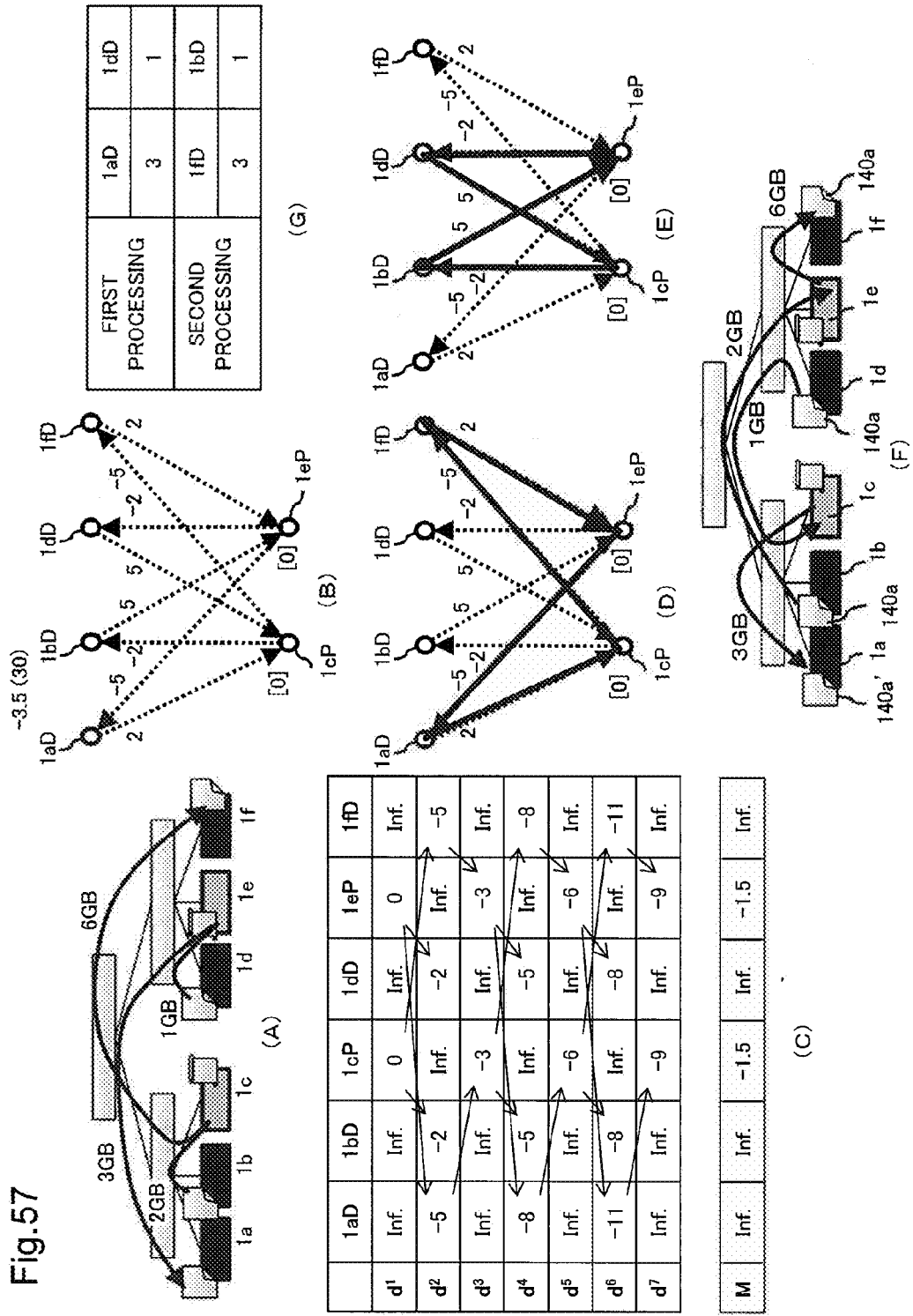
FIG. 57 is an explanatory drawing (5) of an operation example in the third exemplary embodiment.

FIG. 57(B) indicates links stored in the out_node list 61 and the in_node list 62 on this occasion. FIG. 57(C) shows route information stored in the route storage unit 1106, and FIG. 57(D) shows a negative closed path (1*e*P, 1*a*D, 1*c*p, 1*f*D and 1*e*P) to be detected. The maximum value M of average communication costs of this negative closed path is −1.5, and the total communication cost is −6.

A change plan of communication based on this negative closed path includes: about the node 1*e*P, a deletion of communication with the node 1*a*D and an addition of communication with the node 1*f*D; and, about a node 1*c*P, an addition of communication with the node 1*a*D and a deletion of communication with a node 1*f*D. Here, because (1*a*D, 1*d*D) and (1*f*D, 1*b*D) exist as a processing flow restriction, on the occasion of determining a change plan, the negative closed path detecting unit 1104 also evaluates communication costs of: about the node 1*e*P, an addition of communication with the node 1*d*D and a deletion of communication with the node 1*b*D; and, about the node 1*c*P, an addition of communication with the node 1*d*D and a deletion of communication with the node 1*b*D. This change corresponds to the closed path of FIG. 57(E).

The communication costs of respective links of FIG. 57(E) are −2*(3/1), 5*(3/1), 5*(3/1) and −2*(3/1), and the total communication cost of this closed path is 2.

The total cost of the detected negative closed path (FIG. 57(D)) is −6, and the total cost of the closed path calculated from the restriction (FIG. 57(E)) is 2, resulting in their total being negative. Therefore, the negative closed path detecting unit 1104 reflects the both change plans based on FIG. 57(D) and FIG. 57(E) in the processing moving unit 17.

FIG. 57(F) shows the processing arrangement after the movement.

FIG. 56 indicates a case where data is processed sequentially and processing nodes are assigned sequentially (A), and a case where processing nodes for related processing are assigned in one lump (B). When they are assigned sequentially (A), the search processing unit 110 models output of the processing of the former stage as input data of the processing of the latter stage, and determines assignment using the methods from the first to third exemplary embodiments sequentially.

When they are assigned in one lump, the search processing unit 110 not only perform assignment of processing on a certain processing server device 1 so that it may be assigned near a processing server device 1 that stores the input data of the former stage, but also determines a processing server device 1 to which processing is assigned in consideration of closeness to a processing server device 1 that stores output data of the latter stage, that is, in a manner reflecting a processing flow restriction as mentioned above.

Operation Example in the Fourth Exemplary Embodiment

Figure 58:
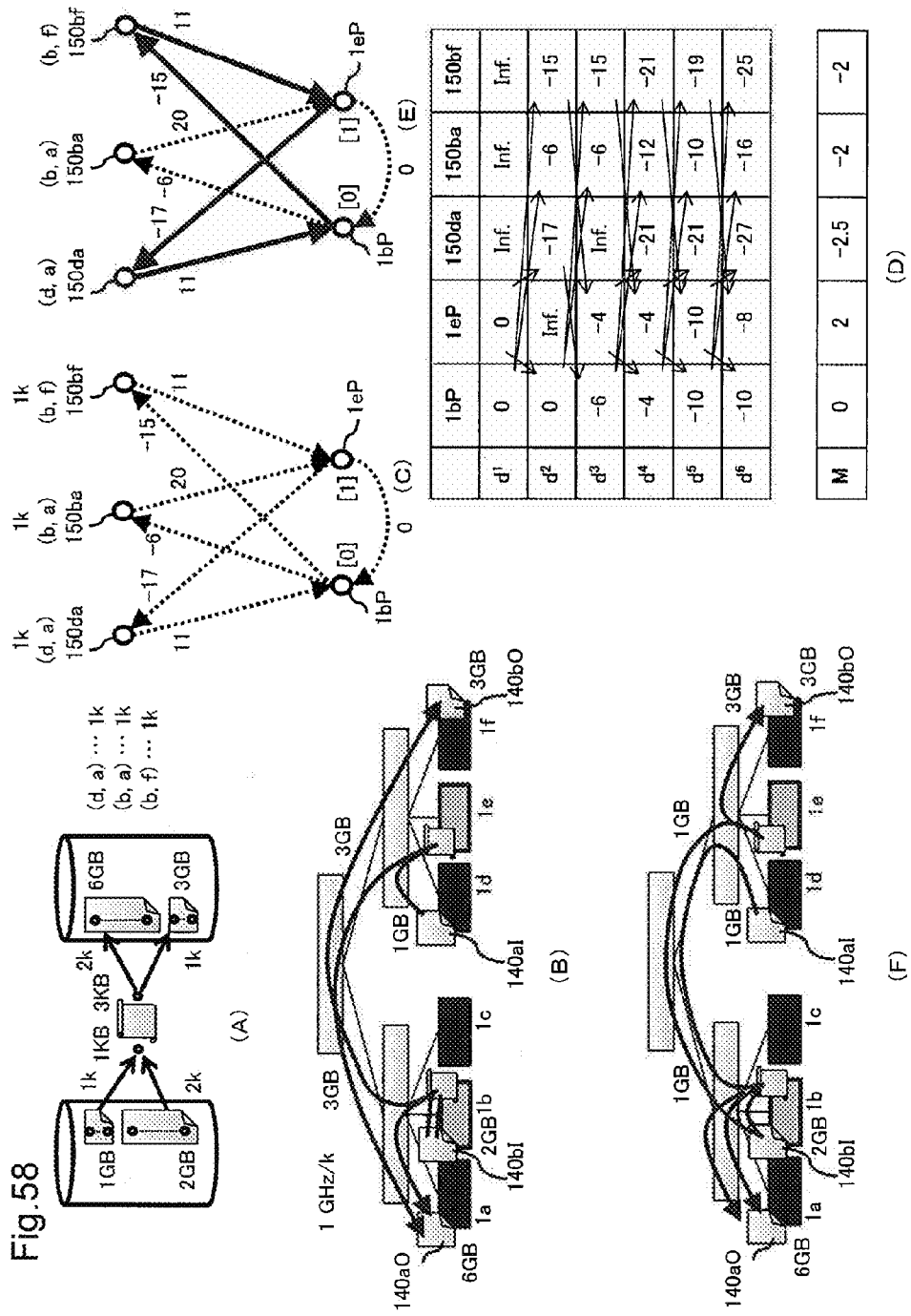
FIG. 58 is an explanatory drawing (1) of an operation example in a fourth exemplary embodiment.

FIG. 58 indicates an example of the communication control system 90 that performs processing of one input and one output used in this description.

Data files of 1 GB and 2 GB (d and b of FIG. 58(A)) which constitute an input data set are stored in the processing server device 1*d* and the processing server device 1*b*, respectively (FIG. 58(B)).

Data (d) on the processing server device 1*d* is processed in the processing server device 1*e*, and the result of the processing (3 GB) is stored in the processing server device 1*a*. Data (2 GB) on the processing server device 1*b* is processed in the processing server device 1*b*, and one half (3 GB) of the result of the processing (6 GB) is stored in the processing server device 1*a* and the other half (3 GB) is stored in the processing server device 1*f*. In other words, the data files of 6 GB and 3 GB constituting an output data set are stored in the processing server device 1*a* and the processing server device 1*f*. Meanwhile, the storage location of a piece of output data corresponding to each piece of input data is decided uniquely by the identifier of data and its hash value, for example.

In this example, as a pair of a processing server device 1 of input data and a processing server device 1 of output data, there exist (the processing server device 1d and the processing server device 1a), (the processing server device 1b and the processing server device 1a) and (the processing server device 1b and the processing server device 1f). The respective pairs have an input data amount of 1 GB and an output data amount of 3 GB.

The communication control system 90 of this exemplary embodiment manages these pairs as a data node. The communication cost between the pair (described as a data node 150da in the figure) of (the processing server device 1d and the processing server device 1a) and the processing server device 1b (the processing node 1bP) will be 1×5+3×2=11 by reflecting ratios of data amounts of input and output. Also, the communication cost between the pair (data node 150da) of (the processing server device 1d and the processing server device 1a) and the processing server device 1e (the processing node 1eP) will be 1×2+3×5=17.

Following such management method, the processing server device 1a, 1b, 1d and 1f as well as the processing server device 1e and 1b create their own in_node list 62 and out_node list 61 in a manner targeting the processing node 1bP, 1eP, data nodes 150da and 150ba and 150bf. Here, data nodes 150da, 150ba and 150bf correspond to the pairs of (the processing server device 1d and the processing server device 1a), (the processing server device 1b and the processing server device 1a) and (the processing server device 1b and the processing server device 1f), respectively.

FIG. 58(C) shows links created as a result of this, (D) is route information to be generated and (E) is a negative closed path to be detected. FIG. 58(F) shows an arrangement of processing after performing a change based on this negative closed path.

Figure 59:
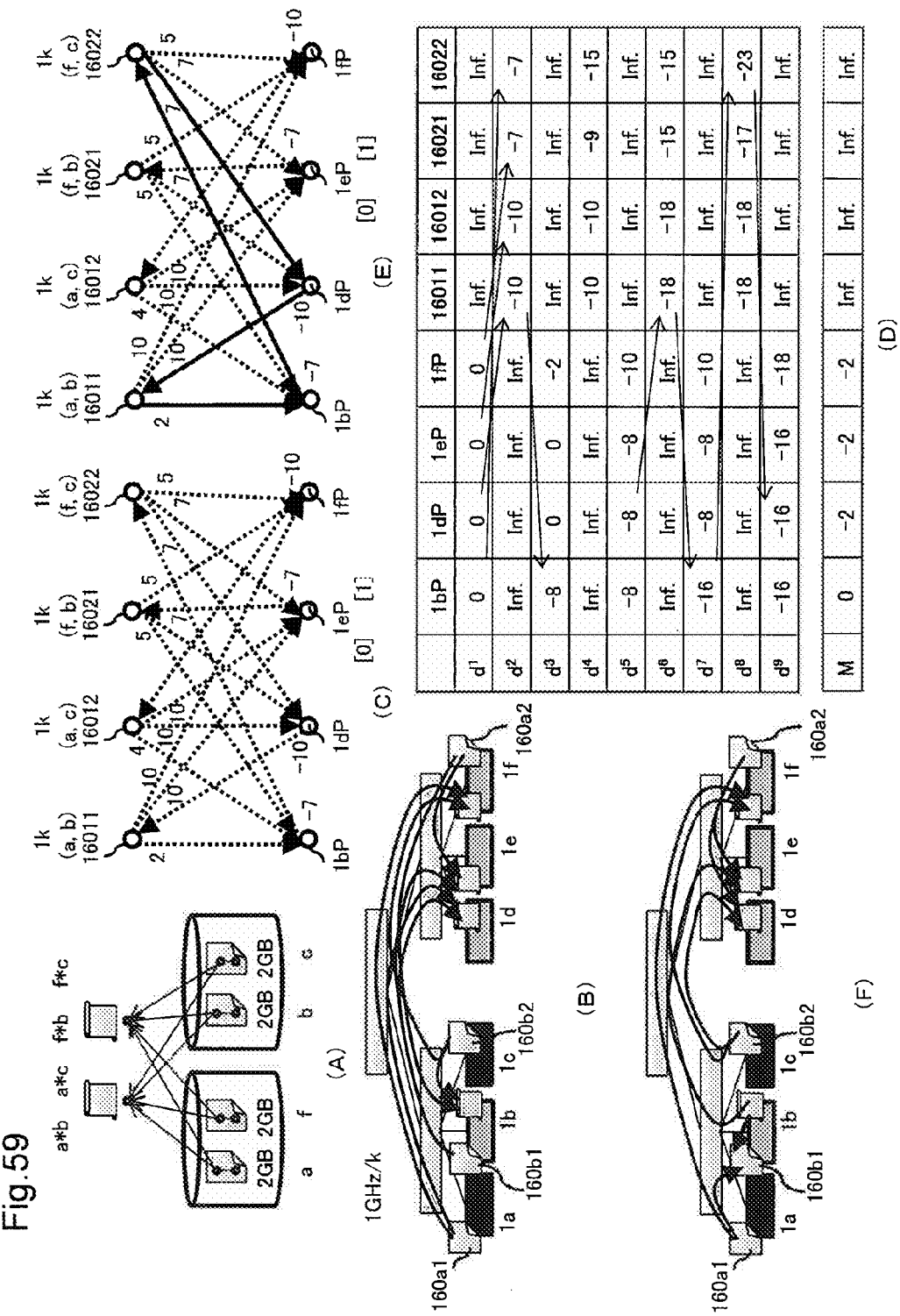
FIG. 59 is an explanatory drawing (2) of an operation example in the fourth exemplary embodiment.

FIG. 59 indicates an example of the communication control system 90 that performs processing of two inputs used in this description. As indicated in FIG. 59(A), this communication control system 90 processes a set made by taking the direct product of two data sets.

One data set (a and f of FIG. 59(A)) is stored in the processing server device 1a and the processing server device 1f, and the other data set (b and c) is stored in the processing server device 1b and the processing server device 1d. Each of the subsets a to f of the respective data sets is of 2 GB.

Data nodes 16011, 16012, 10621 and 16022 corresponding to four pairs of (the processing server device 1a and the processing server device 1b), (the processing server device 1a and the processing server device 1c), (the processing server device 1f and the processing server device 1b) and (the processing server device 1f and the processing server device 1c), which are combinations of processing server device 1 that store two data sets are managed by the data storage location management device 4.

As shown in FIG. 59(B), data of (a, b) is carried out by the processing server device 1d. The communication cost between the processing server device 1d and the processing server device 1a is 5, and the communication cost between the processing server device 1d and the processing server device 1b is 5. The data amounts of the two data sets are identical. Accordingly, the communication cost calculation unit 112 of the processing server device 1d calculates the communication cost between a processing node 1dP and a data node 16011 as 5+5=10. The processing server devices 1b, 1e and 1f which carry out data reception/transmission and processing calculate a communication cost according to data which each of them is processing similarly.

FIG. 59(C) shows links to be generated as a result of this, (D) route information to be created and (E) a negative closed path to be detected. FIG. 59(F) shows an arrangement of processing after performing a change based on this negative closed path.

In the above, the present invention has been described with reference to the exemplary embodiments. However, the present invention is not limited to the above-mentioned exemplary embodiments. Various modifications which a person skilled in the art can understand can be performed in the composition and details of the present invention within the scope of the present invention.

This application claims priority based on Japanese application Japanese Patent Application No. 2011-114644, filed on May 23, 2011, the disclosure of which is incorporated herein in its entirety.

REFERENCE SIGNS LIST

1 Processing server device
10 Communication network
11 Negative closed path search unit
110 Search processing unit
1101 Activation unit
1102 Reception unit
1103 Transfer unit
1104 Negative closed path detecting unit
1105 Progress storage unit
1106 Route storage unit
1113 Update unit
111 Node information storage unit
112 Communication cost calculation unit
1121 Communication cost calculation unit
1122 Target node information storage unit
1123 Communication network configuration storage unit
1124 Configuration cost storage unit
1125 Communication device load storage unit
1126 Node coordinate storage unit
113 Node information generating unit
1131 Communication destination acquisition unit
1132 Node creating unit
1133 Node information exchanging unit
1134 Node information sharing storage unit
114 Update reception unit
12 Communication destination storage unit
13 Data processing unit
14 Data storage unit
15 Program storage unit
16 Running state storage unit
17 Processing moving unit
18 Display execution unit
18 Data location storage unit
2 Worker device
3 Master device
4 Data storage location management device
8 Communication device
90 Communication control system

The invention claimed is:

1. A communication device connected with other communication devices via a communication path, comprising:
a node information storage unit which stores out_node information which includes, when said communication device is a processing device to carry out processing assigned thereto, a set of an identifier of a data device associated with data of said processing and a communication cost for said data, and,
when said communication device is a data device, a set of an identifier of a processing device to input and output data associated with said communication device and a communication cost between said processing device concerned and said data concerned;

a search processing unit which receives a message, which is originated from a sender, which is said communication device or another communication device, and includes a transfer route of said message and a total cost, which is a communication cost of said transfer route, and detects and outputs a closed path, from said transfer route, having a negative total cost, or transmits to a data device registered in said out_node information a message including a new total cost calculated by subtracting a communication cost corresponding to said data device concerned from said total cost and a new transfer route made by adding said communication device to said transfer route, and transmits to a processing device registered in said out_node information a message including a new total cost, calculated by adding a communication cost corresponding to said processing device concerned to said total cost, and said new transfer route.

2. The communication device according to claim 1, wherein,
when said communication device is a processing device having a remaining processing capability for enabling to perform new processing, said out_node information includes an identifier of a processing device having been assigned processing and a communication cost of zero.

3. The communication device according to claim 1, wherein,
when said communication device is a processing device having been assigned processing, said out_node information includes, corresponding to a data device, a change upper limit, which is a communication data amount between said communication device and said data device concerned, and, said received message includes said transfer route and a minimum value M2 of said change upper limit(s) in said transfer route, and wherein
said search processing unit, when transferring a message to a data device, makes a minimum value between M2 of said received message and said change upper limit for said data device concerned a new M2, and,
when detects a closed path from said transfer route of said received message,
a) when said communication device is not said sender, transmits a message to said sender,
b) when said communication device is said sender, for each of other communication devices, receives a message from said communication device concerned, acquires from each processing device included in a closed path of said received message P and L2, which are a remaining processing capability and a processing capability necessary per unit data amount of assigned processing of said processing device concerned, and L1 which is a processing capability necessary per unit data amount of processing being assigned to a processing device just before said processing devices concerned in order of transfer route of said closed path, calculates an addable quantity of processing P/(L1-L2) corresponding to each said processing device concerned, and acquires a minimum value M1 of said calculated available processing addition quantities for said message concerned, and selects a change flow rate which is a smaller one between M1 and M2 of said message concerned, gets a value of "a total cost x said change flow rate", and selects a closed path having said value of "a total cost x said change flow rate" being biggest, and outputs said selected closed path and said change flow rate for said selected closed path.

4. The communication device according to claim 3, further comprising:
a processing moving unit which changes a communication destination of said change flow rate of data associated with a data device included in said closed path, from a processing device just before said data device concerned to a processing device next to said data device concerned in order of a transfer route of said closed path.

5. The communication device according to claim 1, connected to N−1 other communication devices, wherein
said node information storage unit stores in_node information which includes an identifier of another communication device of which out_node information includes an identifier of said communication device, and said received message includes a search length, said search length being a length of said transfer route, wherein
said search processing unit:
transmits a message including a search length made by adding 1 to a search length of said received message to said data device or said processing device registered in out_node information of said communication device;
for each numerical value k from 1 to N of a number of nodes, receives a message having search length k from each of other communication devices registered in said in_node information, and acquires dk, which is a minimum value of total costs of search length k and a route_node k, which is an identifier of another communication device having transmitted a message including dk to said communication device;
calculates average cost=(dN−dk)/(N−k) for each search length k from 1 to N−1, and creates a search result including M, which is a maximum value of said average costs and route_node k for each value k from 1 to N of said number of nodes; and
a) transmits said search result to said sender, when said communication device is not said sender, and
b) when said communication device is said sender, receives a search result from all other communication devices, and detects said closed path by getting route_node k−1 from a search result received from route_node k while decreasing k successively from k=N of said number of nodes, taking route_node N included in a search result including a smallest M among all search results as a starting point.

6. The communication device according to claim 5, further comprising
a route storage unit which stores, for each search length k from 1 to N and each of in_nodes which are other communication devices registered in said in_node information, an in_node state indicating whether said search processing unit has received a message of said search length concerned from said in_node concerned, wherein
said search processing unit, upon receiving a message of search length k, searches for a k unfixed node, which is an in_node not having received a message of search length k concerned, in said route storage unit, and transmits a message to said data device or said processing device when said k unfixed node does not exist, and
transmits an acquisition request including search length k to said k unfixed node, when said k unfixed node exists, and upon receiving an acquisition request of search length k, searches for a k−1 unfixed node, which is an in_node not having received a message of search length k−1, in said route storage unit, and
- a) transmits an acquisition request including search length k−1 to said k−1 unfixed node, when existing, and
- b) when not existing, and b1) when receiving said acquisition request of search length k from a data device, transmits to said data device concerned a message including a numerical value made by subtracting a communication cost of said data device concerned from dk−1, which is a minimum value among total costs of search length k−1, as a total cost of search length k, and b2) when receiving said acquisition request of search length k from a processing device, transmits to said processing device concerned a message including a numerical value made by adding a communication cost of said processing device concerned to dk−1, as a total cost of search length k.

7. The communication device according to claim 5, wherein
when said communication device is a processing device to carry out assigned processing, said out_node information includes, for each data device, a change upper limit which is a communication data amount between said communication device and said data device concerned, wherein
when said communication device is said sender, said search processing unit, for each k in said detected closed path, receives from route_node k, a change upper limit for route_node k−1 and, when route_node k is a processing device, a remaining processing capability and a processing capability necessary per unit data amount of processing being assigned,
for each processing device included in said closed path, calculates an addable quantity of processing P/(L1−L2), where P is a remaining processing capability of said processing device concerned, L2 is a processing capability necessary per unit data amount of assigned processing of said processing device concerned, and L1 is a processing capability necessary per unit data amount of assigned processing of a processing device just before said processing devices concerned in order of a transfer route of said closed path, and acquires M1 which is a minimum value of said calculated available processing addition quantities, and
outputs a change flow rate which is smaller one of M1 and a minimum value of change upper limits, and said closed path.

8. The communication device according to claim 1, wherein
a data device is associated with a plurality of sets of data, and
out_node information of a processing device includes, as a communication cost corresponding to said data device concerned, a numerical value made by performing weighted addition of a communication cost from said processing device concerned to each of said plurality of sets of data with weights given according to a traffic volume.

9. The communication device according to claim 1, wherein
a data device is associated with m sets of data (m is plural), and
out_node information of a processing device includes, as a communication cost corresponding to said data device concerned, a numerical value made by selecting n (n is a number no more than m) smallest communication costs among communication costs from said processing device concerned to each of said m sets of data and adding said selected costs.

10. The communication device according to claim 1 connected to N−1 other communication devices, wherein,
when a processing device start communication, said search processing unit stores a set of an identifier and a communication cost of other communication devices, each of which is a data device or a processing device, in out_node information;
receives a message including a search length, which is a length of a transfer route of said massage, from another communication device, and transmits a message including a search length made by adding 1 to said search length in said received message to said data device or said processing device registered in said out_node information;
for each numerical value k from 1 to N of said number of nodes, receives a message of search length k from other communication devices and acquires dk, which is a minimum value of total costs of search length k, and route_node k, which is an identifier of another communication device having transmitted a message including dk to said communication device; and
for each search length k from 1 to N−1, calculates an average cost=(dN−dk)/(N−k), and, when a maximum value of said average costs is negative, detects said closed path by getting route_node k−1 from a search result received from route_node k while decreasing k successively from k=N of said number of nodes, taking route_node N as a starting point.

11. A communication system including a plurality of communication devices connected by a communication path, wherein said communication device
stores in a node information storage unit out_node information which includes, when a worker device corresponding to said communication device is a processing device to carry out processing assigned thereto, a set of an identifier of a data device associated with data of said processing and a communication cost between said processing device and said data, and, when a worker device corresponding to said communication device is a data device, a set of an identifier of a processing device to input and output data associated with said data device and a communication cost between said processing device concerned and said data concerned; and
comprises a search processing unit for receiving a message, which is originated from a sender, which is said communication device or another communication device, and includes a transfer route of said message and a total cost, which is a communication cost of said transfer route, and detects and outputs a closed path, from said transfer route, having a negative total cost, or
transmitting to a communication device corresponding to a data device registered in said out_node information a message including a new total cost made by subtracting a communication cost corresponding to said data device concerned from said total cost and a new transfer route made by adding said worker device corresponding to said communication device to said transfer route, and transmitting to a communication device corresponding to a processing device registered in said out_node information a message including a new total cost made by adding a communication cost corresponding to said processing device concerned to said total cost and said new transfer route.

12. A computer-readable non-transitory recording medium which stores a program for making a computer connected with other computers, which execute said program, by a communication path execute:

storage processing for storing in a node information storage unit out_node information which includes, when said computer is a processing device to carry out processing assigned thereto, a set of an identifier of a data device associated with data of said processing and a communication cost for said data; and when said computer is a data device, a set of an identifier of a processing device to input and output data associated with said computer and a communication cost between said processing device concerned and said data concerned;

search processing for receiving a message, which is originated from a sender, which is said computer or another computer, and includes a transfer route of said message and a total cost, which is a communication cost of said transfer route, and detecting and outputting a closed path, from said transfer route, having a negative total cost, or transmitting to a data device registered in said out_node information a message including a new total cost calculated by subtracting a communication cost corresponding to said data device concerned from said total cost and a new transfer route made by adding said computer to said transfer route, and transmitting to a processing device registered in said out_node information a message including a new total cost calculated by adding a communication cost corresponding to said processing device concerned to said total cost and said new transfer rout.

13. The computer-readable non-transitory recording medium according to claim 12 which stores the program for making said computer execute said storing processing of, when said computer is a processing device having a remaining processing capability for enabling to perform new processing, storing to said node information storage said out_node information including an identifier of a processing device having been assigned processing and a communication cost of zero.

14. The computer-readable non-transitory recording medium according to claim 12 which stores the program, that makes said computer execute said storing processing of, when said computer is a processing device having been assigned processing, storing in said node information storage said out_node information including, corresponding to a data device, a change upper limit, which is a communication data amount between said computer and said data device concerned, and said search processing of, when transferring a message which includes said transfer route and a minimum value M2 of said change upper limit(s) in said transfer route, to a data device, making a minimum value between M2 of said received message and said change upper limit for said data device concerned a new M2, and, when detecting a closed path from said transfer route of said received message,
    a) when said computer is not said sender, transmitting a message to said sender,
    b) when said computer is said sender, for each of other computers, receiving a message from said computer concerned, acquiring from each processing device included in a closed path of said received message P and L2, which are a remaining processing capability and a processing capability necessary per unit data amount of assigned processing of said processing device concerned, and L1 which is a processing capability necessary per unit data amount of processing being assigned to a processing device just before said processing devices concerned in order of transfer route of said closed path, calculating an addable quantity of processing P/(L1−L2) corresponding to each said processing device concerned, and acquiring a minimum value M1 of said calculated available processing addition quantities for said message concerned, and selecting a change flow rate which is a smaller one between M1 and M2 of said message concerned, getting a value of "a total cost x said change flow rate", and
  selecting a closed path having said value of "a total cost x said change flow rate" being biggest, and outputting said selected closed path and said change flow rate for said selected closed path.

15. The computer-readable non-transitory recording medium according to claim 14 which stores the program for making said computer execute processing moving processing of changing a communication destination of said change flow rate of data associated with a data device included in said closed path, from a processing device just before said data device concerned to a processing device next to said data device concerned in order of a transfer route of said closed path.

16. The computer-readable non-transitory recording medium according to claim 12 which stores the program wherein said received message includes a search length, said search length being a length of said transfer route, and said program makes said computer connected to N−1 other computers execute the storage processing of storing in said node information storage unit in_node information which includes an identifier of another computer of which out_node information includes an identifier of said computer, and said search processing of transmitting a message including a search length made by adding 1 to a search length of said received message to said data device or said processing device registered in out_node information of said computer;

for each numerical value k from 1 to N of a number of nodes, receiving a message having search length k from each of other computers registered in said in_node information, and acquiring dk, which is a minimum value of total costs of search length k and a route_node k, which is an identifier of another computer having transmitted a message including dk to said computer;

calculating average cost=(dN−dk)/(N−k) for each search length k from 1 to N−1, and creating a search result including M, which is a maximum value of said average costs and route_node k for each value k from 1 to N of said number of nodes; and
    a) transmitting said search result to said sender, when said computer is not said sender, and
    b) when said computer is said sender, receiving a search result from all other computers, and detecting said closed path by getting route_node k−1 from a search result received from route_node k while decreasing k successively from k=N of said number of nodes, taking route_node N included in a search result including a smallest M among all search results as a starting point.

17. The computer-readable non-transitory recording medium according to claim 16 which stores the program for making said computer execute
- route storage processing for storing in a route storage unit, for each search length k from 1 to N and each of in_nodes which are other computers registered in said in_node information, an in_node state indicating whether said computer has received a message of said search length concerned from said in_node concerned, and
- said search processing of, upon receiving a message of search length k, searching for a k unfixed node, which is an in_node not having received a message of search length k concerned, in said route storage unit, and transmitting a message to said data device or said processing device when said k unfixed node does not exist, and
- transmitting an acquisition request including search length k to said k unfixed node, when said k unfixed node exists, and
- upon receiving an acquisition request of search length k, searching for a k−1 unfixed node, which is an in_node not having received a message of search length k−1, in said route storage unit, and
  a) transmitting an acquisition request including search length k−1 to said k−1 unfixed node, when existing, and
  b) when not existing, and b1) when receiving said acquisition request of search length k from a data device, transmitting to said data device concerned a message including a numerical value made by subtracting a communication cost of said data device concerned from dk−1, which is a minimum value among total costs of search length k−1, as a total cost of search length k, and b2) when receiving said acquisition request of search length k from a processing device, transmitting to said processing device concerned a message including a numerical value made by adding a communication cost of said processing device concerned to dk−1, as a total cost of search length k.

18. The computer-readable non-transitory recording medium according to claim 16 which stores the program, for making said computer execute
- said storing processing of, when said computer is a processing device to carry out assigned processing, storing in said node information storage unit said out_node information including, for each data device, a change upper limit which is a communication data amount between said computer and said data device concerned, and
- said search processing of, when said computer is said sender, for each k in said detected closed path, receiving from route_node k, a change upper limit for route_node k−1 and, when route_node k is a processing device, a remaining processing capability and a processing capability necessary per unit data amount of processing being assigned,
- for each processing device included in said closed path, calculating an addable quantity of processing P/(L1−L2), where P is a remaining processing capability of said processing device concerned, L2 is a processing capability necessary per unit data amount of assigned processing of said processing device concerned, and L1 is a processing capability necessary per unit data amount of assigned processing of a processing device just before said processing devices concerned in order of a transfer route of said closed path, and acquiring M1 which is a minimum value of said calculated available processing addition quantities, and
- outputting a change flow rate which is smaller one of M1 and a minimum value of change upper limits, and said closed path.

19. The computer-readable non-transitory recording medium according to claim 12 which stores the program, wherein
- a data device is associated with a plurality of sets of data, and said program makes said computer execute
- said storing processing of storing in said node information storage unit out_node information of a processing device including, as a communication cost corresponding to said data device concerned, a numerical value made by performing weighted addition of a communication cost from said processing device concerned to each of said plurality of sets of data with weights given according to a traffic volume.

20. The computer-readable non-transitory recording medium according to claim 12 which stores the program, wherein
- a data device is associated with m sets of data (m is plural), and said program makes said computer execute
- said storing processing of storing in said node information storage unit out_node information of a processing device including, as a communication cost corresponding to said data device concerned, a numerical value made by selecting n (n is a number no more than m) smallest communication costs among communication costs from said processing device concerned to each of said m sets of data and adding said selected costs.

21. The computer-readable non-transitory recording medium according to claim 12 which stores the program making said computer connected with N−1 other computers execute said search processing of:
- when a processing device start communication, storing a set of an identifier and a communication cost of other computers, each of which is a data device or a processing device, in out_node information;
- receiving a message including a search length, which is a length of a transfer route of said massage, from another computer, and transmitting a message including a search length made by adding 1 to said search length in said received message to said data device or said processing device registered in said out_node information;
- for each numerical value k from 1 to N of said number of nodes, receiving a message of search length k from other computers and acquiring dk, which is a minimum value of total costs of search length k, and route_node k, which is an identifier of another computer having transmitted a message including dk to said computer; and
- for each search length k from 1 to N−1, calculating an average cost=(dN−dk)/(N−k), and, when a maximum value of said average costs is negative, detecting said closed path by getting route_node k−1 from a search result received from route_node k while decreasing k successively from k=N of said number of nodes, taking route_node N as a starting point.

22. A communication method in a communication device connected with other communication devices by a communication path, comprising:
- storing in a node information storage unit out_node information which includes, when said communication device is a processing device to carry out processing assigned thereto, a set of an identifier of a data device associated with data of said processing and a communication cost for said data;
- when said communication device is a data device, a set of an identifier of a processing device to input and output data associated with said communication device and a communication cost between said processing device concerned and said data concerned;

receiving a message, which is originated from a sender, which is said communication device or another communication device, and includes a transfer route of said message and a total cost, which is a communication cost of said transfer route, and detecting and outputting a closed path, from said transfer route, having a negative total cost, or transmitting to a data device registered in said out_node information a message including a new total cost calculated by subtracting a communication cost corresponding to said data device concerned from said total cost and a new transfer route made by adding said communication device to said transfer route, and transmitting to a processing device registered in said out_node information a message including a new total cost calculated by adding a communication cost corresponding to said processing device concerned to said total cost and said new transfer rout.

23. The communication method according to claim 22, comprising;

when said communication device is a processing device having a remaining processing capability for enabling to perform new processing, storing to said node information storage said out_node information including an identifier of a processing device having been assigned processing and a communication cost of zero.

24. The communication method according to claim 22, comprising:

when said communication device is a processing device having been assigned processing, storing in said node information storage said out_node information including, corresponding to a data device, a change upper limit, which is a communication data amount between said communication device and said data device concerned, when transferring a message which includes said transfer route and a minimum value M2 of said change upper limit(s) in said transfer route, to a data device, making a minimum value between M2 of said received message and said change upper limit for said data device concerned a new M2, and, when detecting a closed path from said transfer route of said received message, a) when said communication device is not said sender, transmitting a message to said sender, b) when said communication device is said sender, for each of other communication devices, receiving a message from said communication device concerned, acquiring from each processing device included in a closed path of said received message P and L2, which are a remaining processing capability and a processing capability necessary per unit data amount of assigned processing of said processing device concerned, and L1 which is a processing capability necessary per unit data amount of processing being assigned to a processing device just before said processing devices concerned in order of transfer route of said closed path, calculating an addable quantity of processing P/(L1−L2) corresponding to each said processing device concerned, and acquiring a minimum value M1 of said calculated available processing addition quantities for said message concerned, and selecting a change flow rate which is a smaller one between M1 and M2 of said message concerned, getting a value of "a total cost x said change flow rate", and selecting a closed path having said value of "a total cost x said change flow rate" being biggest, and outputting said selected closed path and said change flow rate for said selected closed path.

25. The communication method according to claim 24, comprising changing a communication destination of said change flow rate of data associated with a data device included in said closed path, from a processing device just before said data device concerned to a processing device next to said data device concerned in order of a transfer route of said closed path.

26. The method according to claim 22, wherein said received message includes a search length, said search length being a length of said transfer route, said communication device connected to N−1 other communication devices, and said method comprises;

storing in said node information storage unit in_node information which includes an identifier of another communication device of which out_node information includes an identifier of said communication device, transmitting a message including a search length made by adding 1 to a search length of said received message to said data device or said processing device registered in out_node information of said communication device;

for each numerical value k from 1 to N of a number of nodes, receiving a message having search length k from each of other communication devices registered in said in_node information, and acquiring dk, which is a minimum value of total costs of search length k and a route_node k, which is an identifier of another communication device having transmitted a message including dk to said communication device;

calculating average cost=(dN−dk)/(N−k) for each search length k from 1 to N−1, and creating a search result including M, which is a maximum value of said average costs and route_node k for each value k from 1 to N of said number of nodes; and a) transmitting said search result to said sender, when said communication device is not said sender, and b) when said communication device is said sender, receiving a search result from all other communication devices, and detecting said closed path by getting route_node k−1 from a search result received from route_node k while decreasing k successively from k=N of said number of nodes, taking route_node N included in a search result including a smallest M among all search results as a starting point.

27. The method according to claim 26, comprising;

storing in a route storage unit for each search length k from 1 to N and each of in_nodes which are other communication devices registered in said in_node information, an in_node state indicating whether said communication device has received a message of said search length concerned from said in_node concerned, upon receiving a message of search length k, searching for a k unfixed node, which is an in_node not having received a message of search length k concerned, in said route storage unit, and transmitting a message to said data device or said processing device when said k unfixed node does not exist, transmitting an acquisition request including search length k to said k unfixed node, when said k unfixed node exists, upon receiving an acquisition request of search length k, searching for a k−1 unfixed node, which is an in_node not having received a message of search length k−1, in said route storage unit, and a) transmitting an acquisition request including search length k−1 to said k−1 unfixed node, when existing, and b) when not existing, and b1) when receiving said acquisition request of search length k from a data device, transmitting to said data device concerned a message including a numerical value made by subtracting a communication cost of said data device concerned from dk−1, which is a minimum value among total costs of search length k−1, as a total cost of search length k, and b2) when receiving said acquisition request of search length k from a processing device, transmitting to said processing device concerned a message including a numerical value made by adding a communication cost of said processing device concerned to dk−1, as a total cost of search length k.

28. The communication method according to claim 26, comprising:

when said communication device is a processing device to carry out assigned processing, storing in said node information storage unit said out_node information including, for each data device, a change upper limit which is a communication data amount between said communication device and said data device concerned, when said communication device is said sender, for each k in said detected closed path, receiving from route_node k, a change upper limit for route_node k−1 and, when route_node k is a processing device, a remaining processing capability and a processing capability necessary per unit data amount of processing being assigned, for each processing device included in said closed path, calculating an addable quantity of processing P/(L1−L2), where P is a remaining processing capability of said processing device concerned, L2 is a processing capability necessary per unit data amount of assigned processing of said processing device concerned, and L1 is a processing capability necessary per unit data amount of assigned processing of a processing device just before said processing devices concerned in order of a transfer route of said closed path, and acquiring M1 which is a minimum value of said calculated available processing addition quantities, and outputting a change flow rate which is smaller one of M1 and a minimum value of change upper limits, and said closed path.

29. The communication method according to claim 22, wherein a data device is associated with a plurality of sets of data, and said method comprises storing in said node information storage unit out_node information of a processing device including, as a communication cost corresponding to said data device concerned, a numerical value made by performing weighted addition of a communication cost from said processing device concerned to each of said plurality of sets of data with weights given according to a traffic volume.

30. The communication method according to claim 22, wherein a data device is associated with m sets of data (m is plural), and said said method comprises;

storing in said node information storage unit out_node information of a processing device including, as a communication cost corresponding to said data device concerned, a numerical value made by selecting n (n is a number no more than m) smallest communication costs among communication costs from said processing device concerned to each of said m sets of data and adding said selected costs.

31. The communication method according to claim 22 in said communication device connected with N−1 other communication devices, comprising:

when a processing device start communication, storing a set of an identifier and a communication cost of other communication devices, each of which is a data device or a processing device, in out_node information;

receiving a message including a search length, which is a length of a transfer route of said massage, from another communication device, and transmitting a message including a search length made by adding 1 to said search length in said received message to said data device or said processing device registered in said out_node information;

for each numerical value k from 1 to N of said number of nodes, receiving a message of search length k from other communication devices and acquiring dk, which is a minimum value of total costs of search length k, and route_node k, which is an identifier of another communication device having transmitted a message including dk to said communication device; and for each search length k from 1 to N−1, calculating an average cost=(dN−dk)/(N−k), and, when a maximum value of said average costs is negative, detecting said closed path by getting route_node k−1 from a search result received from route_node k while decreasing k successively from k=N of said number of nodes, taking route_node N as a starting point.

32. A communication device connected with other communication devices via a communication path, comprising:

a node information storage means for storing out_node information which includes, when said communication device is a processing device to carry out processing assigned thereto, a set of an identifier of a data device associated with data of said processing and a communication cost for said data, and, when said communication device is a data device, a set of an identifier of a processing device to input and output data associated with said communication device and a communication cost between said processing device concerned and said data concerned;

a search processing means for receiving a message, which is originated from a sender, which is said communication device or another communication device, and includes a transfer route of said message and a total cost, which is a communication cost of said transfer route, and detecting and outputting a closed path, from said transfer route, having a negative total cost, or transmitting to a data device registered in said out_node information a message including a new total cost calculated by subtracting a communication cost corresponding to said data device concerned from said total cost and a new transfer route made by adding said communication device to said transfer route, and transmitting to a processing device registered in said out_node information a message including a new total cost calculated by adding a communication cost corresponding to said processing device concerned to said total cost and said new transfer route.

* * * * *